June 5, 1928.

H. R. BRAND

MECHANISM FOR CONTROLLING BUSINESS

Filed Jan. 6, 1922 22 Sheets-Sheet 2

Inventor
H. R. Brand
per John D. Morgan
Attorney.

June 5, 1928.

H. R. BRAND

MECHANISM FOR CONTROLLING BUSINESS

Filed Jan. 6, 1922   22 Sheets-Sheet 4

1,672,362

INVENTOR
H. R. Brand
PER John D Morgan
ATTORNEY

June 5, 1928.
H. R. BRAND
1,672,362
MECHANISM FOR CONTROLLING BUSINESS
Filed Jan. 6, 1922    22 Sheets-Sheet 5
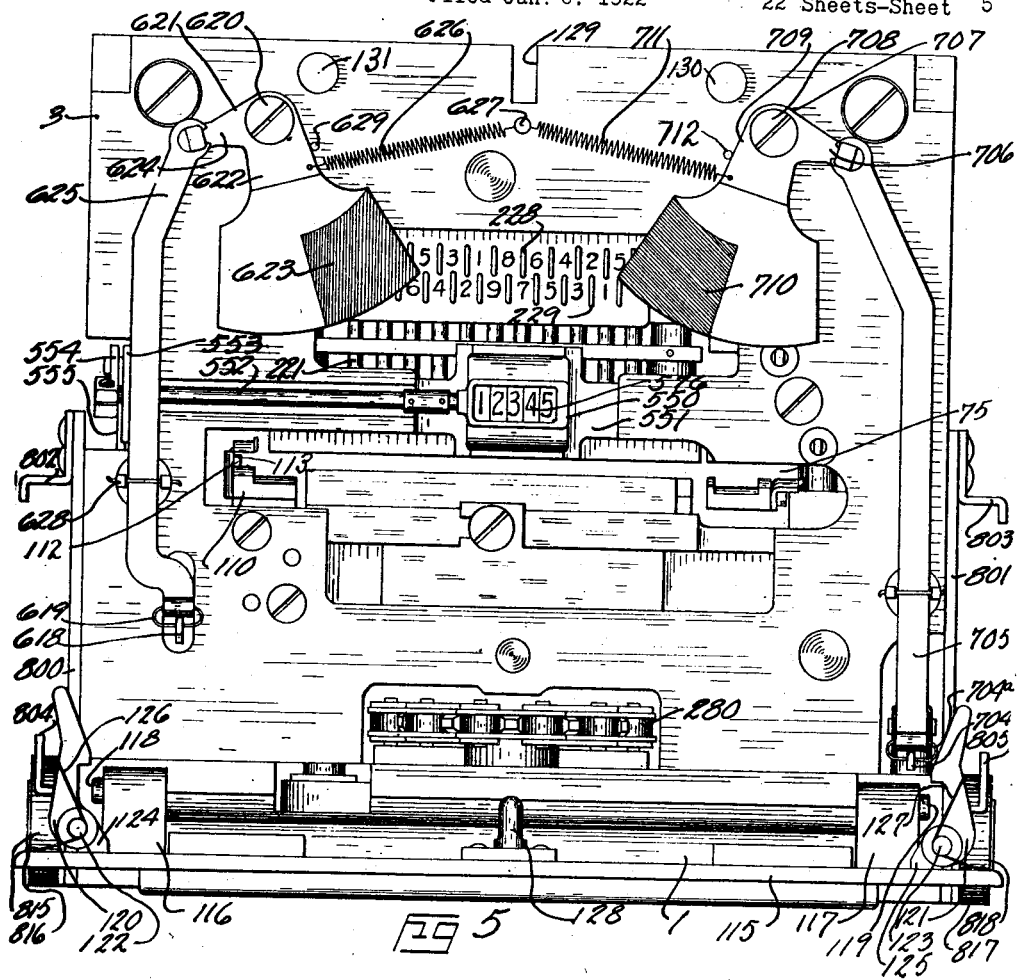
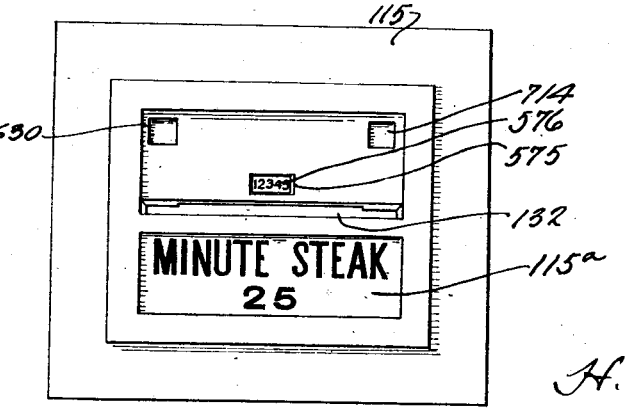
INVENTOR
H. R. Brand
PER John D. Morgan
ATTORNEY June 5, 1928.
H. R. BRAND
1,672,362
MECHANISM FOR CONTROLLING BUSINESS
Filed Jan. 6, 1922    22 Sheets-Sheet 6
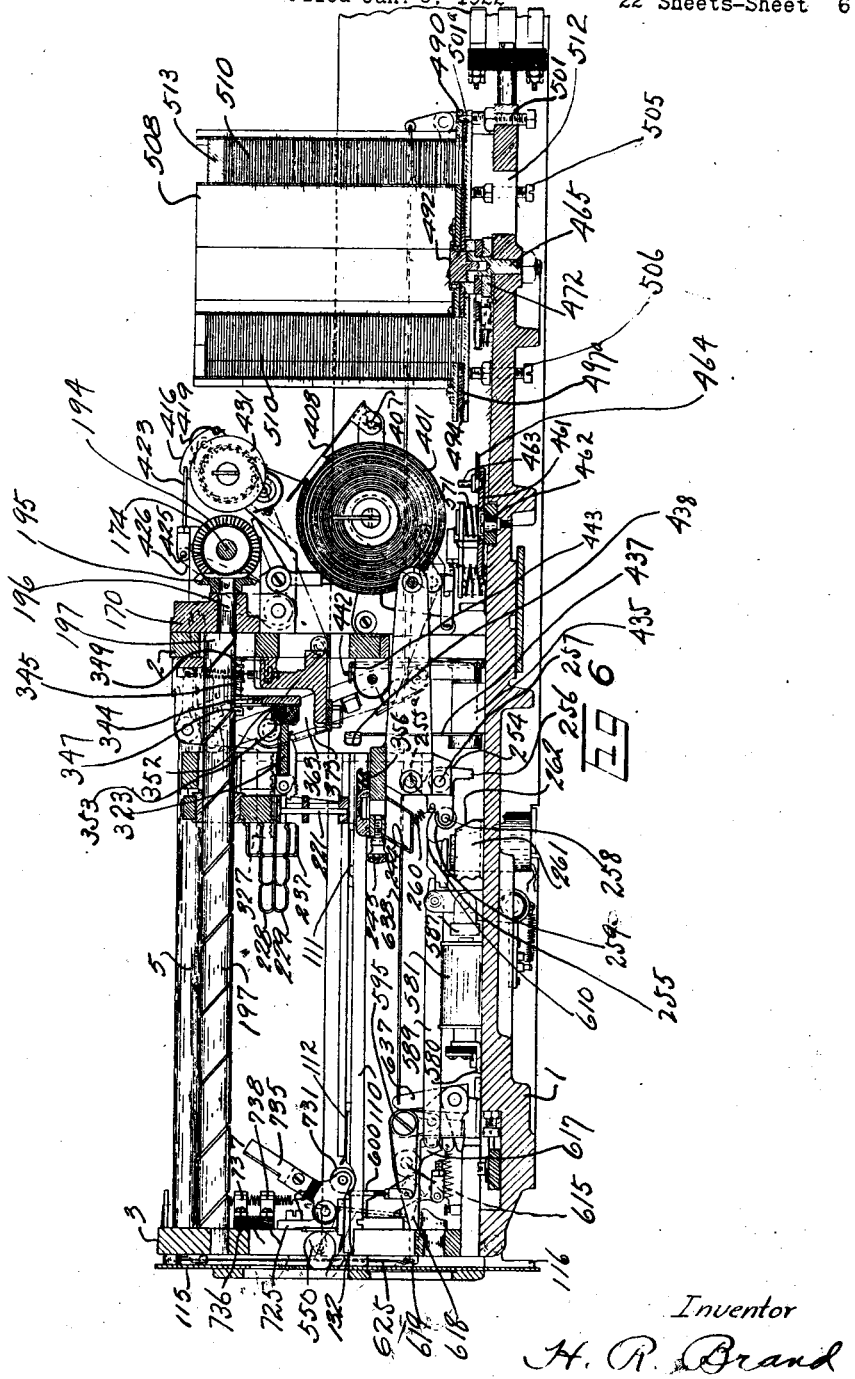
Inventor
H. R. Brand
per John D. Morgan
Attorney.

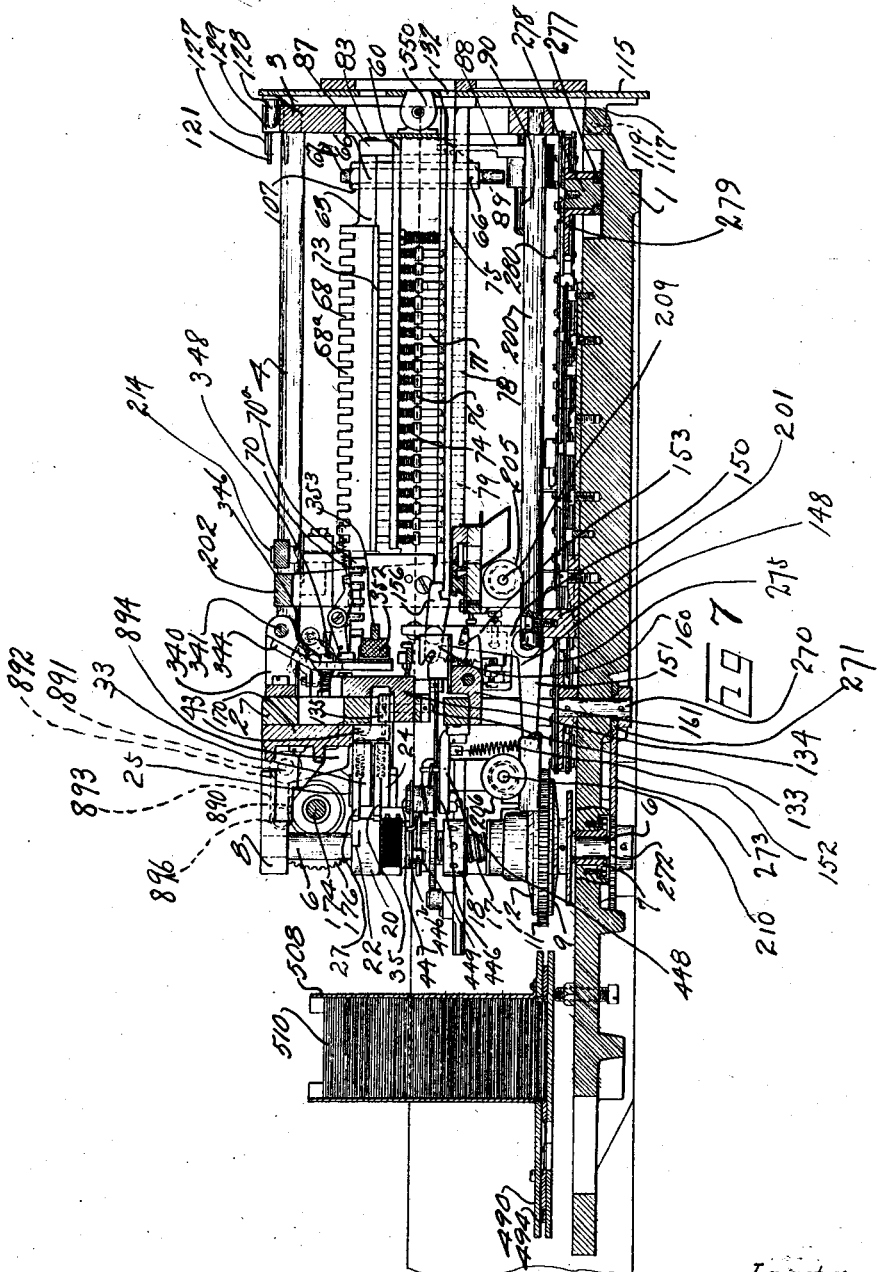

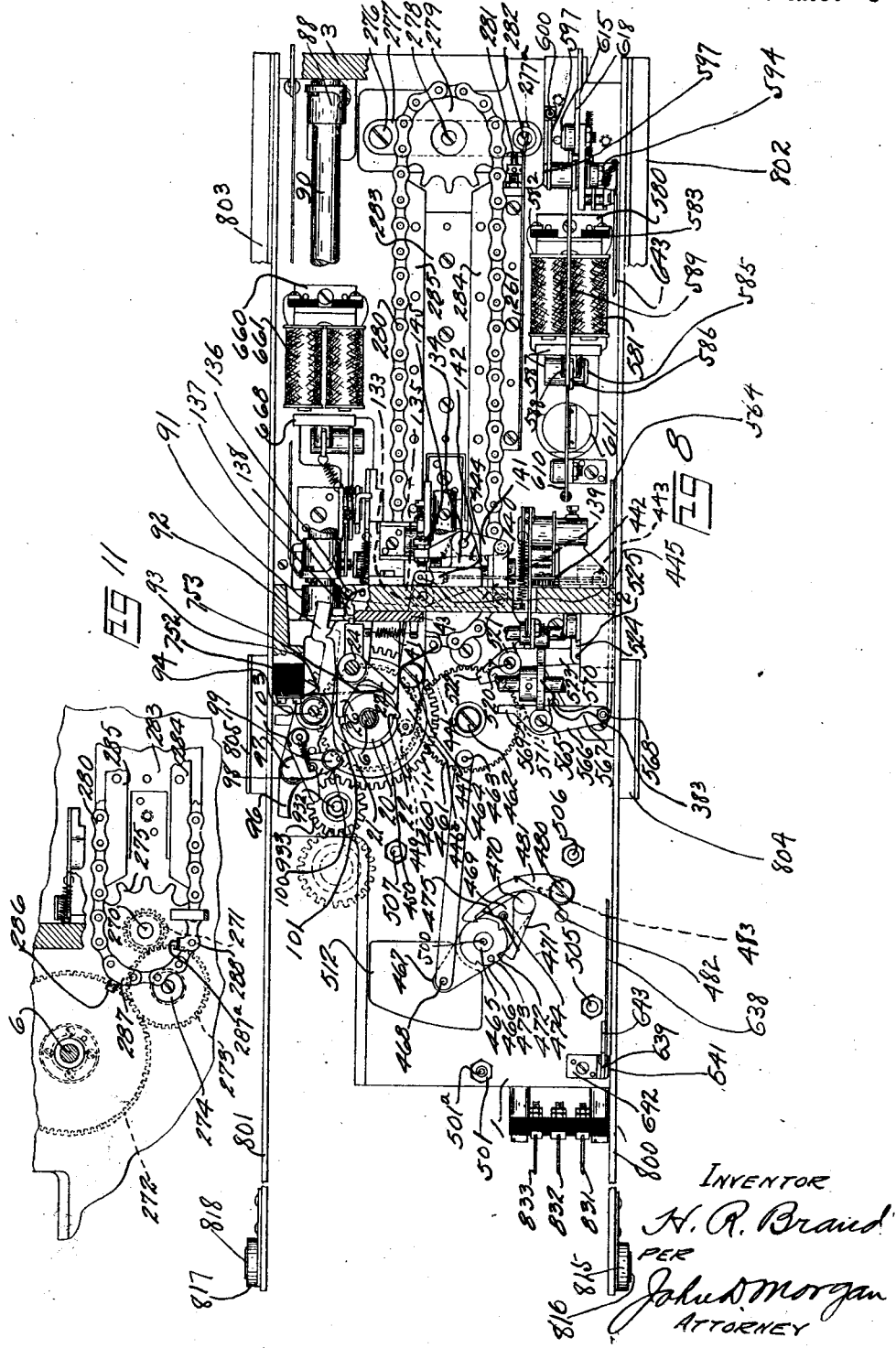

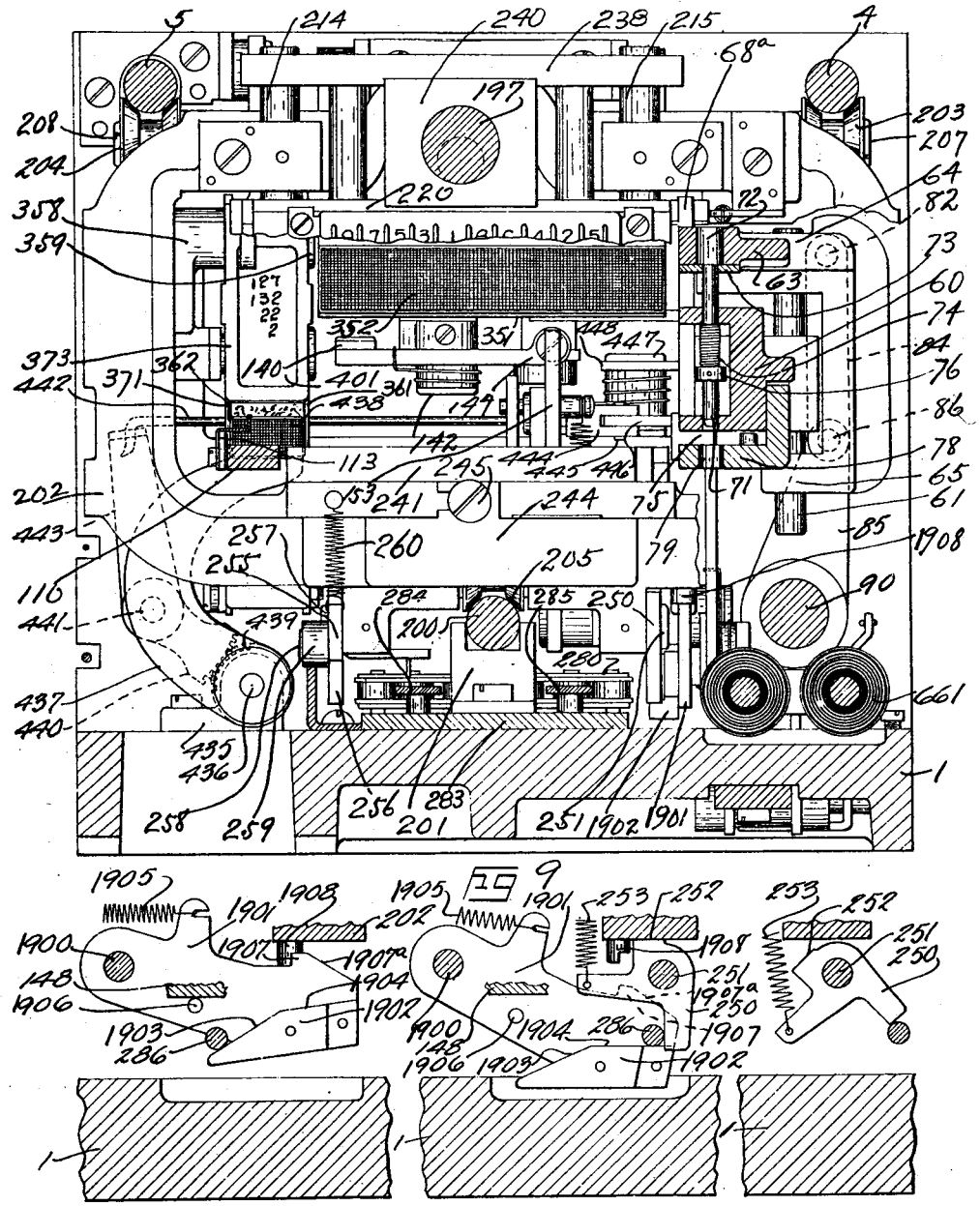

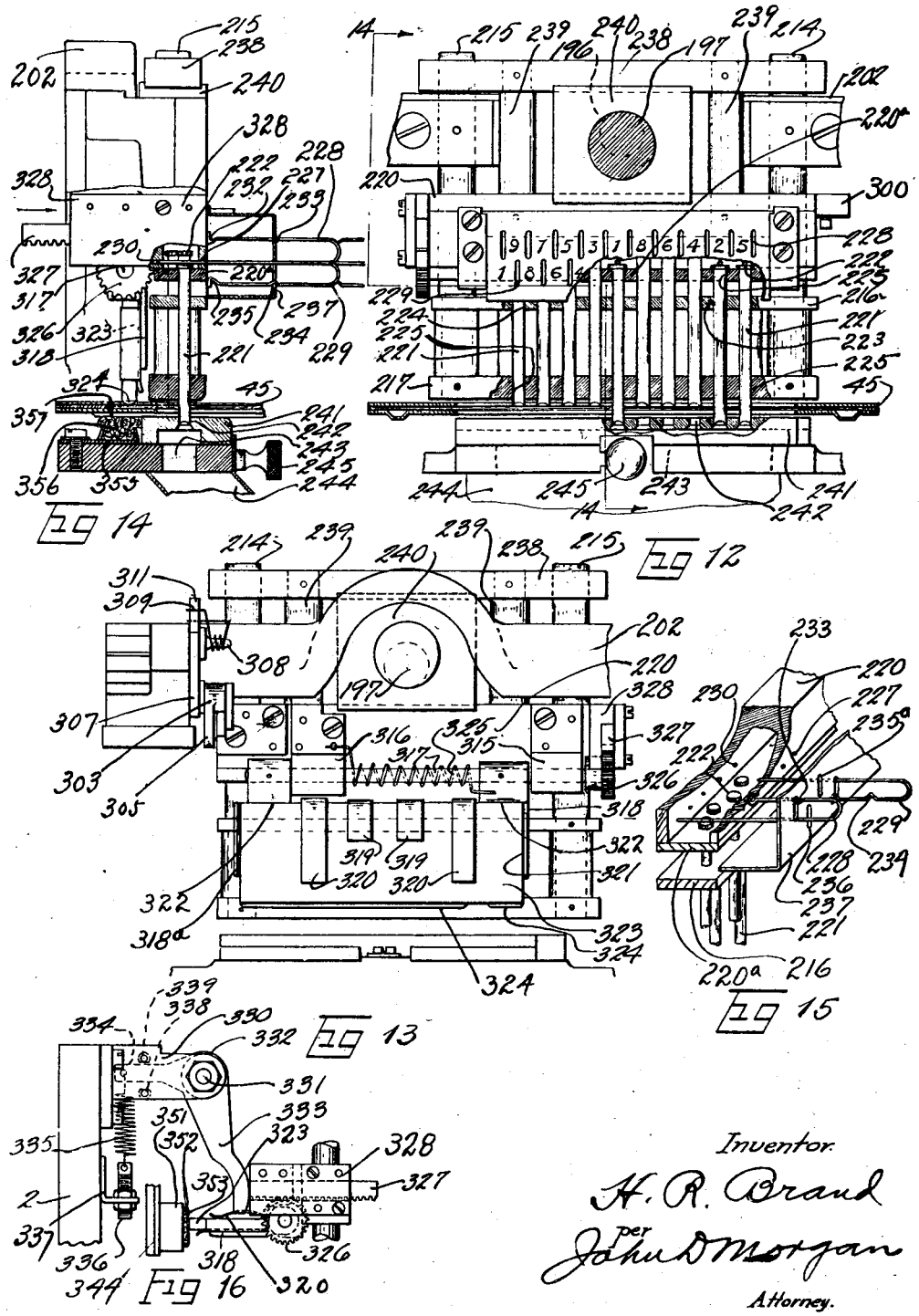

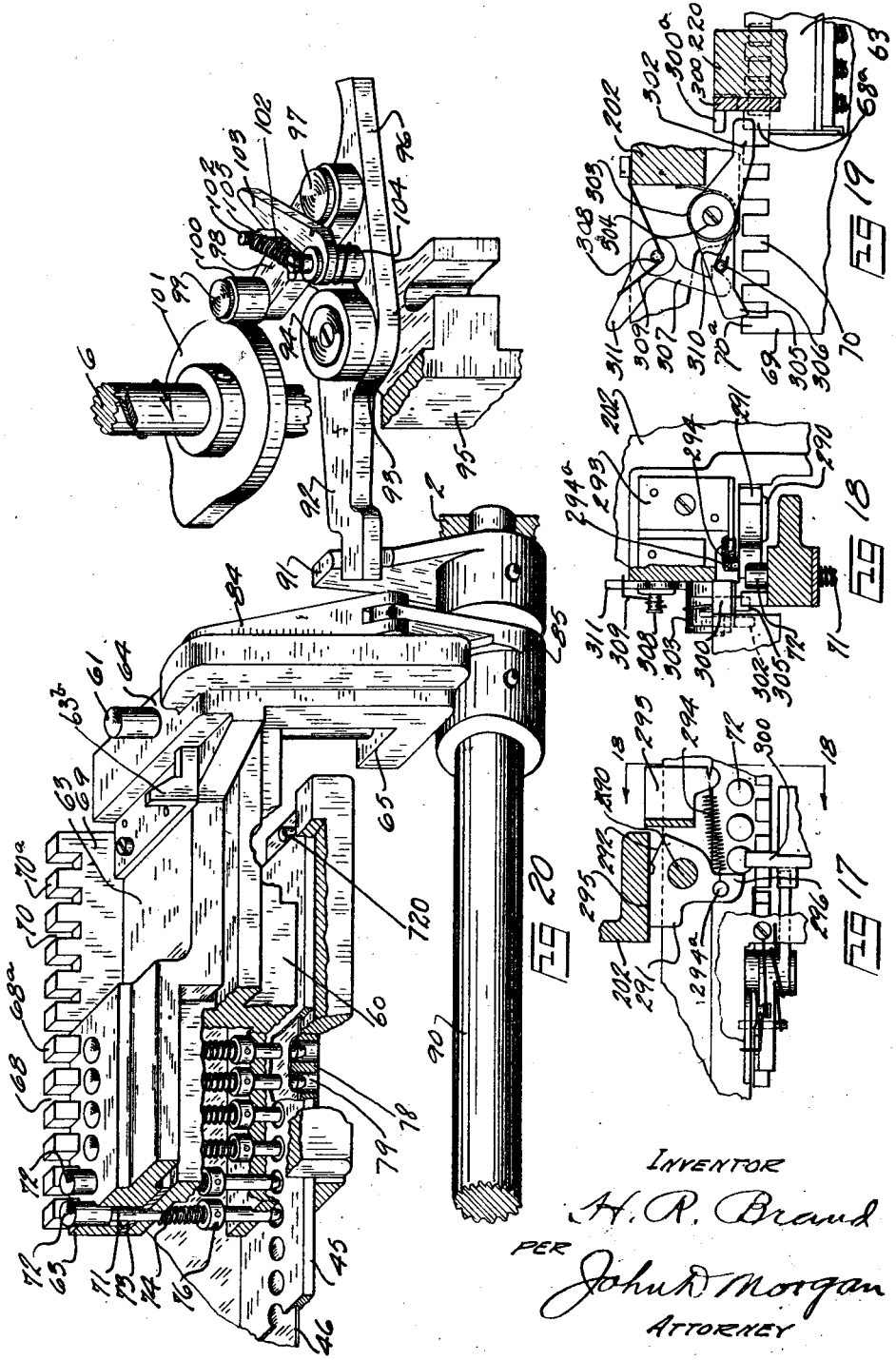

June 5, 1928.
H. R. BRAND
1,672,362
MECHANISM FOR CONTROLLING BUSINESS
Filed Jan. 6, 1922     22 Sheets-Sheet 12
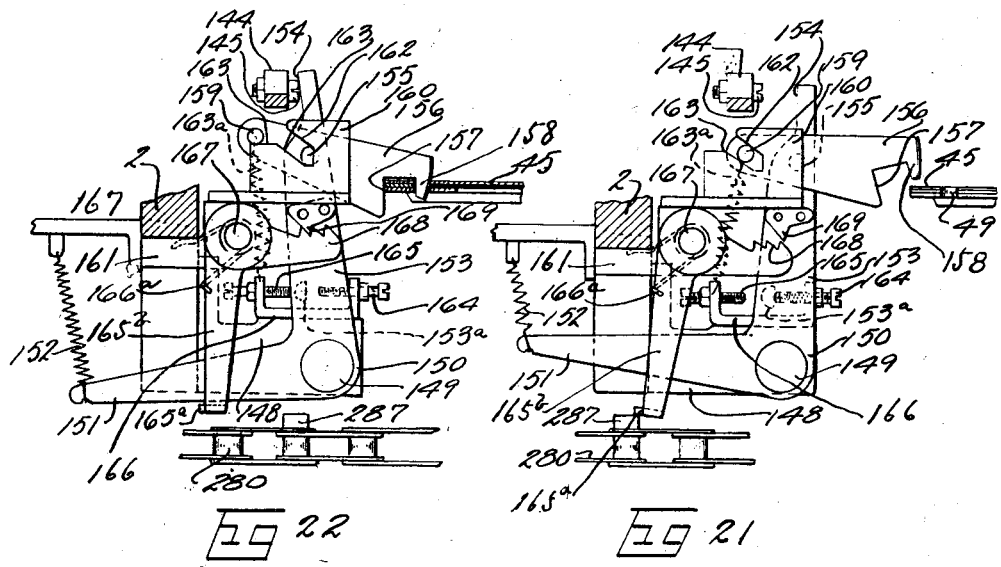
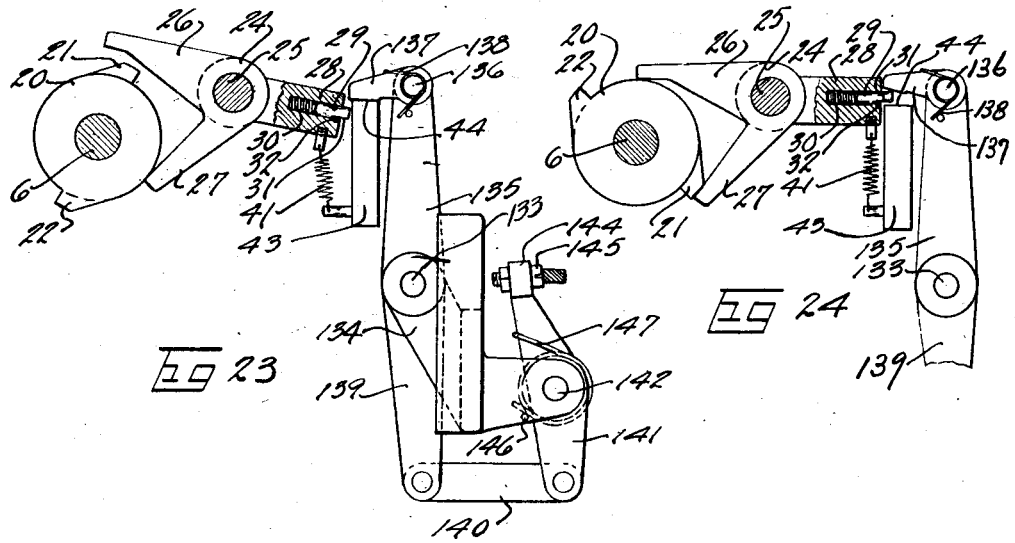
Inventor
H. R. Brand
per John D. Morgan
Attorney.

June 5, 1928.
H. R. BRAND
1,672,362
MECHANISM FOR CONTROLLING BUSINESS
Filed Jan. 6, 1922
22 Sheets-Sheet 13
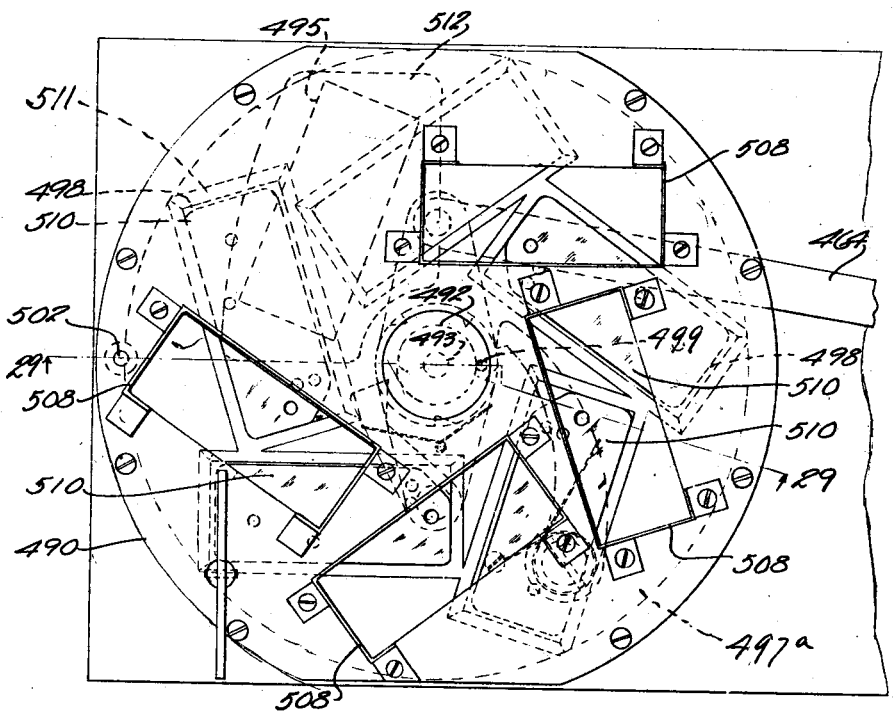
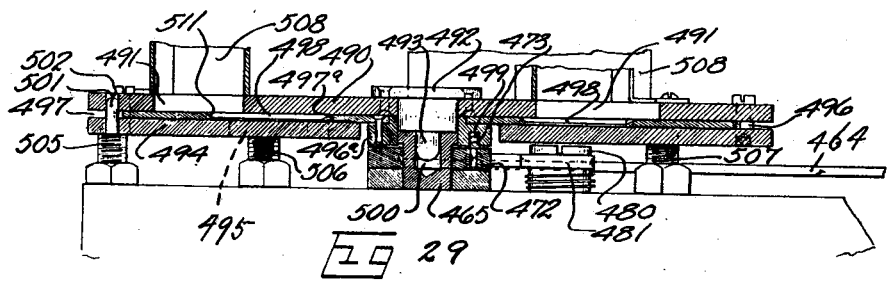
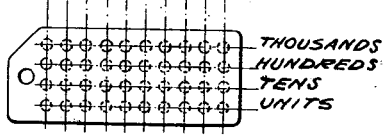

June 5, 1928.  
H. R. BRAND  
1,672,362  
MECHANISM FOR CONTROLLING BUSINESS  
Filed Jan. 6, 1922   22 Sheets-Sheet 14
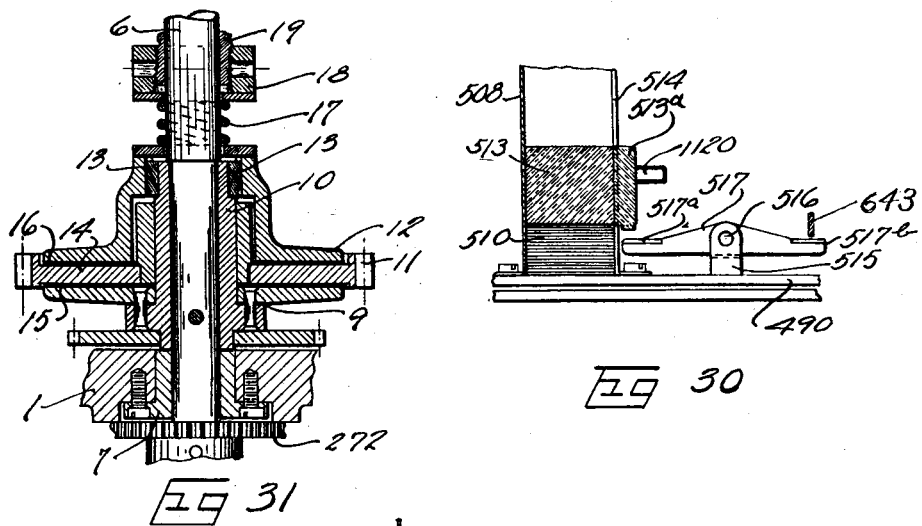
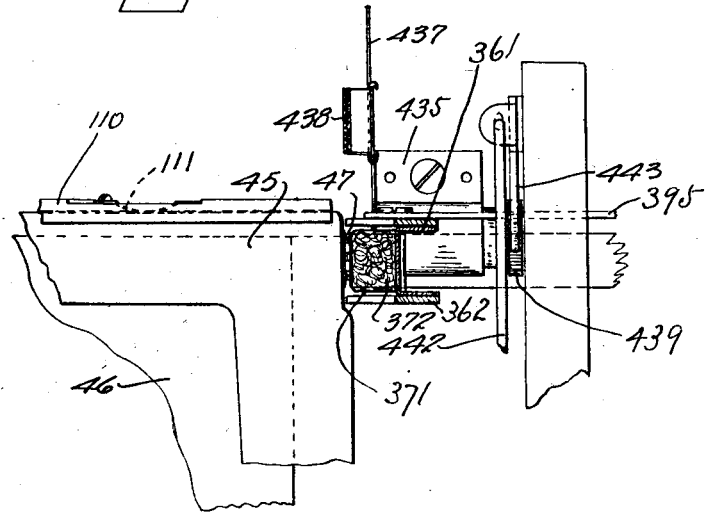
Inventor  
H. R. Brand  
per John D Morgan  
Attorney.

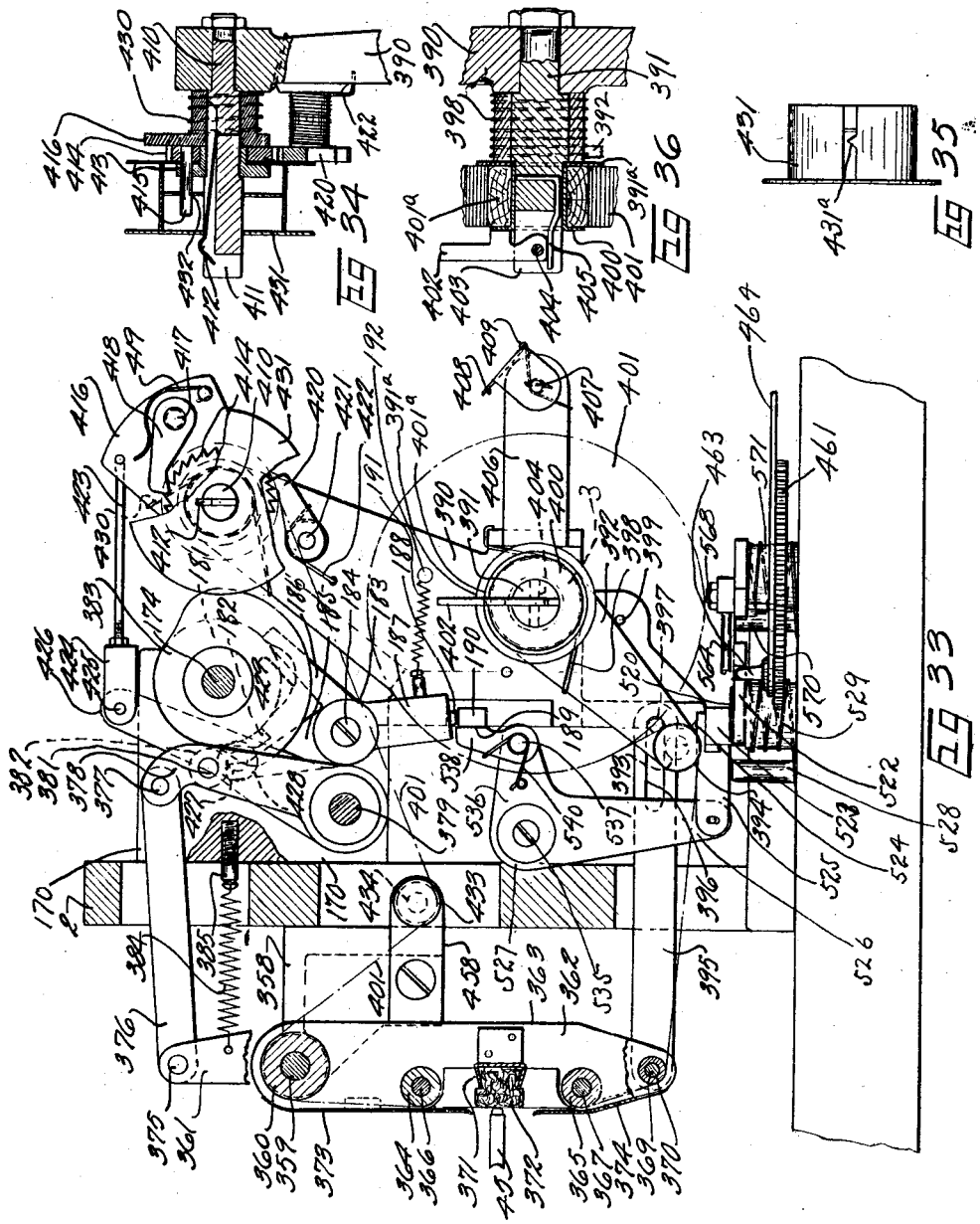

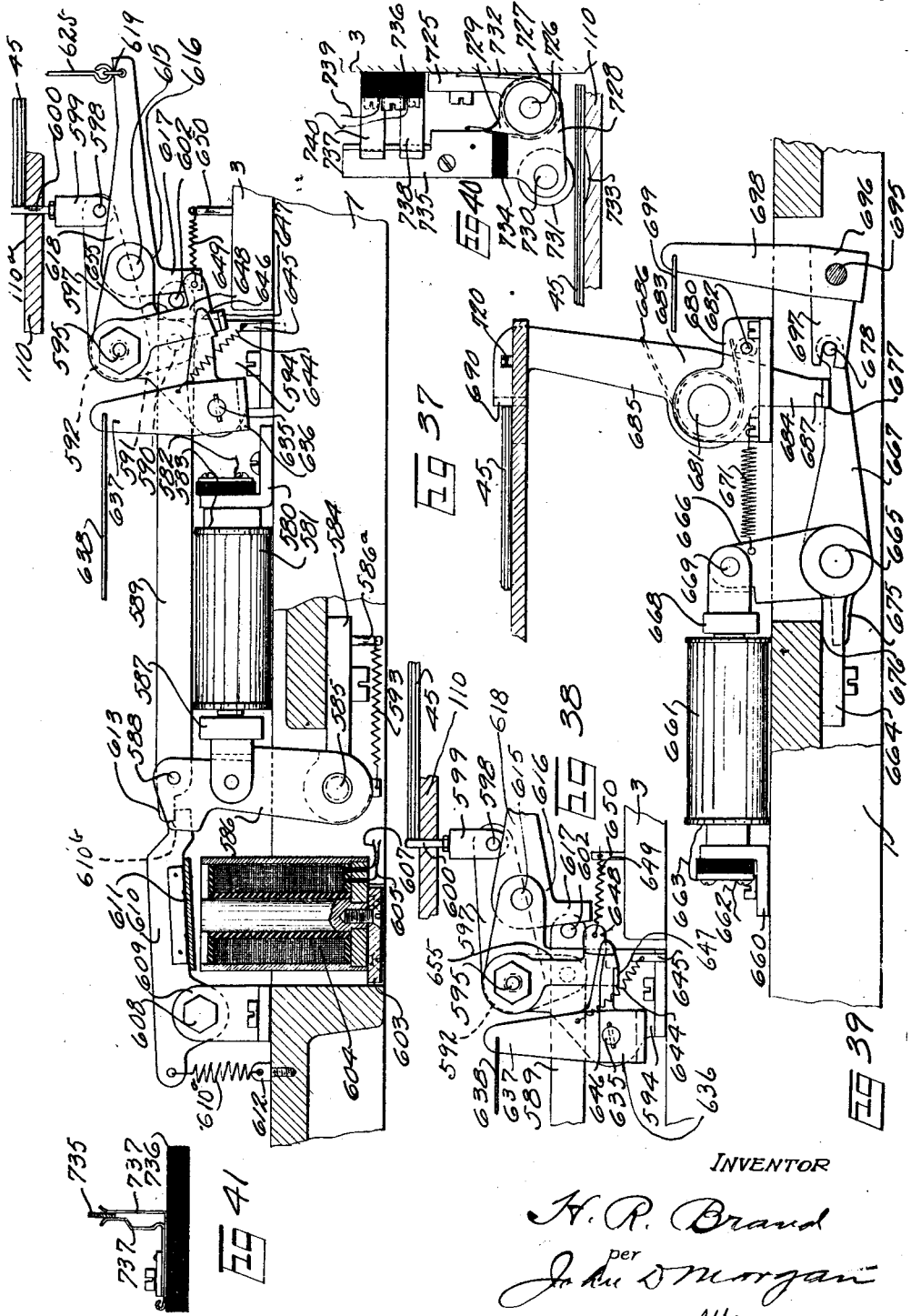

June 5, 1928.
H. R. BRAND
MECHANISM FOR CONTROLLING BUSINESS
Filed Jan. 6, 1922
1,672,362
22 Sheets-Sheet 17
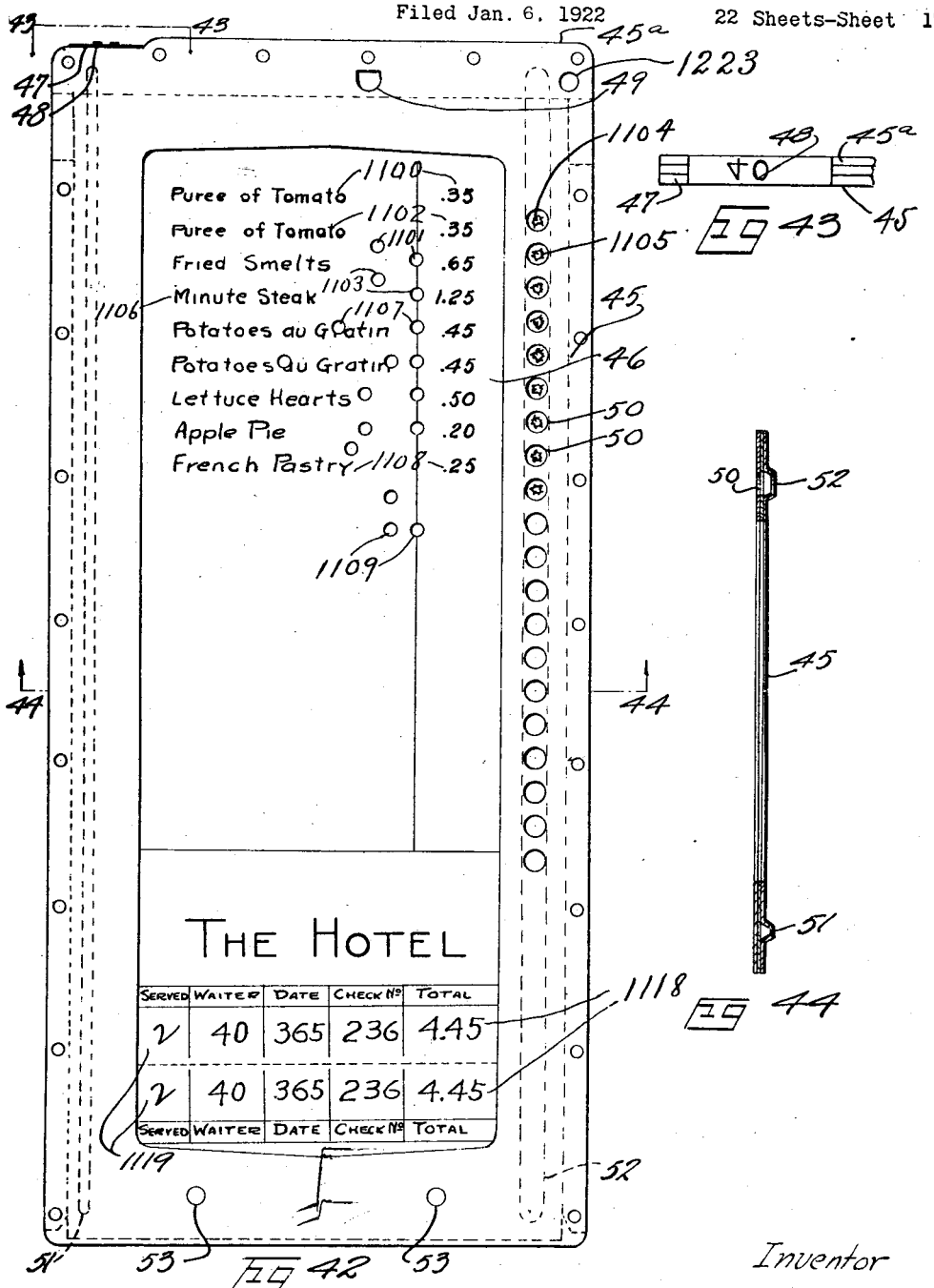

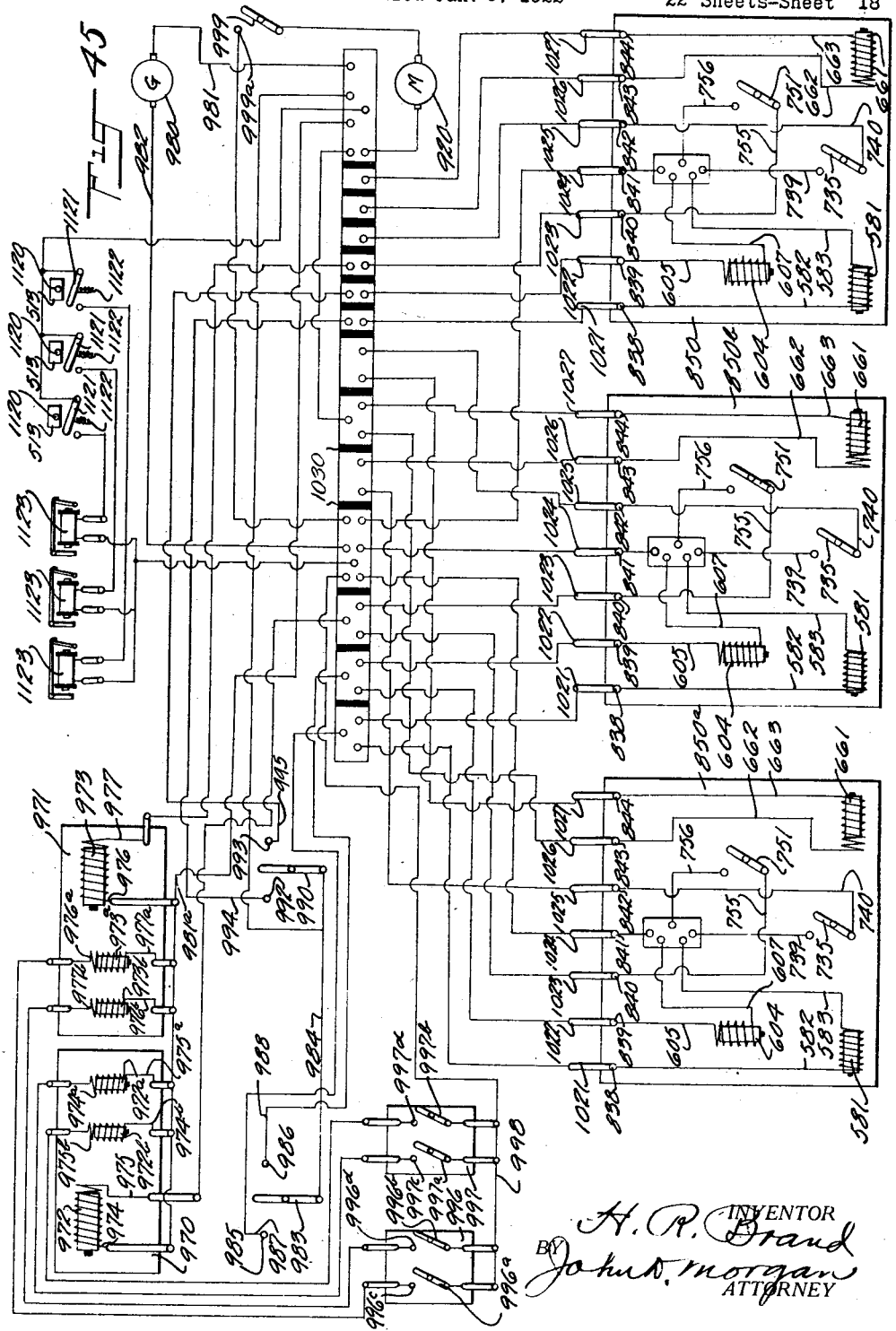

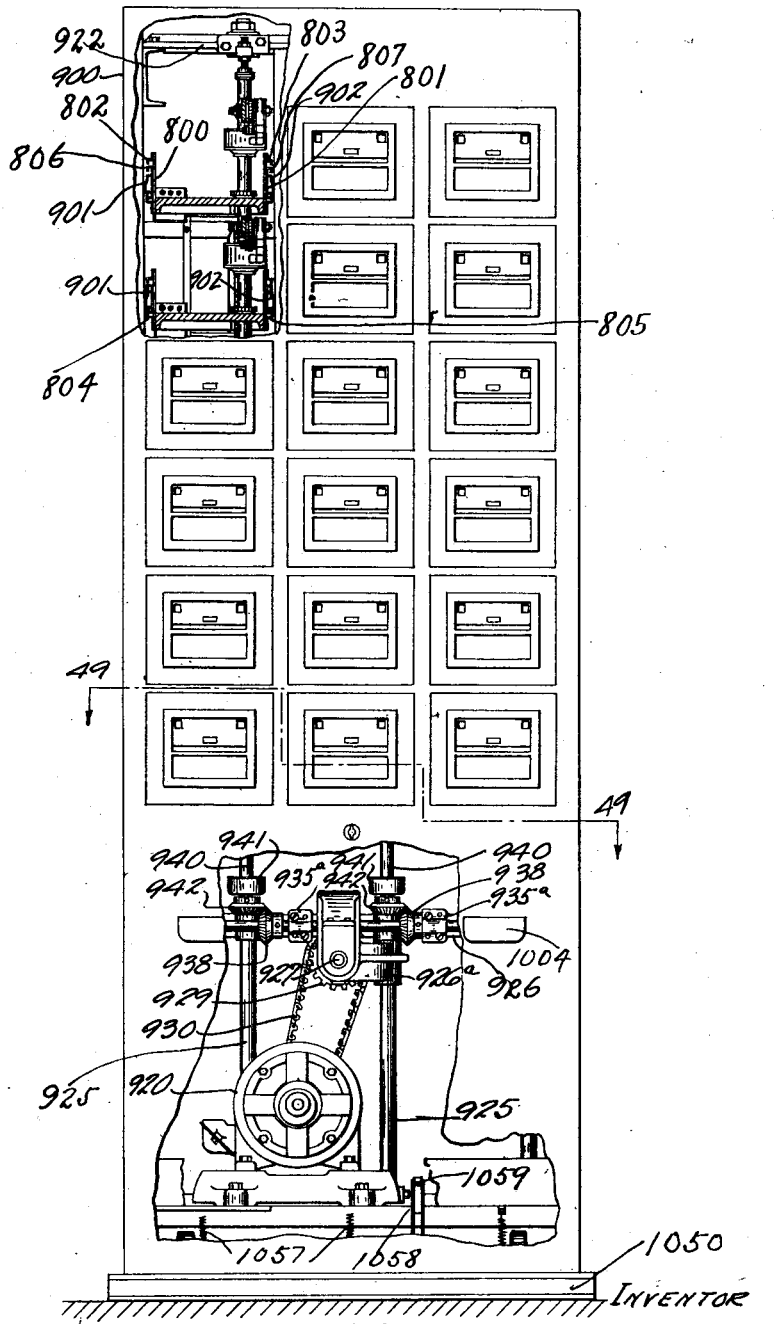

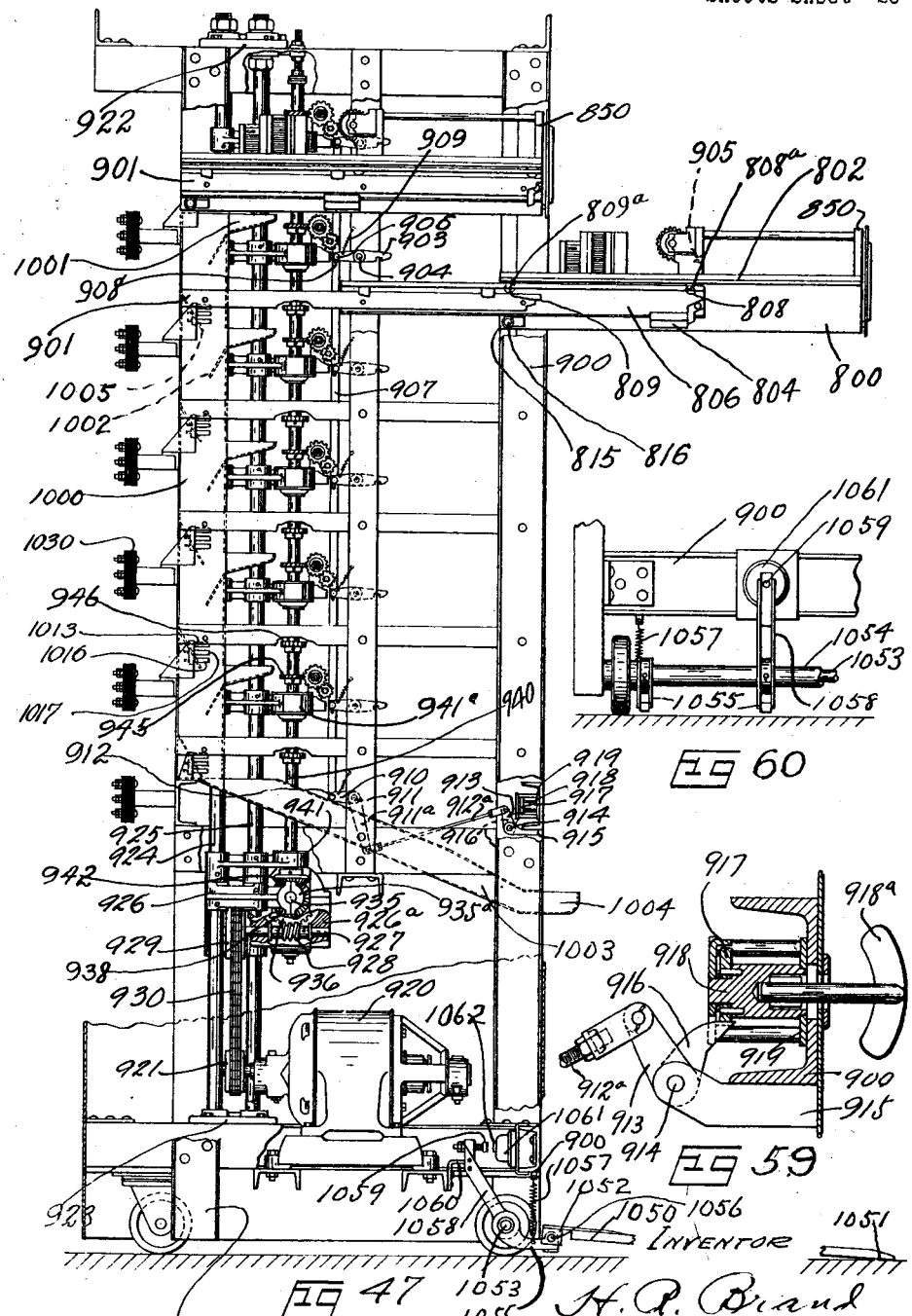

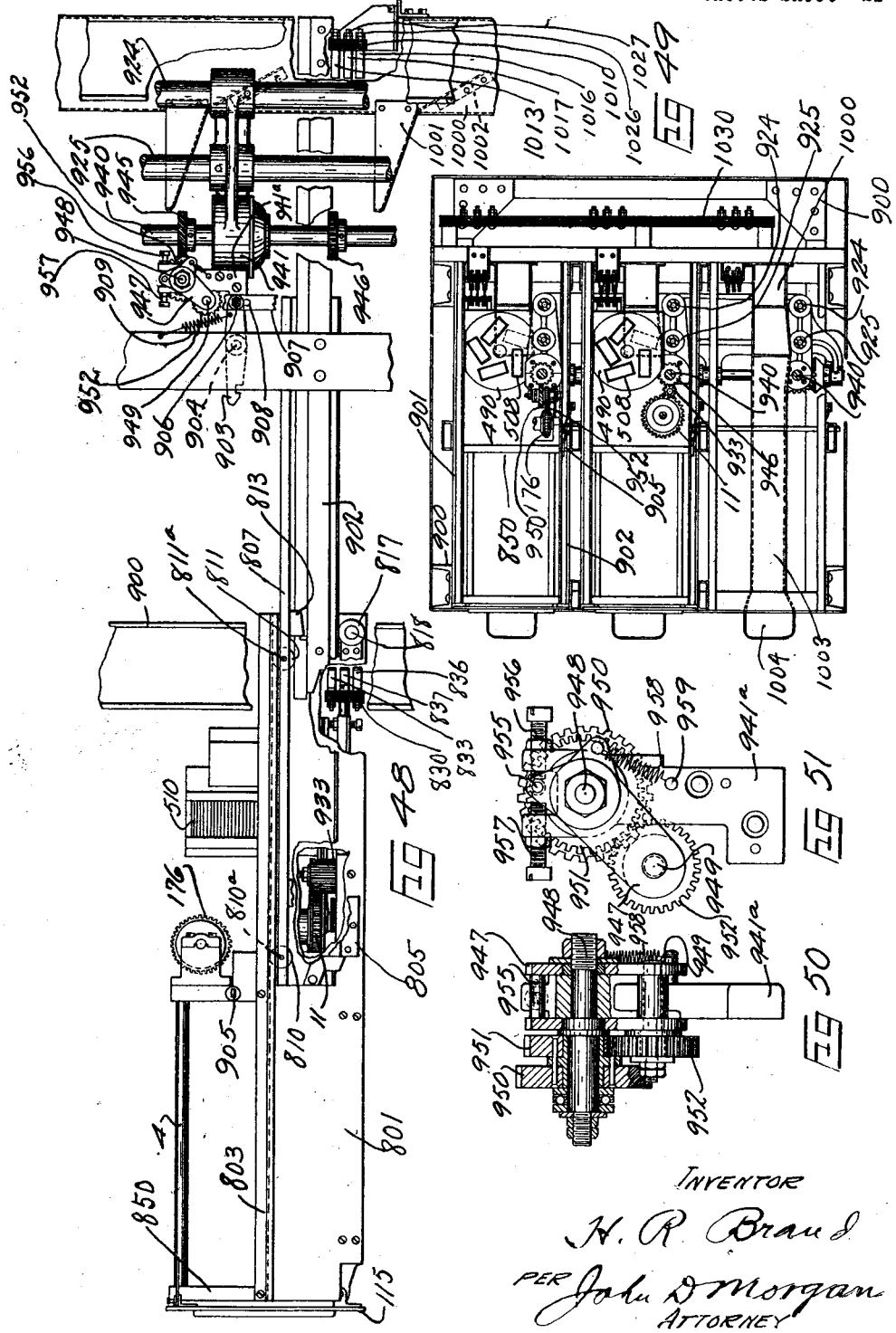

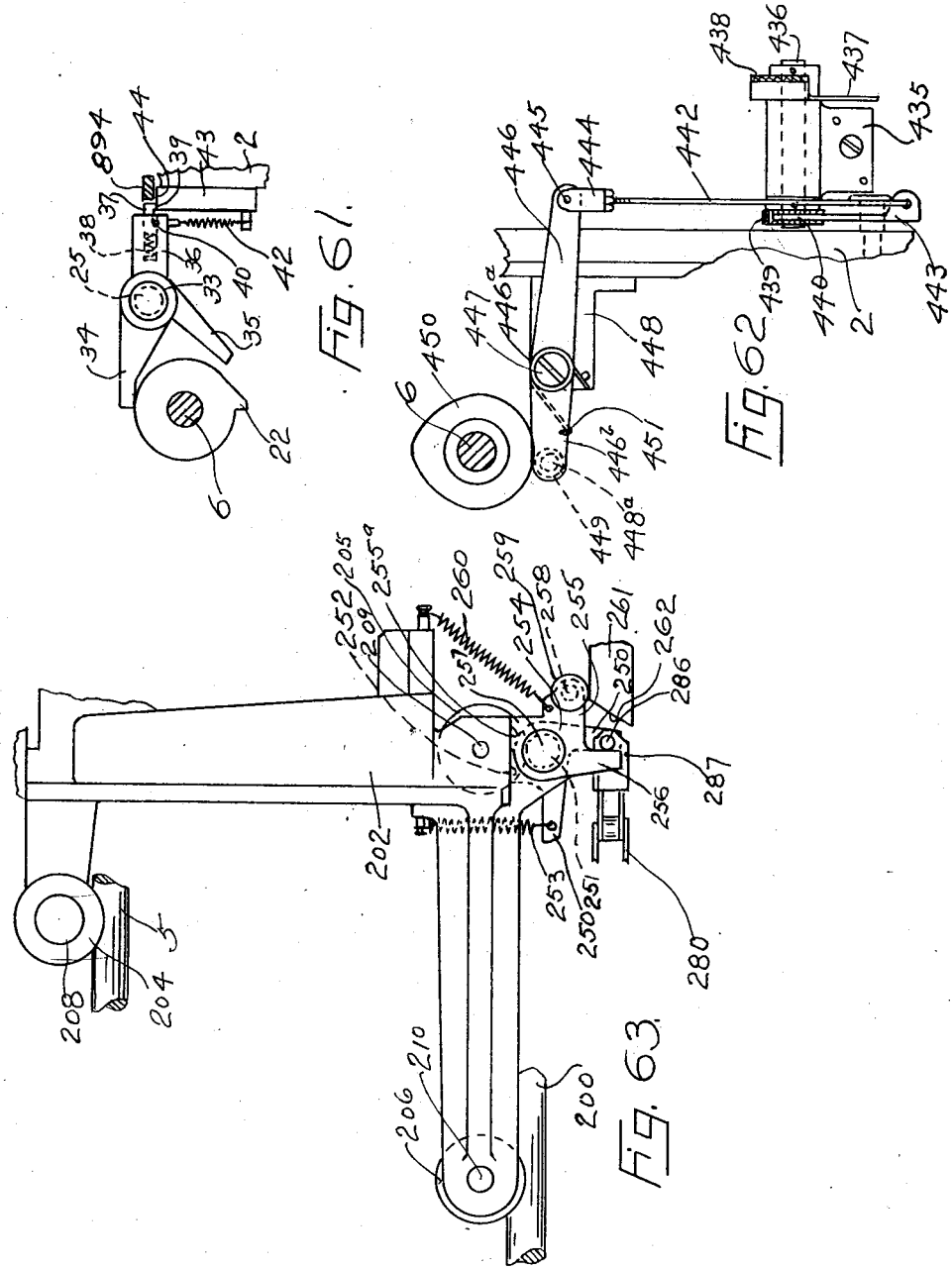

Patented June 5, 1928.

1,672,362

UNITED STATES PATENT OFFICE.

HARRY RUSSELL BRAND, OF NEW YORK, N. Y.

MECHANISM FOR CONTROLLING BUSINESS.

Application filed January 6, 1922. Serial No. 527,516.

The invention relates to a system and automatic mechanism for the involuntary recordation of the exact status of a business, such as charging, crediting, pricing, totaling, tabulating, checking, and other control of the sale, inventorying, or other dispensing or handling of commodities; and in certain of its aspects, as here embodied, it relates more particularly to such a system and mechanism adapted for restaurants or other food purveying or serving establishments.

Objects and advantages of the invention will be set forth in part hereinafter and in part will be obvious herefrom, or may be learned by practice with the invention; the same being realized and attained by means of the instrumentalities and combinations pointed out in the appended claims.

This invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 5 is a front elevation, looking at Figs. 1 and 2 from the right and Fig. 3 from the left, on an enlarged scale, with the front plate dropped;

Fig. 6 is a longitudinal vertical section taken on the line 6—6 of Fig. 1;

Fig. 7 is a central longitudinal vertical section, taken substantially on the line 7—7 of Fig. 1, looking in the direction of the arrows;

Fig. 8 is a horizontal section through the entire machine, taken substantially on the line 8—8 of Fig. 3, with certain parts omitted;

Fig. 9 is a transverse vertical section, on an enlarged scale, taken substantially on the line 9—9 of Fig. 1 with certain parts omitted, and with the punching mechanism in the central part of the figure broken away, this mechanism being shown in Fig. 12;

Fig. 10 is a front elevation of the machine, on a greatly diminished scale, looking at Fig. 1 from the right;

Fig. 11 is a fragmentary horizontal section, corresponding to the central part of Fig. 8, and showing the rear portion of the carriage driving mechanism;

Fig. 12 is a fragmentary view, corresponding to the upper and central part of Fig. 9, and showing the central part of the carriage, including the punching mechanism which is omitted from Fig. 9, and also showing the check holder or insert frame in position with respect to the punching mechanism;

Fig. 13 is a view corresponding to Fig. 12, but looking thereat from the rear, and with the mechanism in a different position;

Fig. 14 is a partial elevation and partial section taken substantially on the line 14—14 of Fig. 12, and showing the operated or set punch of the printing mechanism;

Fig. 15 is a fragmentary perspective detail of the setting mechanism for the price-marking punches shown in the preceding figures;

Fig. 16 is a fragmentary detail elevation, on a reduced scale, of the mechanism for inking the commodity printing means;

Fig. 17 is a fragmentary detail in plan and horizontal section of the carriage stop which cooperates with the carriage positioning pin;

Fig. 18 is a fragmentary detail, in elevation and vertical section, taken substantially on the line 18—18 of Fig. 17;

Fig. 19 is a fragmentary detail, in elevation and vertical section, of the carriage detent mechanism and release therefor;

Fig. 20 is a fragmentary detail perspective view of the actuating mechanism for the carriage positioning mechanism;

Fig. 21 is a fragmentary detail, in elevation and vertical section, of the machine release or starting mechanism operated by the check frame and cooperating parts;

Figure 1:
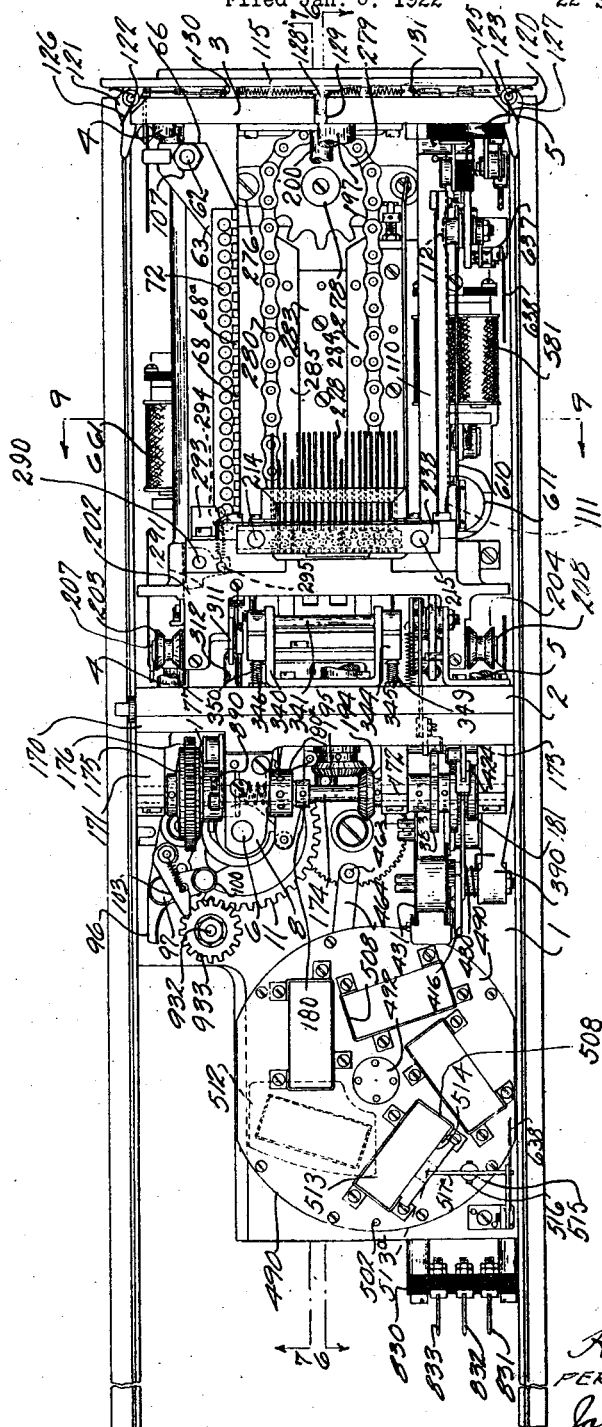
Fig. 1 is a top plan of the present preferred embodiment of the invention.
Figure 2:
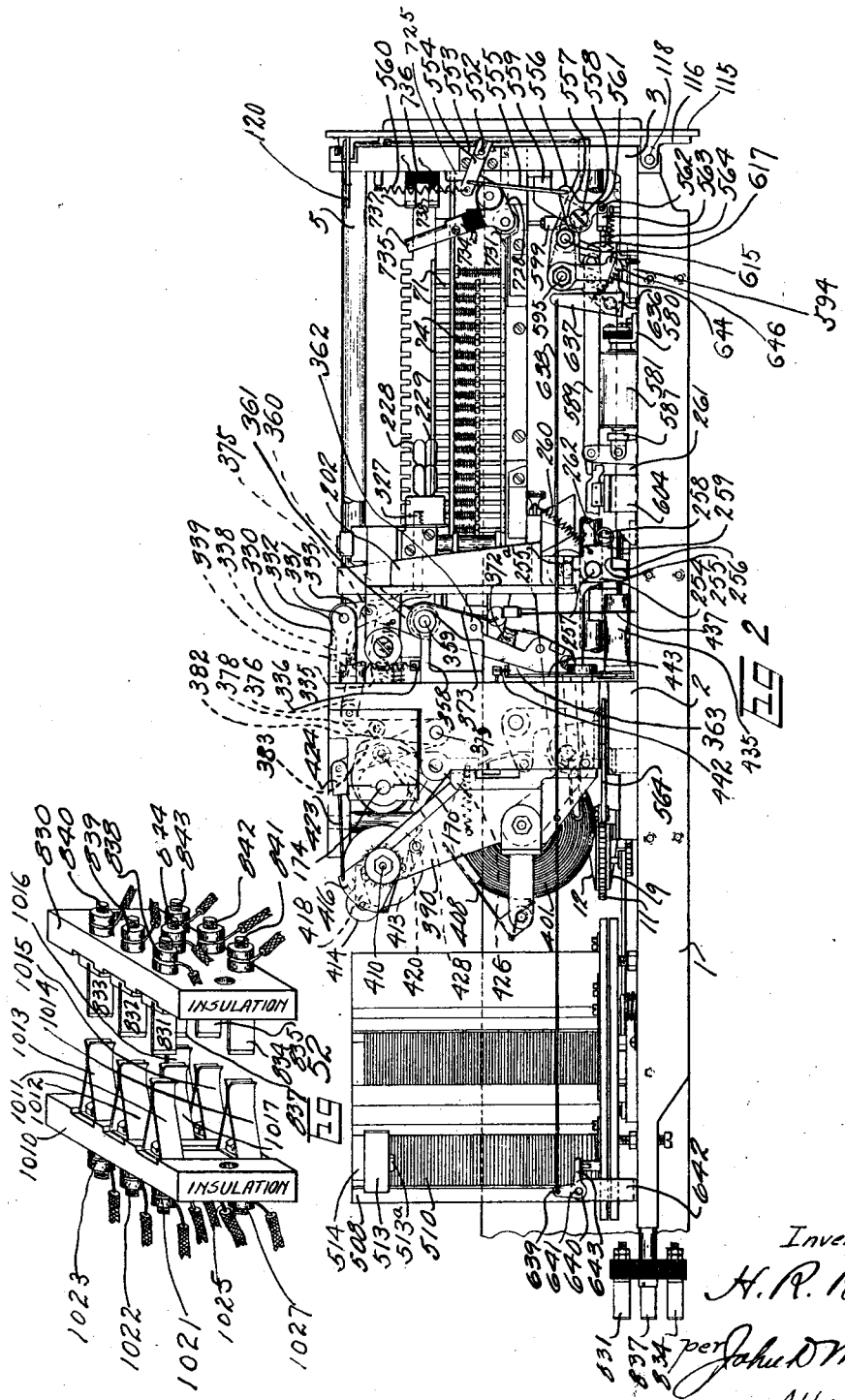
Fig. 2 is a side elevation looking at Fig. 1 from the bottom thereof of the sheet, with the side plate and certain other parts removed.
Figure 3:
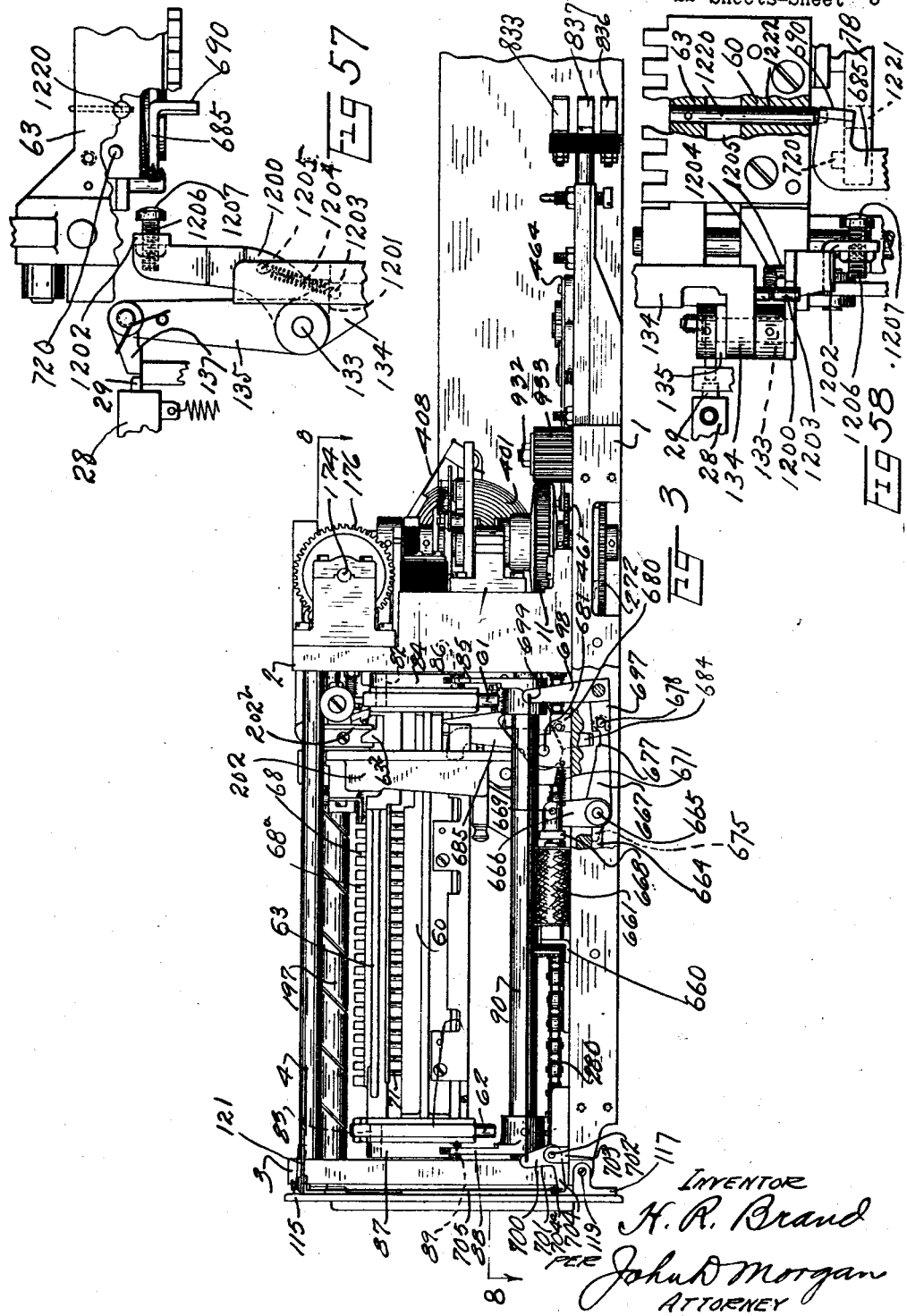
Fig. 3 is a side elevation of Fig. 1 looking thereat from the top side of the sheet, and having the side plate and certain parts removed.
Figure 4:
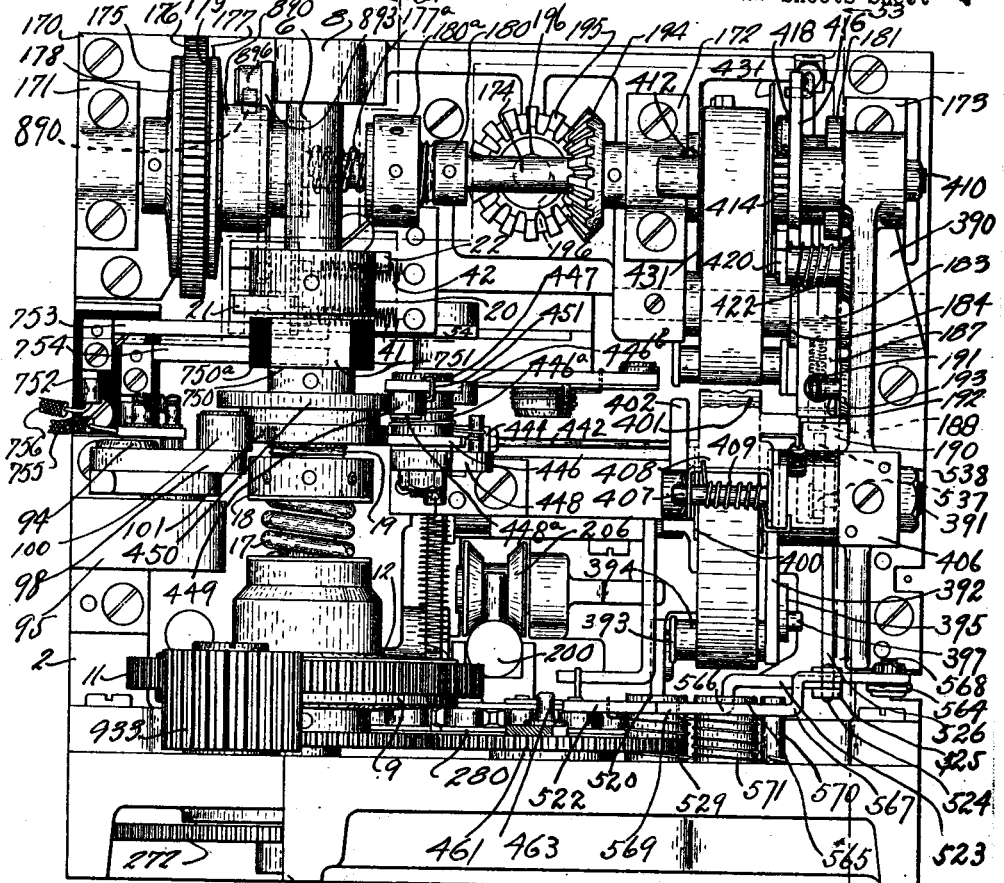
Fig. 4 is a rear elevation, looking at Figs. 1 and 2 from the left, and Fig. 3 from the right, on an enlarged scale, with the token magazine and part of its actuating mechanism and other parts omitted.
Figure 53:
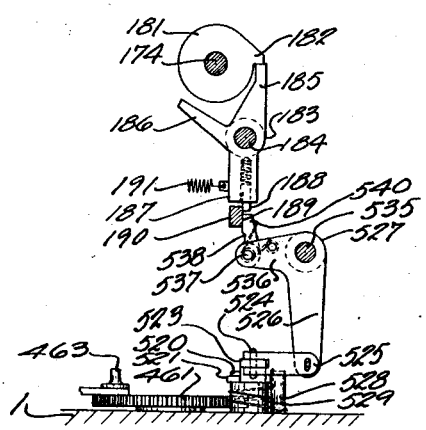
Figure 54:
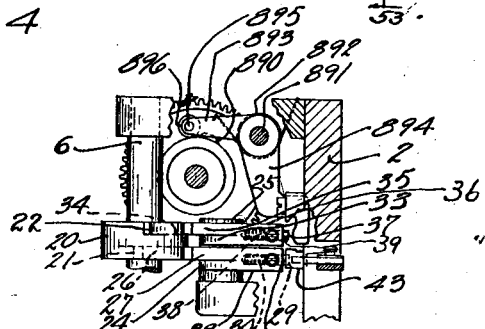

Fig. 22 corresponds to Fig. 21, but shows the mechanism in a different position;

Fig. 23 is a fragmentary detail, in plan and horizontal section, of the remainder of the machine release or starting mechanism which is operated by the mechanism shown in Figs. 20 and 22;

Fig. 24 is a similar view of the mechanism shown in the upper part of Fig. 23, but in a different position;

Figs. 25, 26 and 27 are fragmentary details, showing different positions of the carriage engaging and driving mechanism;

Fig. 28 is an enlarged top plan of the token storing and supplying mechanism with the mechanism in a position other than normal, and with the tokens removed from the chutes;

Fig. 29 is a vertical transverse section taken on the line 29—29 of Fig. 28, with the upper part broken away, but without tokens and with the mechanism in a position other than normal;

Fig. 30 is a detached detail, of a part of the stop mechanism operated when the supply of tokens approaches exhaustion;

Fig. 31 is a detail fragmentary section of one of the driving mechanisms;

Fig. 32 is a fragmentary plan of the identification printing means;

Fig. 33 is a fragmentary detail in elevation and vertical section, on an enlarged scale, of the escapement mechanism for one of the cam shafts and of the paper roll feeding and impression mechanisms;

Fig. 34 is a sectional detail of the winding spool mechanism for the paper roll;

Fig. 35 is a detached detail in elevation of the winding spool of Fig. 34;

Fig. 36 is a fragmentary detail section of the paper supply roll;

Fig. 37 is a fragmentary detail, in elevation and vertical section, of the means for locking the machine upon depletion of the tokens for the commodity and from a remote source, and of the unlocking of same;

Fig. 38 is a view corresponding to the upper right-hand portion of Fig. 37, but showing the mechanism in a different position;

Fig. 39 is a framentary view in elevation and vertical section of the mechanism for locking one unit or machine from another automatically;

Fig. 40 is a detail of the controlling switch in one machine for the mechanism of Fig. 39 in another machine or unit;

Fig. 41 is a detached detail of the switch contact shown at the top of Fig. 40;

Fig. 42 is a detail of the unit operating device or frame, which holds the guest-check or other record-receiving card;

Fig. 43 is a fragmentary elevation looking from the line 43—43 at Fig. 42;

Fig. 44 is a section taken on the line 44—44 of Fig. 42, looking in the direction of the arrows;

Fig. 45 is a wiring diagram of the circuits and controls for a unit and group of units;

Fig. 46 is a front elevation of a correlated group of units with a common drive therefor, with parts broken away and parts in section;

Fig. 47 is a side elevation, with parts broken away and parts in section and the casing removed, looking at Fig. 46 from the left, and showing the machine units in skeleton only, and showing one of the machine units withdrawn for inspection or service;

Fig. 48 is a fragmentary elevation, greatly enlarged, with parts broken away, showing a unit in the withdrawn position, as in the upper part of Fig. 47, but looking thereat from the opposite side, the unit itself being represented in skeleton;

Fig. 49 is substantially a section taken on the line 49—49 of Fig. 46, with one of the machine units omitted;

Figs. 50 and 51 are fragmentary details of the automatically connecting drive between the various units and common driving mechanism mounted in the frame;

Fig. 52 is a fragmentary perspective of the electrical circuit connection block between a unit and the frame;

Fig. 53 is a greatly reduced, detached fragmentary vertical section, taken substantially on line 53—53 of Fig. 4;

Fig. 54 is a greatly reduced, fragmentary vertical section, taken substantially on line 54—54 of Fig. 4;

Figs. 55 and 56 illustrate a form of token for use with the controller; and

Figs. 57 and 58 show a modified form of the frame registering and locking and the machine releasing mechanism.

Fig. 59 is a fragmentary, vertical sectional detail of the device for locking the units in the frame, shown also at the right central part of Fig. 47;

Fig. 60 is an enlarged fragmentary elevation at the lower right hand part of Fig. 47, looking thereat from the right;

Fig. 61 is a fragmentary plan view, on an enlarged scale showing one of the escapement mechanisms of the main cam shaft;

Fig. 62 is a fragmentary plan view, on an enlarged scale, of the mechanism for operating an ink pad;

Fig. 63 is an enlarged view of the carriage, as seen in Fig. 7, with parts removed, and showing a portion of the driving chain with parts cooperating therewith.

An object of the present invention in itself, and also in conjunction with my other cooperating inventions, is to provide an intrinsic or involuntary control for the business, which is operated and expressed by the business itself whereby the complete and immediate information requisite and helpful for the correct, efficient and profitable management of the business is immediately conveyed or rendered available to the managing authority essentially during and by reason of the transaction of the business.

By my general invention the transaction of the business, without impeding such transaction, is conducted so that the business of each day produces immediately available for the controlling person or authority the information necessary or pertinent to the immediate management of the business. In other words, at the close of business each day, the managing authority has all essential facts, such as volume and value of sales of each commodity, prices of units, identity of salesmen and supplymen or other dispensers, inventory decreases or changes, and so on.

That is, immediately at the end of each day there is infallibly furnished involuntarily (as do in their spheres the compass, the steam gage, the speedometer and the like), without the assistance or employment of any kind of mathematical or accounting labor, all requisite managerial data, much of which data in the present usual and ordinary transaction of business is not obtainable at all, and that data which is obtainable in the present and ordinary transaction of business can be deduced and gotten together only by much extra labor and expense.

The invention provides means and instrumentalities which involuntarily compute and indicate business transactions.

In addition my invention at the end of each day immediately detects losses, that is, discrepancies between sales and inventories or supplies.

The instrumentalities employed in carrying out my invention comprise the controller, which is exemplarily disclosed in detail herein, at a sales, or equivalent, station, and cooperating therewith a token receiver or depository and an order or transaction recording and announcing device, located at the supply station; and preferably also a totalizing machine, all operated necessarily and involuntarily in the transaction of the business and without impeding or incumbering the business, but on the contrary, tending to expedite and facilitate it.

The various devices or instrumentalities broadly referred to above are referred to more in detail hereinafter, including references to copending applications in which they are exemplarily disclosed in detail.

By my system and mechanism of commodity purveying the selling agent is compelled involuntarily to mechanically make a record which is non-accessible to him and accessible only to his supervisor of the kind and quantity of commodity sold in a given transaction together with the identity of the selling or purveying agent and is also compelled involuntarily to automatically make or record a demand on a supplying agent or source for the particular kind and quantity of commodity, and as a result of recording the transaction is provided with a demanding means to be served on the supplying agent, who in turn must deposit or make a record against himself by means of said demanding means, which record is likewise non-accessible to himself and is only accessible to said supervisor. The demanding means referred to is preferably a token or coin delivered from an inaccessible source to the selling or purveying agent while he is recording the transaction and which must be deposited preferably by the supplying agent in a depository, accessible only to his supervisor, in order to credit said supplying agent for the commodity demanded by and delivered to the selling or purveying agent.

Broadly defined, as embodied, automatically operating recording mechanism is provided in a locked closure and into this the selling agent inserts a device, such as a sheet, or the like, whereon may be imprinted or otherwise marked, the name of a commodity and its price. Such insertion of said device records within the locked mechanism the identification mark for the particular selling agent; adds this particular sale to the inaccessible record of the total number of sales; records at or announces to a distant supply station the making of the sale and utters from an inaccessible source the token representing and demanding the commodity sold. The token so uttered is delivered by the selling agent to the supplying agent, or means as the authority of the supplying agent for delivering the commodity which has been sold. The supplying agent to be credited for the commodity delivered to the selling agent deposits the token in an inaccessible receptacle and thereby he is automatically credited with the delivery of the goods and the deposited token is also recovered by the auditor or other supervisor, the number of tokens so recovered must tally with the number uttered from the recording machine to square the accounts of the selling agent and the supply agent with the auditor or other supervisor.

In the adaptation of the invention to restaurant or dining room service, the guest's check is also, during the previously described recording operations, automatically imprinted with the name and price of each commodity or esculent which he has ordered, and receives marks designating the price, and in another machine the charges for the commodities are added or totaled, the total being printed on the check for the guest, and also a record is made of this total in said machine as a part of the total sales of the business.

Briefly preliminarily describing the illustrated embodiment, within the locked closure are guideways for a frame containing a guest check. When this frame is inserted, it starts the machine and the machine locks the frame against withdrawal until the cycle of operations is completed. A traveling carriage has printing and punching mechanism which prints the name and price of the commodity on the guest check and perforates the check with representation of the price so that it may be totalized by the totalizing machine, and its total included or recorded in the gross sales as recorded in the totalizing machine. Another mechanism automatically prints the number or other identifying mark of the selling agent on a record strip, and an adding device representing the total sales of the particular machine is actuated. Within the locked inclosure is the token receptacle and a token is automatically uttered or issued therefrom for the purposes already described. A device also operates an indicating device at the supply station, and makes a record charging the supply station with an order which record is later canceled by the token.

There are other features, functions and means which will be set forth for the first time in connection with the following detailed description of the invention, and it will be understood that the foregoing general and the following detailed description are explanatory and not restrictive of the invention.

In the embodied mechanism, two cam shafts (conveniently styled, the first and second) control the operations of the machine, and the first one is started by the insertion of the actuating device by the selling agent. The first cam shaft makes a half turn and is stopped. During this half turn, the carriage positioning means are set; the carriage is released and is driven to the set point, ready to print upon and perforate the guest check, which is within the actuating frame; the token is ejected; the order is announced in the kitchen; the order is counted on the total order indicator; and the second cam shaft is started.

The second cam shaft then makes a complete rotation, by which the guest check is printed and perforated; the identifying mark for the sales agent is recorded; and the first cam shaft is released.

During this second half revolution of the first cam shaft, the carriage is returned to initial position; and the set carriage positioning means are restored and the actuating frame released for withdrawal. A full statement of operation is given later, but the foregoing will be of service in a preliminary understanding of the functions and structure of this present preferred embodiment.

In the general frame of the machine, a base 1 (Figs. 1, 2, 3, 4, 5, 6, 7, and 8), has mounted thereon and fixed thereto the brackets 2 and 3. The rods 4 and 5 (see also Fig. 9) are fixed to the brackets 2 and 3, and are also utilized as carriage guides. Referring now to the embodied form of the general operating means, one end of a shaft 6 (Figs. 1, 4, 7, 8, and 31) is rotatably mounted in the bushing 7 fixed to the base 1, the other end being similarly carried in bearing 8. A hubbed flange 9 (see Figs. 4 and 31) is fixed to the shaft 6, the hub 10 of which has freely mounted thereon a gear 11, adapted to be driven from any suitable source or power. A flange 12 opposed to the flange 9 is slidably mounted on the hub 10, being held against independent rotation by means of the feathers 13, but is free to slide in the direction of its axis.

The web 14 of the gear 11, which is interposed between the opposed flanges 9 and 12, operatively carries on either side the disks 15 and 16, preferably of a frictional material such as cork. A spring 17 is adjustably mounted for tension, preferably about the shaft 6, the adjustment being controlled by a threaded nut 18, which is in operative contact with a threaded hub 19, fixed to the shaft 6. The desired frictional contact may thus be obtained between the flange 9, the disk 15 and one side of the web 14 of the gear 11 and between the flange 12, the disk 16 and the opposed side of the web 14. It will be obvious from the foregoing that with the constant rotation of the gear 11, the flanges 9 and 12 and the shaft 6 may rotate therewith.

The controlling means for the first cam shaft, as embodied, comprises a hub 20 (Figs. 4, 7 and 8) fixed to the shaft 6, which has a tooth 21 in a certain plane at right angles to its axis, and also a tooth 22 with a corresponding working face substantially 180 degrees apart from that of the tooth 21, but in a plane at right angles to the axis of the hub 20 other than that of the tooth 21. A rocker 24 (see also Figs. 23, 24 and 54) rotatably mounted on a stud 25 fixed to the bracket 2, has an arm 26 arranged to coact with the tooth 21 and normally in operative contact therewith. An arm 27, also a part of the rocker 24, is so arranged as to be projected in the path of the tooth 21 when the rocker 24 assumes the desired position. A projection 28 of the rocker 24 has slidably mounted therein a plunger 29 in operative contact with a spring 30, under compression, and having a face 31 adapted to coact with a pin 32, fixed in the projection 28 to hold the plunger 29 from rotation on its axis and also to limit the position of the plunger 29 against the action of spring 30.

Also similarly mounted on the stud 25 (Figs. 54 and 61), is a rocker 33 substantially the same as the rocker 24 and having the same relative arms 34 and 35, the projection 36, the plunger 37, the spring 38, the face 39 and the pin 40, and adapted to coact similarly with the tooth 22.

One end of a spring 41 under tension is fastened to the rocker 24, the other end being fixed to the bracket 2. Similarly a spring 42 is attached to the rocker 33 and the bracket 2. A plate 43 having a face 44 is fixed to the bracket 2, the face 44 being operatively adjacent to the faces 31 and 39 of the plungers 29 and 37 respectively and adapted to prevent the partial rotation of the rockers 24 and 33 under action of the springs 41 and 42 excepting when desired. It will be evident from the foregoing that the rockers 24 and 33 are adapted to prevent the rotation of the shaft 6 excepting when desired, the frictional engagement of the gear 11 and the shaft 6 permitting this condition.

As already stated, the illustrated embodiment is exemplified as applied to restaurant or dining room service, and the selling agent (in this case, the waiter) effects his operation of the commodity recording and ordering mechanism by means of a frame inclosing the guest's check, which latter may be substantially the same as guest checks in ordinary use. In said embodied form, a frame 45 (Figs. 42, 43 and 44) with an edge 45a is adapted to carry an insert 46 upon which certain operations are to be performed as will be hereinafter described. This in a restaurant would be the guest check. This frame is substantially the same as that described in the application filed February 12, 1921, Ser. No. 440,502, of A. L. Saltzman. An edge 47 substantially parallel with the edge 45a and suitably adjacent thereto, carries as a part thereof the relief characters 48 for the purpose of recording, within the machine described herein, each operation of the particular frame used in connection with the operation of the machine as will be hereinafter described. A hole 49, and the holes 50, 50 in the frame 45, are operatively positioned for coacting with certain elements of the machine herein described and for the purposes hereinafter referred to. The ribs 51 and 52 are so arranged that, in conjunction with the construction of certain of the mechanisms, the frame 45 can only be used in its operative position as will hereinafter appear. The holes 53, 53 are for the purpose of puncturing the insert 46 so as to bind it in a fixed position within and relative to the holder 45.

Means are provided for guiding and positioning the check holder, or other insert or like device, into the machine, and for positioning a slidable carriage (later described), which is provided with types and punches, to print upon and perforate the guest check, or other record. As embodied, a block 60 is fixed to the brackets 2 and 3 (Figs. 1, 3, 7, 9 and 20) and carries the guide rods 61 and 62 fixed thereto. A frame 63 having the bearings 64, 65 and 66, 67 operatively placed with respect to the rods 61 and 62, respectively, is adapted for movements longitudinally on the rods 61 and 62. The frame 63 has teeth 68a, 68a with equal spaces 68, 68, therebetween, as a part thereof and the block 60 has a plate 69 fixed thereto, with the teeth 70a, 70a with the equal spaces 70, 70 therebetween, and which are substantially the same as the teeth 68a, 68a and spaces 68, 68, and, when desired, in operative alignment therewith.

The pins 71, 71, having shouldered heads 72, 72, are freely mounted in both the block 60 and the frame 63. The heads 72, 72 of the pins 71, 71 normally rest against a plate 73, which is fixed to the frame 63. The springs 74, 74 under tension, embracing the pins 71, 71, each have one end abutting against the block 60 and the opposed end abutting against the collars 76, 76, fixed to the pins 71, 71.

As a guide for the frame 45a, a slot 75 (see also Fig. 5) is suitably positioned in the block 60, which latter has holes 79, 79 in the side 78 in alignment with the pins 71, 71, and adapted to provide for the pins 71 a free passage therethrough. The pins 71 may have their ends, opposed to the heads 72, slightly tapered to facilitate puncturing the check or other insert 46, if desired, and to make the withdrawal of the pins 71 from a puncture so made, easy of operation, functions hereinafter described.

The frame 63 (Figs. 3 and 9) has the pins 82 and 83 rigidly fixed thereto and conveniently adjacent, respectively, to the bearings 64 and 66. Rotatively mounted on the pin 82 (see also Fig. 20) is one end of a toggle link 84, the opposite end being operatively connected to an end of the arm 85 by means of a pin 86. Similarly arranged is a toggle link 87, rotatively mounted on the pin 83, and operatively connected to an arm 88 by means of a pin 89. The arms 85 and 88 are fixed to a rock shaft 90 which is rotatively mounted at substantially either end in the brackets 2 and 3.

An arm 91 (Figs. 8 and 20) is also fixed to the shaft 90, and is operatively engaged by an arm 92 of a rocker 93, which is rotatively mounted on a stud 94, fixed to a bracket 95, rigidly attached to the bracket 2. An arm 96 of the rocker 93 has fixed thereto a stud 97, upon which is rotatively mounted an arm 98, carrying a stud 99, fast thereto.

Rotatively mounted on the stud 99 is a roller 100, operatively adjacent to a cam 101, fixed on the shaft 6. A pin 102, fast to the arm 98, operatively engages a pawl 103, which is freely carried on a stud 104, fixed to the arm 96. A spring 105, under tension, has one end attached to the pin 102, the opposed end being fast to the stud 104. A spring 106, under tension, is adapted to act on the pawl 103, to keep the pawl in engagement with the pin 102.

The desirable relation of the cam 101 and the roller 100 is such that in the normal position of rest of the shaft 6 the frame 63 is held in its raised position thus holding the pins 71 out of the path of the frame 45 when the latter is inserted in its guiding slot 75. As illustrated, the high dwell of the cam 101 effects this condition.

A nut 107 (Figs. 1 and 7), adjustably mounted on a threaded portion of the rod 62, is arranged to limit the upward travel of the frame 63. It will be obvious, from the foregoing, that the frame 63 may be raised and lowered when rock shaft 90 is partially rotated from the cam 101. It will be understood, also, that a release of the pawl 103 from the pin 102 will permit the same action independently of the cam, when desired. The purpose of this latter feature is to permit the manual operation of the arm 96, the arm 92 and its connecting and cooperating mechanism, as it may be desired to so do for testing purposes, without releasing the shaft 6 and actuating the various units controlled thereby.

It will be understood that the release of the shaft 6, as is hereinafter described, will cause the cam 101, through the connecting mechanism, to actuate the toggle arms 84 and 85 and carry the pins 71, 71, towards an opposed insert for the purpose of impinging upon or passing through the latter for a purpose as in hereinafter described.

The guide for the opposite side for the check-holder, or equivalent insert, includes a channel shaped member 110 (Figs. 1, 5, 6, 9 and 32), fixedly attached to the bracket 3 in the desired alignment with the slot 75. The spring plates 111 and 112 are suitably attached to the edge of the guide 110, with a face of each projecting operatively past one of the guiding faces 113 of the guide 110, the whole for a purpose hereinafter described.

A plate 115 (Figs. 1, 2, 3, 5, 6, 7 and 10), having lugs 116 and 117 as a part thereof, is pivotally mounted on the pins 118 and 119, fast in the base 1, the pins operatively engaging the lugs 116 and 117, respectively. Spring-pressed latches 120 and 121 (Figs. 1 and 5) are rotatably mounted on studs 122 and 123, respectively, which are fast in the brackets 124 and 125, fixed to the plate 115.

Springs 126 and 127, under tension, respectively, act on the latches 120 and 121. The latches are adapted to operatively engage the bracket 3 and securely hold the plate in the desired position.

A guide pin 128, fixed to the plate 115, coacts with the slot 129 in the bracket 3 to perfectly align the plate in one direction with the bracket 3. Stop pins 130 and 131, fixed to the bracket 3, align the plate 115, against the action of the latches 120 and 121, substantially in a position parallel with the opposed face of the bracket 3. A slot 132 (Figs. 6, 7 and 10) in the plate 115 is suitably positioned relatively to the slot 75 and the guide 110 and is adapted to receive the frame 45 in a substantially horizontal position and, under certain conditions, to permit its travel inwardly. The guide 110 and the side 78 of the block 60 are so channelled as to receive the ribs 51 and 52 of the frame 45 only if the edge 45ª is first presented, and the ribs are on the under face. The presentation of the frame 45 to the machine in any other position will preclude its functioning. The plate 115 preferably carries a detachable card 115ª on which may be carried the name of the commodity on which the machine is operated and the designated number of same.

Referring now to the embodied form of mechanism whereby the check-holder or equivalent insert releases, or starts the machine into operation:

Fixed to a rock shaft 133, rotatively mounted in a bracket 134 (Figs. 7, 8, 23 and 24), fast on the bracket 2, is an arm 135, one free end of which carries a stud 136, upon which is rotatably mounted a spring-pressed piece 137. A spring 138, under tension, coacts with the piece 137 to keep the piece against the adjacent face 44 of the plate 43. An arm 139 also fast on the rock shaft 133 has attached to its free end, one end of a link 140, the other end of which is similarly attached to a rocker 141, rotatably mounted on a stud 142, fixed to the bracket 134.

The rocker 141 at its end 144 carries an adjustable screw 145. A pin 146 fixed to the bracket 134 serves as a stop to position the rocker 141 against the tension of a spring 147, which operatively acts on the rocker 141. A bracket 148 (Figs. 7, 21 and 22), fixed to the bracket 2, carries a stud 149, fast thereto. A bell-crank lever 150 is rotatably mounted on the stud 149, and has an arm 151 to which is attached a spring 152, under tension. An arm 153 of the bell-crank 150 has a face 154 operatively adjacent to the screw 145.

Fixed to the arm 153 is a stud 155, upon which is rotatably mounted a pawl 156, carrying on one end a face 157 and a tooth 158. The opposed end of the pawl 156 carries a pin 159 rigidly attached thereto. A plate 160, with the cam faces 162 and 163, is fixed to a bracket 161, fast on the bracket 2, and is operatively positioned with respect to the pawl 156 so that the faces 162 and 163 of the plate 160 may suitably coact with the pin 159 when desired.

A spring 163ª, under tension, is attached to the pawl 156 and tends to keep the pin 159 in contact with the face 163. The arm 153 of the bell crank 149 has fixed thereto a pin 153ª, suitably positioned between the opposed ends of the adjusting screws 164 and 165, which are carried by a bracket 166, fixed to the bracket 148. The screw 164 coacts with the pin 153ª to limit the movement of the arm 153 under tension of the spring 152 and the screw 165 against a thrust of the holder 45, as is hereinafter described.

The bracket 161 has rotatably mounted thereon a rock shaft 167, one end of which has fixed thereto a depending arm 165ᵇ with a projecting lug 165ª, the opposed end having fast thereto a multi-toothed pawl 168. A spring 166ª under tension, is operatively connected with the arm 165ᵇ in a manner to cause partial rotation of the shaft 167, when desired. Fixed to the arm 153 of the bellcrank lever 150 is a toothed projection 169, operatively placed with respect to the pawl 168 and coacting therewith when desired.

Referring now to the second cam shaft (already briefly described or referred to) and the friction drive therefor:

A bracket 170 (Figs. 1 and 4) is fixed to the bracket 2, and has as a part thereof bearings 171, 172 and 173, in which is rotatably mounted a shaft 174. Fixed to the shaft 174 is a disk 175, the hub of which freely carries the gear 176 and slidably carries the disk 177. Friction disks 178 and 179 of material similar to the disks 15 and 16 coact with the disks 175 and 177, respectively, and the opposed sides of the gear 176. The construction and action of this frictional gearing is substantially the same as that adapted to operate the shaft 6, as hereinbefore described. The gear 176 is operatively connected with a source of power and is under constant rotation. A threaded hub 180 is fixed on the shaft 174, and operatively carries a nut 180ª, between which and the disk 177 is a spring 177ª under tension and adapted to maintain the desired and frictional contact between the elements of the driving means.

The escapement mechanism for the second cam shaft, as embodied, comprises a hub 181 (see also Fig. 53), having a projecting tooth 182, which hub is fixed to the shaft 174. A rocker 183 is rotatably mounted on a stud 184, fixed in the bracket 2. The rocker 183 is substantially of the same construction as the rocker 24, and has an arm 185, operatively placed with respect to the tooth 182, an arm 186 adapted to coact with the tooth 182, and a projection 187, having slidably mounted therein a spring-pressed plunger 188, which is operatively placed for contact with a face 189 of a plate 190, fixed to the bracket 2. One end of a spring 191, under tension, is attached to the projection 187, the other end being carried by a pin 192, fixed in a bracket 193, fast to the bracket 2. The action of the spring 191 is in a direction tending to keep the plunger 188 against the face 189 of the plate 190.

In the embodied form of means for releasing the first cam shaft for its second half revolution, a suitable cam piece 890 (Figs. 4, 7 and 54) is fixed to the hub of the disk 177. A stud 891, fixed to the bracket 170, rotatively carries a bell crank 892, having the arms 893 and 894. Fixed to the arm 893 is a stud 895, which has rotatively mounted thereon a roller 896, suitably positioned with relation to the cam piece 890, for operation thereby. The depending end of the arm 894 is so positioned and fashioned relative to the plunger 37 of the rocker 33 that, when desired, the arm 894 may coact with and operate the plunger in a suitable manner.

In the embodied form of actuating mechanism for the mechanism which prints and perforates the guest check or like device, there is fixed to the shaft 174 (Figs. 1, 6 and 4) a mitre gear 194, in mesh with a mitre gear 195, fixed to a shaft 196, rotatably mounted in the brackets 170 and 3, and having the eccentric portion 197. A single rotation of the shaft 174 will give a corresponding rotation to the shaft 196 and complete a throw of the eccentric portion 197 to effect said printing and punching.

Referring to the embodied form of means for printing upon the guest check or equivalent device the commodity name and price and punching the check with perforations representing the price for recognition by the adding or totalizing machine, a reciprocating carriage, carrying the printing and perforating means is employed. In said embodied form, a rod 200 is fixed to a bracket 201 fast to the base 1, the outer end being supported by the bracket 3. A frame 202, (Figs. 1, 7 and 9) carries guide wheels 203, 204, 205 and 206 rotatably mounted on studs 207, 208, 209 and 210, respectively, which latter are fixed in the frame 202. The wheels 203 and 204 are adapted to travel on the rods 4 and 5, respectively, and the wheels 205 and 206 on the rod 200, to permit the frame 202 to freely move reciprocally, to be stopped at intermediate positions as desired, and to be guided in substantially the same planeal relation to the base 1.

The frame 202 is adapted to embrace the block 60, the frame 63, the guide 110 and also the frame 45, when the latter is in an operative position as hereinafter described. The rods 214 and 215 (see also Figs. 12, 13, 14 and 15), fixed to the frame 202, have as a part thereof the plates 216 and 217, in a fixed position relative to each other and to the rods 214 and 215. Slidably mounted on the rods 214 and 215 is a hollow block 220 with plate 220$^a$ fixed thereto and carrying a plurality of punches 221, 221 with shouldered heads 222, 222 and guided in substantially aligned holes, 223, 224 and 225, in the plates 216, 217 and 220$^a$, respectively. The shoulders of the heads 222 rest on the adjacent face of the plate 220$^a$.

Also in the block 220, (Fig. 15), are guide holes 227, 227, in which are slidably carried pins 228, 228 and 229, 229. Each of the pins 228 and 229 is arranged so that the path of its travel is over the head 222 of a punch 221. The holes 230, 230 in the side of the block 220 which is opposite to that in which are the holes 227, 227, are in substantial alignment with the latter, and are adapted to receive the ends of the pins 228 and 229 when desired.

A portion of the pins 228 and 229 projecting outwardly from the block 220 are suitably shaped with notch-like bends 232, 233 and 235, 234, respectively, so as to operatively engage an edge of the slots 235$^a$, 235$^a$ and 236, 236, in a plate 237, fixed to the block 220, and which slots act as guides. It will be obvious from the foregoing that when the pins are pushed inwardly, the notches 233 and 234, will be in engagement, with the edges of the slots 235 and 236 and will retain the pin in one extreme position, and when drawn outwardly the notches 232 and 235 will retain the pins in the other extreme position. Also that the former position will place the pins over the punches and that the latter will place the pins free of the punches. The ends of the pins 228 and 229 are suitably shaped at 232 and 235 so as to limit the extreme movement of the pins in either direction; against the block 220 in the one case and against the plate 233 in the other, this to facilitate setting.

To provide proper bearing surface for the block 220 a plate 238 is also slidably mounted on the rods 214 and 215, and is fastened to shouldered studs 239, 239, which latter are also fastened to the block 220, thus making a unitary structure. Guided between the block 220 and the plate 238 is a box 240, slidably mounted therebetween, and flanged on its sliding edges to retain it on its ways. The eccentric portion 197 of the shaft 196 is operatively embraced by the block 220 to impart reciprocatory motion thereto, and in a manner to freely permit both rotation of the shaft 196, and a movement of the block 220 longitudinally along the portion 197 of the shaft 196, this latter movement resulting from the movement of the carriage.

It will be obvious from the foregoing that a complete rotation of the shaft 196 and its eccentric portion 197 will give the block 220 a reciprocating motion which will positively carry downwardly such of the punches 221 as have pins 228, 229 set over the heads 222 and will return them to normal position.

Fixed on a seat of the frame 202 is a die block 241, with dies 242, 242 corresponding to and in alignment with the punches 221, 221, and coacting therewith in punching material inserted therebetween.

A slot 243 in the seat of frame 202, suitably arranged with respect to the dies 242, 242, provides exit for the blanks. A box 244 is detachably fastened to the frame 202 by means of thumb screw 245, in a position to receive and hold the blanks until emptied therefrom.

Means are provided for moving or driving the carriage to and positioning it at any predetermined, or selected point, so that the printing and punching will be done at the proper and sequential point or place on the guest check or other receiving medium, and for bringing it back after said operations have been performed.

A depending dog 250 (Figs. 9, 26, 27 and 63) having a face 252, is rotatably mounted on a stud 251, fixed to the frame 202 on one side thereof. A spring 253, under tension, has one end operatively fastened to the dog 250 and the other end fixed to the frame 202. The action of the spring keeps the face 252 normally in contact with the frame 202. A bell-crank lever 254 (Figs. 2, 6, 9 and 63), with an arm 255 and a depending arm 256, is rotatably mounted on a stud 257, fixed to the frame 202 on a side opposite to that which carries the stud 251. The arm 255 has fixed thereto a stud 258, upon which is rotatably mounted the roller 259. One end of a spring 260, under tension, is operatively attached to the arm 255, the other end being fixed to the frame 202 and tends to keep a face 255$^a$ of the arm 255 in contact therewith.

A guide rail 261 (Figs. 2, 6, 8 and 63) is fixed to the base 1 and operatively placed with relation to the roller 259 to permit rolling contact therewith when desired. A bevel face 262 of the rail 261 is suitably positioned at its inner end to permit the bell-crank 254 to be partially rotated and restored to normal position under action of the spring 260 as the carriage comes to its final position of rest as hereinafter described.

As embodied, a shaft 270 (Figs. 7 and 11) is rotatably mounted in the base 1, in suitable position relative to the frame 202, and has fixed thereto a gear 271. A gear 272 is fixed to the shaft 6 and is in operative engagement with a gear 273, which is rotatably mounted on a stud 274, fixed to the base 1, and suitably placed so as to be in driving contact with the gears 271 and 272.

On the end of the shaft 270 opposite to that carrying the gear 271 is a sprocket wheel 275 fixed to the shaft. From the foregoing it will be evident that rotation of the shaft 6 will rotate the sprocket wheel 275.

Fixed to the base 1 is a stud 276, upon which is freely mounted an arm 277 (see Fig. 8). A stud 278, fixed to the arm 277, rotatively carries a sprocket wheel 279, substantially of the same diameter as the sprocket wheel 275. The centers of the sprocket wheels 275 and 279 are substantially in a line parallel with the travel of the frame 202, which line is also substantially midway between the dog 250 and the bell crank 254.

An endless sprocket chain 280 is carried in operative contact with the sprocket wheels 275 and 279, which wheels and the gears 271 and 272 are so proportioned as to cause a given point on the sprocket chain 280 to make a complete trip, forward and return, for a single complete rotation of the shaft 6.

A screw 281 is adjustably mounted on the base 1, the head of which is in contact with the adjacent edge of the arm 277. A clamping screw 282, operatively arranged with respect to the arm 277, in a slot 277ª of the latter is adjustably mounted in the base and is adapted to firmly hold the arm 277 in its adjusted position, the whole for the purpose of properly tensioning the sprocket chain 280 and maintaining this condition. A plate 283 is fixed to the base 1 and carries fast thereon the rails 284 and 285, suitably positioned with respect to the sprocket chain 280 to serve as guides therefor.

A lug 286 (Fig. 11) is fixed as a part of a link 287, of the sprocket chain 280, and is suitably arranged with respect to the dog 250 and the depending arm 256 of the bell crank 254, to be in operative contact therewith when desired. A lug 287ª (Figs. 11, 21 and 22) is fixed as a part of a link 288 of the sprocket chain 280, and is suitably arranged and positioned to be in operative contact with the bent part 165ª of the arm 165ᵇ when desired.

It will be obvious from the foregoing that a complete rotation of the shaft 6 will drive the lug 286 of the sprocket chain 280 so that by contacting with the dog 250 the frame 202 will be driven in one direction and by contacting with the arm 256 of the bell crank 254 the frame 202 will be carried in the reverse direction.

In the embodied form of means for positioning the carriage to print upon and perforate the guest card, or other record receiving medium, and so that successive imprints will be properly positioned relatively to each other, a stud 290 (Figs. 1, 17 and 18), fixed to the frame 202, has freely mounted thereon a dog 291, having a face 292. The dog 291 is suitably located operatively adjacent to the heads 72 of the pins 71, and is adapted to either pass over the heads 72 during a travel of the frame 202 or to contact therewith as desired.

A bracket 293, fixed to the frame 202, has attached thereto one end of a spring 294, under tension, the other end of which is attached to a pin 294ª, fixed on the dog 291. The face 292 of the dog 291 serves to position the dog 291 normally against the action of the spring 294, an adjacent side of the frame 202 acting as an abutment. A face 295 of the dog 291 coacts with an adjacent face of the frame 202 to position the dog after partial rotation against the tension of the spring 294 as is hereinafter described.

In the operation of the foregoing, it will be obvious from the foregoing that if a head 72 of the pin 71 projects into the path of the dog 296, prior to the frame 202 being driven in the desired direction by the engagement of the lug 286 of the sprocket chain 280 with the dog 250, the frame will be arrested through contact of the pawl and the head of the pin. Also that with the frame arrested, the partial rotation of the dog 250 against the tension of the spring 253 will permit the sprocket chain 280 to further travel a desired distance. Further, the frame 202 may be stopped at any one of the pins, it being evident that the pawl 291 will travel over the pins which are in a depressed position and contact with the first pin in its path which is in its intermediate position as is hereinafter described.

In the embodied form of means for releasing the carriage for travel from its starting point, there is rotatively mounted on a stud 1900 (Figs. 25, 26 and 27), fixed to the bracket 148, an arm 1901, (also Fig. 9) to which is fixed a cam plate 1902, having the faces 1903 and 1904 suitably positioned for a desired cooperation with the lug 286 of the link 287. A spring 1905, under tension, is suitably attached to the arm 1901 to give it rotation away from the base 1. A pin 1906, fast to the arm 1901, abuts against the bracket 148 and serves as a positioning stop for the arm 1901, against the tension of the spring 1905. A tooth 1907 of the arm 1901 is adapted to engage, when desired, a pin 1908 fixed in the frame 202 in a suitable position relative to the tooth 1907. A face 1907ª of the arm 1901 is suitably shaped to coact with the pin 1908 so as to partially rotate, under certain conditions, the arm 1901 as is hereinafter described.

In the normal position of the frame 202, the tooth 1907 engages the pin 1908 and serves to maintain this position of the frame 202 until the face 1903 of the cam plate has been engaged by the lug 286 of the sprocket chain 290. Such engagement results in a partial rotation of the arm 1901, which detaches the tooth 1907 from the pin 1908, the face 1904 serving to maintain this disengagement for a desired period. The further travel of the lug 286 permits the return of the arm 1901 to normal position to be again engaged by the pin 1908 when desired, it being understood that the pin 1908 has been carried beyond the engaging position as is further described.

Means are provided by the invention for insuring that the printing and punching of the sale and price of any particular commodity on the guest check, or other card, will be properly positioned and spaced with respect to the preceding printings and perforations on the card. In the embodied form, to effect this, successive perforations corresponding to a printing and its corresponding perforations are made in the side of the guest check or other card. Fixed to the block 220 (Figs. 9, 12, 17 and 19) is a toothed piece 300 operatively positioned with respect to the heads 72 of the pins 71 and to the toothed portion 68a of the frame 63.

In the desired position of the frame 202 with the pawl 296 against the head 72 of the pin 71 a downward movement of the block 220 permits the engagement of the tooth piece 300 with a space 68 between teeth 68a, 68a and substantially at the same time contacts with the head 72 which is disengaged from the pawl 296 by a continuance of movement of the block 220. On the return of the block 220 upwardly to its initial position the tooth 300 is disengaged from between the teeth 68a, 68a permitting the free travel of the frame 202.

Means are provided for detenting or preventing rebound or back-lash of the carriage, and as embodied, a projection 300a of the tooth 300 (see also Fig. 19), is suitably arranged in operative position relative to a tail 302 of a pawl 303, which pawl is rotatably carried on a stud 304, fixed to the frame 202. A toothed portion 305 of the pawl 303 is positioned and adapted to coact with the teeth 68a, 68a of the frame 63, and with the teeth 70a, 70a of the plate 69, in a manner to prevent, when desired, the backward movement of the frame 202 when it is traveling from its initial position, and to prevent rebound when the frame is positioned by the cooperation of the dog 291 with the head 72 of the pin 71.

A pin 306 is fixed to the pawl 303 operatively adjacent to a depending latch 307, rotatively mounted on a stud 308, (also Fig. 13) fixed to the frame 202, and is adapted, when desired, to be engaged by the latch 307, thus retaining the pawl 303 in a position free from contact with the teeth 70a and 68a.

A spring 309, under tension, is operatively attached to the latch 307 for effective coaction between the latch 307 and the pin 306. A spring 310, under tension, is operatively attached to the pawl 303 for effective coaction with the teeth 68a and 70a. An arm 311 of the latch 307 is adapted to so coact, when desired, with a suitably shaped stud 312 (Fig. 1) fixed to the bracket 2, that the latch 307 may be sufficiently rotated to permit the release of the pawl 303.

The embodied form of printing mechanism carried by the carriage, is adapted to use an ordinary linotype slug. As so embodied, mounted on the block 220 (Figs. 13, 14 and 16), and fixed thereto, are bearings 315 and 316, rotatably carrying the shaft 317. Fixed to the shaft 317 is a carrier 318 with aligning faces 321, 322 and provided with spring members 318a, 319, 319 and 320, 320 fast thereto, the whole being adapted to detachably hold a linotype or type body 323, carrying the printing characters 324, 324 on its operative face.

A spring 325, under tension, acts on the shaft 317 to hold the carrier with its contained type body in the desired position (see Figs. 13 and 14).

Preferably the printing slug or linotype is kept against the ink pad when not printing, as this keeps it in better printing condition. In the embodied form of means for moving the slug or linotype between inking and printing positions, there is fixed to the shaft 317 a gear 326 (see also Figs. 2 and 16), in operative engagement with a rack 327, slidably mounted in guide 328, fixed to the block 220, and under certain conditions having an end operatively free of the guide. A bracket 330, fixed to the bracket 2, has fast thereon a stud 331. Rotatably mounted on the stud 331 is a bell-crank lever 332, having a depending arm 333 suitably placed for engagement with the projecting end of the rack 327, and an arm 334, to which is fastened one end of a spring 335, under tension, the other end being held by a screw 336 adjustable in a bracket 337 fixed in the bracket 2.

A pin 338, fixed to the bracket 330, holds the bell crank normally in the desired position against the tension of the spring 335. A pin 339 also fixed to the bracket 330 serves to limit the rotation of the bell crank 332, if desired in the direction opposed to the tension of the spring. The arm 333 serves as an abutment for the rack 327, the tension of the spring 335 being sufficient to cause the rack to rotate the shaft 317 and raise the type body to a horizontal position. It will be understood that at the time of contact the rack remains substantially at rest relative to the arm 333, the travel of the frame 202 providing the relative motion between the rack and the pinion 326, all of which is described hereinafter.

In the embodied form of inking means for the printing means just described, a bracket 340 (Figs. 1, 7 and 9), fixed to the bracket 2, rotatably carries a shaft 341, to which is fixed a frame 344. Studs 345 and 346, having heads 347 and 348, respectively, are adjustably mounted in the bracket 2 and are suitably positioned with their bodies freely passing through slots in the frame 344. The springs 349 and 350, under tension, respectively embrace the studs 345 and 346 and have the opposed ends of each abutting against the bracket 2 and the frame 344. The heads 347 and 348 hold the bracket against the tension of the springs 349 and 350.

An open-sided case 351, (Figs. 6, 7 and 9) is detachably mounted on the frame 344 and embraces a pad 352, preferably of a material adapted to hold and give off, by contact, a printing agent. A face 353 of the pad 352 is suitably exposed and operatively placed with respect to a desired position of the type body 323 and adapted to receive in contact the characters 324. Mounted on the frame 202 (Figs. 6 and 14), substantially on the face carrying the die block 241, is an open side box 355, detachably fixed thereto, and containing preferably an elastic pad 356, whose face 357 is suitably arranged and positioned to be opposed to the characters 324 on the type body 323 when the latter is in a desired position, and adapted to act as a platen for impression purposes.

Means are provided, as already indicated, for making within the machine a record, accessible only to the auditor or other person controlling the machine, of the identity of the sales agent who makes each particular sale. In the present embodiment, the insert or frame for the guest check, or the like, is provided with a number or mark which identifies the particular salesman. As embodied, an identification number or mark is sequentially printed for each successive operation of the machine from the guest check frame on a strip of paper which is stored inaccessibly within the machine and preferably so marked as to identify the machine. As so embodied, a bracket 358 (Figs. 2, 9 and 33), fixed to the bracket 2, carries a stud 359 fast thereto, upon which stud is rotatively mounted a hub 360, to which are rigidly attached the sides 361 and 362 of the case 363. The rollers 364 and 365 (Fig. 33), are freely mounted on the studs 366 and 367, respectively, which latter each have their opposed ends fast in the sides 361 and 362.

A stud 369, the ends of which are fixed to the sides 361 and 362, carries the spacing collar 370. Hub 360, sides 361 and 362, the stud 369 and the collar 370 thus form the unitary case 363.

An open-sided container 371, fixed to the sides 361 and 362, holds a pad 372, preferably of yielding material, suitably positioned with relation to the guide 110 and slot 75. Guards 373 and 374 are suitably arranged and fixed to the sides 361 and 362. An extended portion of the side 361 has fixed thereto a stud 375, freely mounted on which is one end of a connection 376, the opposed end of which is freely carried by a stud 377, fixed to an arm 378.

A rod 379 is fixed to the bracket 2, and the arm 378 is rotatably mounted thereon. A stud 381, fixed to the arm 378, rotatively carries a roller 382, which is in operative engagement with a suitably shaped cam 383, fixed to the shaft 174. One end of a spring 384, under tension, is attached to the side 361 of the case 363 and the opposed end is attached to a stud 385, fixed to the bracket 170.

It will be obvious from the foregoing that under rotation of the shaft 174, the cam 383 will permit the case 363, under action of the spring 384, to swing in the desired direction and will return the case 363 to the normal position.

The roller 394 is adapted to act as a guide and tension means for an impression receiving material as hereinafter described.

The cooperation of an end of the slot 396 and the pin 397 permits the arm 392 to be moved, at times, with and when the platen 372 carries the impression receiving material towards and from the frame 45 as is hereinafter described. Further, the slot 396 permits a desirable independent movement of the arm 392 without affecting, or being restricted by, the case 363, as would result if the arm 392 was rigidly attached thereto. Thus a condition of tension of the material referred to above is desirably maintained.

As embodied, a bracket 390 (Figs. 2, 4, 33 and 36) is fixed to bracket 2, and carries fixed thereto a stud 391, on which is rotatively mounted the arm 392. A stud 393, fixed to the arm 392, has a roller 394 freely mounted thereon. One end of a connection 395 is rotatively mounted on the stud 369, of the case 363, the opposed end having a slot 396, suitably engaged by a pin 397, fixed to the arm 392. A spring 398, under tension, tends to normally keep the arm 392 against a stop pin 399, fixed to the bracket 390.

Also freely mounted on the stud 393 (see Fig. 36), is a flanged bushing 400, carrying a roll of impression receiving material 401, and preferably paper and having a core 401°. A guide disk 391 is fixed to the stud 391 and serves to position the material 401. An arm 402 is freely mounted in a slot 403 of the stud 391, and is rotatable on a rod 404, fixed in the stud 391, the whole being operatively placed with respect to the bushing 400. The mounted end of the arm 402 is adapted to so coact with a spring 405, under tension, one end of which is fixed to the stud 391, that in one position the arm 402 will retain the bushing 400 and the roll 401 in a desired position on the stud 391 and in another position will permit the removal of the core.

A bracket 406 (Figs. 2, 4 and 33) fixed to the bracket 390, has fast thereto a stud 407, upon which is freely mounted a plate 408, adapted to be kept in frictional engagement with the periphery of the roll 401 by means of a spring 409 under tension.

The winding mechanism for the identification mark-bearing strip just described, as embodied, comprises a stud 410 (see Figs. 2, 4 and 34), fixed to the bracket 390, which has at one end a slot 411, in which is freely mounted the bent portion of a spring 412, which spring has its other end fast in the stud 410. A flanged hub 413 is freely mounted on the stud 410, and has the ratchet wheel 414 and the pin 415 fixed thereto.

Also rotatably mounted on the stud 410 (Fig. 33) is an arm 416, to which is fixed the stud 417. A pawl 418, operatively adjacent to the ratchet wheel 414 and in engagement therewith, is freely mounted on the stud 417. A spring 419, under tension, tends to keep the pawl 418 in contact with the ratchet wheel 414.

A pawl 420 is rotatably mounted on a stud 421, fixed to the bracket 390, and is also operatively placed with respect to the ratchet wheel 414, as a retainer; a spring 422, under tension acts on the pawl 420 to keep the pawl 420 in contact with the ratchet wheel 414.

Freely attached to the arm 416 is one end of a connection 423, the opposed end of which is adjustably attached to a head 424, which is freely mounted on a pin 425, fixed to an arm 426, which latter is rotatably mounted on the rod 379.

A stud 427, fixed to the arm 426, has rotatively mounted thereon a roller 428, operatively adjacent and under control of a cam 429, fixed to the shaft 174. A spring 430, under tension, so acts on the arm 416 that the cam roller is in contact with the cam 429. A flanged drum 431 (see also Fig. 35), freely mounted on the stud 410, abuts against the flanged hub 413 and has a hole 432 conveniently placed for receiving the pin 415. The free end of the spring 412 is adapted to retain the drum 431 in such a position that the flanged hub 413, the drum 431, the pin 415 and the hole 432 form substantially a unit spool. A prong 431ᵃ is arranged in a slot in the drum 431 and adapted to grip a free end of the impression receiving material 401 when desired. A roller 433 is rotatably mounted on a stud 434, fixed to the bracket 458, and acts as a guide for the strip 401. As embodied the strip 401 is guided by the roll 394, the sleeve 370, the roller 365 and passes over the platen 372, the roll 364, the hub 360, the roller 433 and is attached to the prong 431ᵃ and finally about the drum 431.

In the inking mechanism, for the printing mechanism just described, there is mounted on the base 1 (Figs. 2, 6, 9, 32 and 62), a bracket 435 carrying a shaft 436 rotatably mounted therein. A flexible arm 437 is fixed to the shaft 436 and carries a removable ink pad 438. The pad 438 is placed in a desired normal position relatively to the free end of the guide 110. Also fixed to the shaft 436 is a toothed segment 439, in operative engagement with the toothed segment 440, rotatively mounted on a stud 441, fixed to the bracket 2. One end of a connection 442 is attached to an arm 443 of the segment 440, the other end being adjustably carried by the head 444, (see Figs. 4 and 8), which latter is freely mounted on a pin 445, fixed to an arm 446, fast to a hub 446ᵃ.

A stud 447 is fixed in a bracket 448 which is fixed to the bracket 2. The hub 446ᵃ, rotatably mounted on the stud 447, has as a part thereof an arm 446ᵇ, which carries a stud 448ᵃ fixed thereto. Freely mounted on the stud 448ᵃ is a roller 449, in operative engagement with a cam 450, fixed to the shaft 6. A spring 451, under tension, acts to keep the roller 449 in contact with and under control of the cam 450.

From the foregoing, it will be evident that the cam 450, through the connecting mechanism, will, when desired, rock the shaft 436 and cause the pad 438 to contact with and ink the relief characters 48; the flexible arm 437 insuring desirable contact between the pad 438 and the character 48. Also under the action of the cam 450 the pad will be retracted from the inked characters 48 so as to permit them to be impressed upon the material 401 when desired.

Referring now to the embodied form of storing and ejecting mechanism for the tokens or pieces which represent the commodity, and represent a predetermined quantity or price-value of the commodity:

A gear 460 (Fig. 8) is fixed to the shaft 6 and is in operative engagement with a gear 461, of substantially equal diameter, and rotatably mounted on a stud 462, which is fixed in the base 1. A stud 463, fixed to the gear 461, has rotatably mounted thereon one end of a connection 464.

A stud 465 (see also Fig. 29), is fixed to the base 1 and rotatably carries the piece 466. An arm 467 of the piece 466 has fixed thereto a stud 468, upon which is freely mounted the opposed end of the connection 464. On an arm 469 of the piece 466 is fixed a stud 470, which rotatively carries a pawl 471, operatively adjacent to a ratchet wheel 472, which is freely mounted on the stud 465. A pin 473 is fixed to the ratchet wheel 472 for a purpose hereinafter described. A pin 474, fixed to the arm 469, carries a spring 475, under tension, one end of which coacts with the pawl 471 to keep the pawl in suitable engagement with the ratchet wheel 472.

A stud 480, fixed to the base 1, has rotatively mounted thereon a pawl 481, in operative contact with the ratchet wheel 472.
A stud 482, fixed to the base 1, carries a spring 483, under tension, one end of which coacts with the pawl 481, to keep the pawl in operative engagement with the ratchet wheel 472. The pawl 471 is adapted for driving the ratchet wheel 472 in a desired direction, and the pawl 481 is adapted to retain the ratchet wheel 472 in its advanced position.

A plate 490 (see also Figs. 1, 6, 28 and 29), with openings 491, 491 is centered on and fixed to a stud 492, having a projection 493. A plate 494 with the opening 495 is fast to the plate 490; the distance collars 496, 496 preserving the desired space 497 between the plates 490 and 494.

The openings 491, 491 and 495 are regularly disposed with respect to the center of the plates 490 and 494 and the ratchet wheel 472, and are angularly equidistant one from the other. Freely mounted on the stud 492 is a hub 496$^a$, which has fixed thereto a plate 497$^a$, adapted to freely move about its axis within the space 497 between the plates 490 and 494.

The plate 497$^a$ has the openings 498, 498 preferably slightly larger in size than the openings 491, 491 of the plate 490 and normally substantially in alignment therewith. The hub 496 has the hole 499 positioned to receive the pin 473 of the ratchet wheel 472, thereby being under control of the ratchet wheel 472.

A hole 500 in the stud 465 is positioned and adapted to receive and operatively center the projection 493 of the stud 492. A projection 501$^a$ (see also Fig. 8) of a screw 501 which, mounted on the base 1, is adapted to be received by a hole 502 in the plates 490 and 494, which hole is so positioned relative to the opening 495 as to effect the desired relation between the plates and the base 1.

The screws 505, 506, 507 (see also Fig. 8) are adjustably mounted in the base and are adapted to substantially contact with the plate 494 and to act as supporting members. The chutes 508, 508 (see also Fig. 1) are fixed to the plate 490 in substantial alignment with the openings 491, 491 of the plate 490 and are adapted to freely permit the passage of, while guiding, a piece 510 (see Figs. 1, 2 and 6).

From the foregoing it is evident that a rotation of the shaft 6 will impart a corresponding angular movement to the gear 461, through the gear 460 and, by means of the connection 464, give a reciprocal movement to the piece 466, thus feeding the ratchet wheel 472 a desired angular distance by the pawl 471, and returning the latter to its initial position.

It will be understood that in a normal position the openings 498, 498 of the plate 497$^a$ and the openings 491, 491 of the plate 490 are in alignment and in consequence one of the freely moving pieces or tokens 510, 510 is deposited at a time from a chute, while its supply lasts, through one of the openings 491 to an opening 498 and so with the various chutes. Further the opening 495 of the plate 494 is also normally in alignment with one of the openings 498 of the plate 497$^a$.

The desired angular movement of the plate 497$^a$, imparted by the pin 473 will cause an opening 498 and its contained piece 510 to be aligned with the opening 495 of the plate 494 and the token or piece 510 will be thereby discharged. A hole 512 in the base 1 is adapted to permit the further progress of the token or piece 510. Each rotation of the shaft 6 will thus discharge a piece, the further partial rotation of the plate 494 bringing the opening 498 which has just discharged its piece 510, in alignment with an opening 491 whereby it will receive a new piece or token.

The openings 498, 498 are shown with beveled edges 511 to facilitate the desired functioning.

As previously stated, in the present embodiment, the control or actuation of the machine is effected through two cam shafts, their general functions having already been described. The mechanism for escaping the second cam shaft will now be described.

A stud 520 (Figs. 4, 8, 33 and 53, fast in the base 1, rotatively carries a piece 521, the arm 522 of which is operatively in the path of the stud 463 on the gear 461. Opposed to the arm 522 as a part of the piece 521 is an arm 523, having a pin 524 fast thereon. Rotatively mounted on the pin 524 is one end of a connection 525, the opposed end of which is suitably attached to an arm 526 of a bell-crank 527. A pin 528, fixed to the base 1, holds the piece 521 in a desired position against the force of a spring 529, under tension, acting on the piece 521.

A stud 535, fixed to the bracket 2, rotatively carries the bell-crank 527, an arm 536 of which has fast thereto a stud 537 upon which is rotatively mounted a piece 538, operatively positioned relatively both to the plunger 188 of the rocker 183 and to the face 189 of the plate 190. One end of a spring 540, under tension, is suitably arranged to keep the piece 538 against the face 189 when desired.

The manner of operation of the mechanism just described is substantially as follows:—At a desired time during a rotation of the gears 461 and 462, the stud 463 will engage the arm 522, rocking the piece 521, which in turn will cause the arm 523 through the connection 525, to partially rotate the bell-crank 527 and to impact the piece 538 against the plunger 188. The plunger will be retracted sufficiently to be free of the face 189 and thus permit the rocker 183 to partially rotate, under the action of the spring 191 and the gear 176, the arm 185 being carried away from contact with the tooth 182 of the wheel 181. The shaft 174 will be free to rotate as desired, being driven by the cooperation of the friction disks 178, 179, the disks 175 and 177, and the gear 176. Also the arm 186 will be operatively engaged by the tooth 182, the rocker 183 being retrogradely rotated sufficiently to permit the spring-pressed plunger 188 to again engage the face 189.

Piece 538, being in the path of the plunger 188 when the latter is being carried towards its normal position will be partially rotated by the plunger and because of its position will not be in an operative condition to again escape shaft 174 until returned to its normal position in the sequence of operations controlled by shaft 6.

Referring now to the embodied form of mechanism for recording the total sales of the particular machine or commodity, that is, the total number of commodity demanding tokens uttered or issued from the machine, a visible registering counter mechanism 550 (Figs. 2, 5, 6, 8, and 10), the well known Veeder counter being used for illustration, is supported on a plate 551, fixed to the bracket 3. An outer end of a shaft 552, which is an extension of the counter shaft, is rotatably mounted in a bearing 553, fixed to the bracket 3. An arm 554, fixed to the shaft 552, operatively carries one end of a connection 555, the other end being freely attached to an arm 556 of a bell crank 557, which is rotatably mounted on a stud 558, fixed to a bracket 559, which is fast on the bracket 3.

A spring 560, under tension, is operatively connected with the arm 554, and tends to return the shaft 552 to normal position. An arm 561 of the bell-crank 557 has fixed thereto a pin 562, upon which is freely mounted a clevis head 563, adjustably attached to one end of a rod 564.

A stud 565, fixed to the base 1, rotatably carries a piece 566, an arm 567 of which has fixed thereto a stud 568 to which is operatively attached the opposed end of the rod 564. The piece 566 has an arm 569, opposed to the arm 567, operatively placed relatively to the stud 463 on the gear 461. A pin 570, fast in the base 1, serves as a stop for the piece 566 to position it normally against the action of a spring 571, under tension, which operatively engages the piece 566.

It will be obvious from the foregoing that at the desired time during the rotation of the shaft 6, and of the rotation of the gear 461, the stud 463 will engage the arm 569, and, through the arm 567, the rod 564, the bell-crank 557, the connection 555 and the arm 554, cause the countershaft 552 to register a new or a successive number. Further rotation of the gear 461 will disengage the stud 463 and the arm 569 and, under action of the spring 571 and the spring 560, this mechanism will return to normal position. An opening 575, in the plate 115, suitably disposed with respect to the dial 576 of the counter 550, permits visual inspection of the register.

Means are provided by the invention for automatically locking the machine when the supply of tokens or commodity representing pieces is exhausted. In the embodied form thereof, a weighted block 513 (Figs. 1, 2 and 30) is adapted to slide in a token chute 508 and has a projection 513ª extending through the open portion 514 of the same chute 508.

Fixed to the plate 490 is a stud 515 to which is fast a pin 516. A lever 517 is rotatably mounted on the pin 516, and has one end 517ª so positioned relatively to the projection 513ª of the block 513 that the latter when desired, may contact and partially rotate the piece 517. Opposed to the arm 517ª is an arm 517ᵇ, as a part of the piece 517.

The mechanism just described is connected to mechanism which, when the tokens approach exhaustion, will prevent the insertion of the guest check frame or equivalent device 45, from being inserted into the machine to start it into operation. Means are also provided for preventing the insertion of the above-mentioned or other controlling device when the supply of the commodity is exhausted. This latter is usually or preferably operated from the usually more or less distant supply station.

In the embodied form of said mechanism, a bracket 580 (Figs. 1, 2, and 37), preferably of non-magnetic material, fixed to the base 1, has suitably mounted thereon an electromagnet 581 with the lead wires 582 and 583. A bracket 584, also fixed to the base 1, has fast thereto a stud 585 on which is rotatably mounted an arm 586, to which is suitably attached an armature 587, operatively adjacent to the electro-magnet 581. A stud 588, fixed to an arm 586, carries attached thereto one end of a connection 589, the opposite end of which is freely mounted on a stud 590, fixed to an arm 591 of a bell-crank 592.

A spring 593, under tension, has one end attached to an arm 586, the opposed end being carried by a pin 586ª, fast in the bracket 584, and tends to resist the action of the electro-magnet 581 when the latter is energized, and to return the arm 586 to normal position when desired.

A bracket 594, (Fig. 38) fixed to the base 1, has fast thereto a stud 595, on which is rotatably mounted the bell-crank 592. An arm 597 of the bell-crank 592 has fixed thereto a pin 598, upon which is freely mounted the clevis head 599, adjustably attached to which is the pin 600, slidably mounted in the body of the guide 110 and having its end so positioned normally as not to protrude therefrom.

A pin 602 is so positioned and fixed in the connection 589 relatively to an adjacent face of the bracket 594 that the pin 602 will serve as a stop for the connected mechanism against the tension of the spring 571; and also will coact with other parts as hereinafter described.

A bracket 603, fixed to the base 1, and preferably of a non-magnetic material, carries thereon, an electro-magnet 604 with the lead wires, 605 and 607. A stud 608, fast in a bracket 609, fixed to the base 1, has rotatably mounted thereon the arm 610, on which is suitably mounted an armature 611, positioned operatively adjacent to the electro-magnet 604. One end of a spring 610ᵃ, under tension, is fastened to the arm 610, the other end being held by a pin 612 fast in the base 1. The action of the spring 611 is adapted to resist the action of the electro-magnet 604 when the latter is energized, and acts to return the arm 610 to normal position when desired.

A notched portion 610ᵇ of the arm 610 is positioned operatively adjacent to a tooth 613 of the connection 589 and normally out of engagement therewith.

From the foregoing it is obvious that the electro-magnet 581, when energized by a current through the lead wires 582 and 583, will attract the armature 587 and thus cause a partial rotation of the arm 586, which through the connection 589 will cause the bell-crank 592 to carry the pin 600 through the guide 110 so as to obstruct passage of the insert or check holding frame along the guide 110. Also, under the action of the spring 610ᵃ, the notched portion 610ᵇ of the arm 610 will engage the tooth 613 of the connection 589 to retain the connection in its advanced position and in consequence hold the pin 600 protruding through the guide 110, substantially at right angles to a face 110ᵃ thereof, to permit the deenergizing of the electro-magnet 581 when desired; without the return of the pin 600 to normal position.

Further the energizing of the electromagnet 604, by means of a current through the wires 605 and 607, will, by the attraction of the armature 611, disengage the tooth 613 and the notch 612 and permit the return of the pin 600 under action of the spring 593; it being understood that in this particular arrangement switch 983 (Fig. 45) controls the magnets 581 and 604; and deenergizes the former before deenergizing the latter, as will be later described.

A stud 615 (Figs. 6, 8 and 37) fixed to the bracket 594, rotatably carries the bell-crank 616, a depending arm 617 of which is operatively positioned relatively to the pin 602 of the connection 589. An arm 618 of the bell-crank 616 freely carries a link 619. A stud 620 (see Fig. 5) fixed to the bracket 3, rotatably carries a bell-crank 621, a depending arm 622 of which has a portion 623, colored, for instance red, to attract visual attention to the condition of the mechanism.

An arm 624 of the bell-crank 621 is suitably shaped to freely retain one end of a connection 625, the opposite end of which is operatively attached to the link 619. A spring 626, under tension, has one end attached to the arm 622, the opposed end being fastened to a pin 627, fixed to the bracket 3. A guide 628, fast to the bracket 3, is suitably positioned relatively to the connection 625, to freely permit its operation.

A pin 629, fixed in the bracket 3, is suitably placed relatively to the bell-crank 621 and serves as a stop to position the arm 622 against the tension of the spring 626.

An opening 630 (Fig. 10) in the plate 115 is disposed with respect to the portion 623 of the arm 622 so that normally the surface 623 is not visible, but under certain conditions may be clearly observed through the opening 630.

Also fixed to the bracket 594 (Figs. 2, 6, 37 and 38) is a stud 635, on which is rotatively mounted a bell-crank 636, an arm 637 of which carries one end of a connection 638, the opposed end of which is freely attached to an arm 639 of a bell-crank 640. One end of a spring 644, under tension, is attached to the arm 637, the other end being held by a pin 645 fast in base 1. A stud 641, fixed to a bracket 642, is fast on the base 1, and rotatively carries the bell-crank 640. An arm 643 of the bell-crank 640 is operatively positioned with relation to the arm 517ᵇ of the lever 517 (Fig. 30) and is adapted to coact therewith and to be under control of the weight 513.

An arm 646 (Figs. 2, 37 and 38) of the bell-crank 636 has its end hook shaped, which portion is operatively positioned relatively to a projection 647 of an arm 648, loosely mounted on the stud 595. One end of a spring 649, under tension, is fastened to the arm 648, the other end being held by a pin 650 fast in the bracket 3. With the weight 512 free of the arm 517, the projection 647 is adapted to be held by the hooked portion of the arm 646 against the tension of the spring 649.

A face 655 of the arm 648 is operatively positioned relatively to the pin 602 of the connection 589 and is adapted to give movement to the connection 589 by contact with the pin 602, under action of the spring 649, when desired.

It will be obvious from the foregoing that the pin 600 may be projected past the face 110ᵃ of the guide 110, either by the electromagnet 581 directly connected thereto, or by a release of the arm 648 from the hook portion of the arm 646, the tension of the spring 649 carrying the arm 648 against the pin 602 and by further movement giving travel to the pin 600. In the one case the mechanism is returned to normal by the action of the electro-magnet 604 releasing the tooth 613 of the connection 589, and in the other by manual resetting. Further, either actuation will cause the colored portion 623 of the arm 622 to be visible through the opening 630 in the plate 115 and so remain until the pin 600 returns to normal, either case indicating the inoperativeness of the machine.

In accordance with certain features of the invention, the machines are operated in groups. Means are provided whereby one or more machines may be locked against operation while another of the machines is being operated. In the embodied form of such means, a bracket 660 (Figs. 3 and 39), preferably of non-magnetic material and fixed to the base 1, has suitably mounted thereon an electro-magnet 661 with the lead wires 662 and 663.

A bracket 664, also fixed to the base 1, has rotatably mounted thereon a rock shaft 665, the opposite ends carrying fixed thereto an arm 666 and an arm 667. An armature 668, carried on a pin 669, fixed in the arm 666, is positioned operatively adjacent to the electro-magnet 661 and under its control.

A spring 671, under tension, is suitably fastened to the arm 666 and tends to resist the pull of the electro-magnet 661 when the latter is energized.

The arm 667 has a projection 675 suitably positioned with respect to the face 676 of base 1 to act as a stop for the rock shaft 665 against the tension of the spring 671. Opposed to the projection 675 of the piece 667 is a notch 677 and a pin 678, which latter is fast in the piece 667.

A bracket 680, fast to the base 1 has fast thereto a stud 681 and a pin 682. A piece 683 having opposed arms 684 and 685 is rotatably mounted on the stud 681.

A spring 686, under tension, coacts with the arm 684 to hold the arm 684 against the pin 682 and to return the arm 684 to this position after the arm has been partially rotated as is hereinafter described.

A projection 687 of the arm 685 is so positioned with respect to the notch 677 in the piece 667 that, when desired, the piece 683 is prevented from being partially rotated against the tension of the spring 686. A projection 690 of the arm 685 is so positioned with respect to the slot 75 as to stop an object, such as the check frame 45, guided therein (see Fig. 37), when desired.

Means are provided for rendering the locking action just described visible, and in the embodied form thereof rotatably mounted on a stud 695, fast in the base 1, is a bell-crank 696 having arms 697 and 698. An end of the arm 697 is yoke-shaped and is so positioned as to operatively engage the pin 678 of the piece 667.

Freely attached to the arm 698 is one end of a rod 699, the opposed end of which is carried by an arm 700 of a bell-crank 701. The bell-crank 701 is rotatably mounted on a rod 702, fast in a slotted stud 703, fixed to the base 1. An arm 704 freely retains a link 704ᵃ (see also Fig. 5), to which is freely attached one end of a connection 705, the opposed end of which suitably engages an arm 706 of a bell crank 707.

A stud 708 fixed to the bracket 3, rotatively carries the bell-crank 707, a depending arm 709 of which has a portion 710 of the surface colored to attract visual attention and to indicate a particular condition. A spring 711, under tension, has one end attached to the arm 709, the opposed end being fastened to the pin 627.

A pin 712, fixed in the basket 3, is suitably placed relatively to the arm 709 and serves as a stop to position the arm 709 against the tension of the spring 711.

An opening 714 (Fig. 10) in the plate 115 is disposed with respect to the surface 710 of the arm 709 so that normally the surface 709 is not visible, but under certain condition when desired, the surface 709 may be observed through the opening 714.

It will be obvious from the foregoing that when the electro-magnet 661 is energized the notch 677 of the arm 667 will be thrown in the path of the projection 687 of the arm 684 and will thus prevent passage of an object, such as frame 45, along the slot 75 beyond a point, determined by the abutting of the object against the opposed projection 690 so placed. Also that the projection 690 will so remain until the electro-magnet 661 is deenergized, when the spring 671 will release the arm 685 from the notch 677 and permit the arm 685 to be carried backward by a frame 45 traveling along the slot 75. Also that a visual signal may be observed when the arm 685 is latched and pass from view on the release.

A pin 720 (Figs. 20 and 39), is fixed on the block 60 projecting in the plane of the slot 75 and acts as a stop to bring the frame 45 travelling in the slot 75 to a desired final position, as will hereinafter be referred to.

Referring now to the embodied form of mechanism on one machine for controlling the mechanism just described, that is, the mechanism which locks or prevents the operation of one machine while the first-mentioned machine is being operated. It is generally convenient to equip each machine with both mechanisms, and the operation can then be determined or controlled by the arrangement of the wiring.

In the embodied form of the foregoing mechanism, a bracket 725 (Figs. 2, 6 and 40), fast to the bracket 3, has fixed thereon a stud 726, upon which is rotatively mounted a bell crank 727, having arms 728 and 729. The arm 728 has fixed thereto a stud 730, upon which is rotatively mounted the roller 731 positioned relatively to the guide 110 so as to be operated by the frame 45 travelling upon the guide 110 in a manner to raise the roller 731 and rock the bell-crank 727. A spring 732, under tension, is suitably attached to the arm 729 to normally keep the roller 731 in a depression 733 of the guide 110.

A plate of insulating material 734, fixed to the arm 729, has fast thereto a metal blade 735. Also fast to the bracket 3 (see also Fig. 41) is a block of insulating material 736, upon which are fixed and electrically separated the spring prongs 737 and 738 with the lead wires 739 and 740, respectively, connected thereto and normally forming an open electrical circuit as will be hereinafter described. The prongs 737 and 738 are placed with respect to the blade 735 so as to receive in electrical contact the blade 735.

From the foregoing it will be evident that the movement of the frame 45 along the guide 110 will operatively engage the roller 731, and cause the blade 735 to engage the prongs 737 and 738, thus closing the circuit of the wires 739 and 740. Also that the circuit will remain closed until the withdrawal of the frame 45 sufficiently to permit the roller to drop to its normal position under action of the spring 732.

Means are provided, as already indicated, for operating an annunciator at the supply station to indicate the recordation of a sale by the operation of the present machine. As embodied, this is effected through circuit controlled by the present machine. In said embodied form, fast on the shaft 6 (Figs. 4 and 8) is a commutator 750 consisting of a piece 750ª of insulating material, and a segment of conducting material 751 fixed thereon. Mounted on a block 752 of insulating material, fixed to the bracket 2, are two independent and electrically separated brushes 753 and 754 with the lead wires 755 and 756, respectively, connected therewith, and forming normally an open electrical circuit as will hereinafter be described. The brushes are at all times either in contact with the surface of the piece 750ª or with the segment 751.

With the brushes contacting with the surface of the piece 750ª when the shaft 6 is normally at rest, the circuit will be open but during angular movement of the shaft 6 the brushes 753 and 754 will contact with the segment 751 and close the circuit formed by the wires 755 and 756 and so remain until a further angular movement of the shaft 6 carries the surface of the piece 750ª under the brushes 753 and 754.

The entire machine is kept in a case or closure such as will protect its recording and other mechanisms from handling or tampering by unauthorized persons. In connection therewith each machine unit is mounted to be withdrawn from its case or closure for inspection, setting or other purpose by an authorized agent. In the embodied form of mounting for the machine unit, a plate 800 (Figs. 1, 5 and 8) is fixed to the base 1 and the brackets 2 and 3 on one side of the machine, and a plate 801 is similarly arranged on the opposed side. To the upper portion of each of the plates 800 and 801 is fastened outwardly projecting guide rails 802 and 803, respectively, and substantially parallel with the base 1.

To the lower portion of each of the plates 800 and 801 are fastened, respectively, guide pieces 804 and 805, also substantially parallel with the base 1. The rails 802, 804 and 803 and 805 (see also Figs. 46, 47 and 48) receive sliding members 806 and 807, respectively, with the respective rollers 808, 809 and 810, 811 rotatably mounted on the respective studs 808ª, 809ª and 810ª, 811ª, fast respectively on the members 806 and 807. The projections 812, 813 are are fixed respectively to the members 806 and 807.

A roller 815 is rotatably mounted on a stud 816, fixed to the plate 800, and suitably disposed relative to the rail 802 and an end of the plate 800, and adapted to support the member 806. Similarly, a roller 817 is mounted on a stud 818 fixed to the plate 801, and suitably disposed relatively to the rail 803 and an end of the plate 801, and adapted to support the member 807.

Attached to the frame 202 (Figs. 3 and 20) is an angle plate 202ᵇ operatively placed, when the frame 202 is at or near its initial position, with respect to a cam plate 63ᵇ fixed to the frame 63. The plate 63ᵇ is adapted to engage the plate 202ᵇ after the frame 202 has been returned to the initial position during the raising of the frame 63 after the operations have been performed on the insert 46. The action above described is for the purpose of insuring the desired position of the frame 202, initially, by positively aiding the engagement of the pin 1908 and the latching arm 1901. Under speed conditions any tendency of the carriage to rebound is thus overcome.

A stud 932 (Figs. 1 and 3) fixed to the base 1 rotatively carries a gear 933 in driving engagement with the gear 11 which is in frictional engagement with the shaft 6, the gear 933 acting as an intermediate between the driving means and the gear 11.

Electrical connections including terminals are provided for the various circuits included in a machine, and as embodied a block 830 (Figs. 1, 2 and 52) of insulating material is fixed preferably to the rear of the base 1. The blades 831, 832, 833, 834, 835, 836 and 837 having binding posts 838, 839, 840, 841, 842, 843 and 844, respectively, are fixed to the block 830 and electrically separated each from the other and from the base 1. To these binding posts are carried the necessary wires, from the devices hereinbefore described and as further illustrated in the wiring diagram of Fig. 45. The blades serve to complete circuits for cooperating devices and the necessary source of energy as is further described.

STATEMENT OF OPERATION.

The manner of operation of the hereinbefore-described mechanism is substantially as follows:—

*Starting first cam shaft.*

Considering the elements and the functions hereinbefore described, it will be evident that the insertion of the frame 45, with its insert 46, into the slot 132 and pushing it inwardly along its guides until the edge 45ᵃ reaches the pin 720 will, by impacting the face 157 of the pawl 156, move bell-crank 150 and, through the connecting mechanism retract the plunger 29 and permit the rocker 24 to partially rotate under action of the spring 41 and the force transmitted from the source of power and thus release for rotation the shaft 6, which latter is driven by the friction gear 11 from the source of power. The bell crank 683 will be carried backwardly permitting the full travel of the frame 45 unless it has been locked to prevent the operation of the machine.

The rocker 24 will be returned to normal position by the tooth 21 engaging the arm 27. The arm 34 of the rocker 33 will be engaged by the tooth 22 of the hub 20 after the rotation of the shaft 6 through an angular distance of substantially 180°, and will bring the shaft 6 to rest.

*Locking card frame 45 in the machine.*

The tooth 158 of the pawl 156, by the coaction of the pin 159 and cam faces 162 and 163, engages the hole 49 in frame 45, during the movement of the bell-crank 150, and firmly locks the frame 45 in position for the operations to be performed on the guest card or other insert 46.

To prevent the withdrawal of the holder 45 until these operations are performed by the machine, the teeth of the pawl 168 are successively engaged by the tooth 169 of the arm 153, and thus the latter is held until the desired release is effected by the cooperation of the pawl-connected arm 165ᵇ and the lug 287 of the chain 280. The pin 159 and the face 163 coact to keep the pawl 156 and holder 45 firmly engaged and locked together.

*Positioning the carriage.*

During the above-described partial rotation of the shaft 6 one of the functions controlled thereby is the release of the frame 63 by the cam 101 through the rock shaft 90 and the connected mechanism to position the carriage. This movement of the frame 63 causes the pins 71, 71 to either impinge against the surface of the insert 46 presented thereto, through the holes 50 of the frame 45, or to pass through a previously made desired puncture therein.

In the case of a guest check or other insert upon which no operations have been performed, all of the pins 71, 71 will be held in an intermediate position, because the insert will prevent their full travel, and the heads 72, 72 will be thereby placed in the path of the dog 291 of the frame 202. The first head 72 relative to the normal position of the carriage so projecting will stop the carriage in the first position, so that the first line of printing on the guest check will be properly placed. The frame 63 will remain in its dropped position until after the printing and punching of the guest check, when further rotation of the shaft 6 restores it to its normal position, the cam 101 controlling. Successive operations with the frame 45 will successively position the carriage for the operations upon the insert 46 in the proper line sequence.

To travel the carriage to such stopping point as determined by the projecting pins 72, the shaft 6 during its partial rotation drives sprocket chain 280, through the gears 272, 273 and 271, the lug 286 first releasing the frame 202 by first contacting with the face 1903 camming the arm 1901 away from the frame 202, and then contacting with the face 1904, thus disengaging the tooth 1907 and the pin 1908 and for a necessary interval maintaining this disengagement, and then contacting with the dog 250. Further travel carries the frame 202 on a forward trip, and the dog 291 contacts with the head 72 of the first of the pins 71 held by the guest check or insert 46 in an intermediate position.

The dog 291 is then carried backwardly against the tension of the spring 294 until the face 295 abuts against the adjacent side of the frame 202 thus positioning the latter. At this time, the tooth 305 of the pawl 303 has engaged either the desired tooth 70ᵃ of the plate 69, or a tooth 68ᵃ of the frame 63, thus holding the frame 202 against a rebounding action and with the dog 291 thus accurately holding the frame 202 in the desired position. Further travel of the sprocket chain gives a sufficient partial rotation of the shaft 250 to permit the lug 286 to trip by, the dog 250 returning to normal position under the action of its spring 253, while the sprocket chain completes its half trip coming to rest when the shaft 6 has completed its half rotation.

Operation to the inking pad.

The pad 438 normally positioned to receive, with the tension of the flexible arm 437, the characters 48 when the frame 45 has reached its final position against the pin 720 and to ink the characters 48. During said first half revolution of the shaft 6, the pad 438 is swung away from the characters 48 by means of the segments 439 and 440, with their connecting mechanism, under control of the cam 450, fixed to the shaft 6 and the pad remains there until the later further rotation of the shaft 6 returns the pad to its normal position.

Operating supply station annunciator.

At a desired time during the first half rotation of the shaft 6, the brushes 753 and 754 contact with the segment 751, closing the circuit, and so remain until further rotation of the shaft 6 carries the segment 751 away therefrom. The closing of the circuit is for the purpose of energizing such electrically controlled annunciator at the supply station.

Ejection of token.

During said partial rotation of the shaft 6, as above described, the gear 461 driven by the gear 460 carries the pawl 471, through its connecting mechanism, a desired distance and, by the cooperating ratchet wheel 472 and the pin 473, gives sufficient movement to the plate 497ª to permit a token or commodity demanding piece 510 to be dropped through the openings 495 of the plate 494 and 512 of the base 1, and to cause a new token or piece 500 to be deposited in the previously emptied opening of the plate 497ª. The pawl 481 coacts with the ratchet wheel 472 to maintain this position until a successive operation of the machine.

The partial rotation of the gear 461, by the stud 463 contacting with the arm 569, and through its connecting mechanism operates the counter 550 to record the operation or commodity sale, and thus registers the times the machine has been operated.

Release of second cam shaft.

The same gear 461 operates to cause the stud 463 to contact with the arm 522 and through the connecting mechanism releases the rocker 183, and thus permits a complete rotation of the shaft 174, the latter being driven by the friction gear 176 from a source of power; the retracting of the plunger 188 and the spring 191 and transmitted power cooperating. This friction is preferably performed just prior to the completion of the first half rotation of the shaft 6. During the rotation of the shaft 174 the rocker 183 is returned to its normal position, the tooth 182 and the arm 186 coacting to replace plunger 188 against face 189, and the shaft 174 is brought to rest by the engagement of the tooth 182 and the arm 185.

Printing and punching guest check.

The mitre gears 194 and 195, driven by the rotation of the shaft 174, through the shaft 196 and the eccentric 197 and the box 240 operate the block 220, which both causes the punches 221 which have been set to perforate the guest check or other insert 46, and to impress thereupon such characters 324 as are carried by the type body 323. For example, the name and price of the commodity will be printed for the guest or other purchasers, and the perforations representing this price will be punched in the card. In the totalizing machine these perforations cooperate with the mechanism to add the amounts on the check and to include this check total in the total sales as recorded in said machine. In the normal position of the frame 202 the characters 324 have been inked by the pad 352, the forward movement of the frame 202 having permitted the type body to assume the vertical printing position of Figs. 13 and 14.

Punching the carriage-locating hole in the check.

Simultaneously with the above operation, the tooth 300, acting on the head 72 of the pin 71, which stops the frame 202 in the printing and punching position, causes the pin 71 to puncture the card 46. The tooth also enters either the spaces 70, 70 between the teeth 70ª, 70ª, or the spaces 68, 68 between the teeth 68ª, 68ª (depending on the position of the frame 202), and at the same time releases, by contacting with the tail 302, the pawl 303 from engagement with either the tooth 70ª of the plate 69ª or the tooth 68 of the frame 63, as the case may be, and latching the pawl 303 free from these teeth. Further the tooth 300 holds the frame 202 positively for the desired period just before and after the stop pin 72 has been disengaged from the dog 250.

The return to normal position of the functioning parts of the block 220, when the shaft 174 and the eccentric 196 complete a revolution, leaves the frame 202 free for its return to its normal position when later engaged by the lug on sprocket chain 280. Also, in so far as the punches and type body are concerned, the insert and its frame 45 are free to be withdrawn although other means at this time prevent this withdrawal.

*Printing the seller's identifying mark and feeding paper.*

During the rotation of shaft 174, the cam 383 and connecting mechanism will permit the case 363 under the action of the spring 384, to carry the paper 401 against the inked characters 48 to receive an impression thereof, and then return the case and paper to normal position. The cam 429, after the restoration of the case 363 to its normal position feeds the paper 401 to present a blank surface for a successive printing when a frame 45 next operates the machine; connecting mechanism including the pawl 418, the ratchet wheel 414, the pawl 420 and the drum 431 coacting therewith. The recorded tape is wound and stored about the drum 431, the latter being removed when desired.

*Second release of first cam shaft.*

During the latter part of the rotation of the shaft 174, the cam piece 890 acting on the roller 896 partially rotates the bell-crank 892, causing the operating end of the arm 894 to depress the plunger 37 sufficiently to release the plunger from engagement with the plate 43. The rocker 33 is thus permitted a partial rotation and the arm 24 is disengaged from the tooth 22, under action of the spring 41 and the force transmitted from the source of power. The shaft 6 is thus again released and is rotated for a half turn by friction gear 11. Upon completion of this second half revolution, the tooth 21 engages the arm 26 of the rocker 24 and the shaft 6 is brought to rest in its normal position, a complete cycle of operations having been performed.

*Return of the carriage.*

The start of the shaft 6 on its second half revolution again imparts motion to the sprocket chain 280 and at whatever position the frame 202 may have been stopped, the lug 286 contacts with the depending arm 256 of the bell crank 254, and frame 202 is carried backwardly towards its normal or starting position. The roller 259 of the bell crank 254 is guided by the rail 261 and as the frame approaches its normal position the roller is carried downwardly on the beveled end 262, and permits the lug 286 to rotate the bell crank 254 sufficiently to escape therefrom, leaving the carriage at rest. The pin 1908 on the frame 202 coacts with the face 1907ª of the arm 1901 to partially rotate the latter, thus permitting engagement of the tooth 1907 and the pin 1908 and positively holding or locking the frame 202 in the desired normal position.

*Inking the commodity name and price printing means.*

Upon the approach of the frame 202 to this position of rest, the type body 323 is swung upwardly to horizontal position, just prior to the arresting of frame 202, by arm 333 of the bell crank 332 engaging rack 327 and rotating gear 326. The small further travel of the frame 202 carries the type body against the inked face of the pad 356, keeping the types clean and freshly inked at all times. The spring 335 acts on the bellcrank 332 in a yielding manner during the horizontal position of the type body. The springs 349 and 350 also yield to give the proper impinging action of pad 356.

*Locking the carriage and releasing the guest check frame.*

The further travel of the chain 280 before reaching the normal position carries the lug 287ª into engagement with the projection 165ª of the arm 165ᵇ and by rocking the shaft 167 releases the pawl 168 from the arm 153. Under action of the spring 152 the bell crank 150 is partially rotated thus releasing the tooth 158 of the pawl 156 from the frame 45; the face 157 serving to partially eject the frame 45. Continued travel of the chain 280 carries the lug 287ª past the projection 165 which latter returns to normal operative position under action of its spring.

The pad 438 is returned to its initial position prior to the completion of the rotation of the shaft 6, cam 450 cooperating with the connected mechanism. Also during this rotation of the shaft 6 the pawl 471 is returned to its initial position, the pawl 481 acting to retain the ejecting mechanism in its advanced position.

In Fig. 42 a guest card 46 is shown in the frame 45 with the record of nine transactions thereon. The first order "puree of tomato" has been printed on the card together with the price ".35" (thirty-five cents), as shown at 1100. At the same time the punches have made the perforations 1101, which stand for thirty-five cents, and will be so recognized by the totalizing machine (such as is shown and described in my copending application Ser. No. 562,229) in adding up the total of the guest's bill and also in adding this guest's total into the total sales record in the adding machine.

Line 1102 represents a repeat of this same order with the corresponding price representing perforations 1103. To provide for the proper column spacing of the second item 1102 under the item 1100, when the first item was placed on the check 42, the card was perforated at 1104. A corresponding perforation 1105 was made coincident with the recording of order 1102 whereby the third order would be recorded in proper spacing and alinement with respect to the first and second orders.

The third order 1106 has the corresponding perforations 1107 for sixty-five cents, for use in the totalizing machine in the manner already described. The other records are similarly related down through the entire list, the last line 1108 having the price perforations 1109 corresponding thereto.

The total $4.45 is imprinted on the card as shown at 1118 by the totalizing machine, such as is shown in my said application Ser. No. 562,229, and this amount is also added to the total sales record in the totalizing machine.

The remaining data shown on the card 46 for the identification and completion of the transaction is also imprinted thereon, preferably by the totalizing machine. This dispenses with the necessity of preliminary serially numbered guest checks and also insures a single uninterrupted or connected numbering of all the guest checks issued, as well as the dating of the check, and the imprint of the waiter's identifying number without previous printing.

In fact the entire guest check may be imprinted and recorded in the controller and the totalizing machine.

The card 46 as shown is made with a detachable stub 1119 on which are the duplicate figures at the foot of the guest check. This detachable stub may be used as a waiter's receipt, for cross check or for any other purpose.

A present preferred form of token is shown in Figs. 55 and 56. It is preferably of metal, such as brass and three of the corners are substantially square while the fourth is beveled as shown at 1110 to insure the insertion of the token in correct position in the token depositing machine (represented in diagram in Fig. 45 by numerals 996 and 997 and shown and described in my copending application Ser. No. 548,250).

The token is preferably stamped with the name of the commodity as shown at 1111 and by a commodity number 1112. Means are also provided for the recognition and identification of the token by the token depositing or receiving machine, whereby only tokens for a given commodity will be received, and recorded together, or into a single total. These perforations 1113 also serve in the token receiving machine to remove the charge made against the supplying agent, and thus insure automatically that only a token representing a specific commodity can remove by deposition the charge for that commodity. That is, only the token uttered in charging the dispensing agent can be used in crediting the supplying agent.

This identifying means as embodied comprises perforations 1113 in the token spaced to represent the number "25". The present preferred system of perforations will be clear from a glance at Fig. 56, from which it will be seen that the four perforations 1113 in Fig. 55 correspond to the number 0025 or 25 in Fig. 56. The use of the preliminary zeros in Fig. 55 is to guard against confusion in the operation of the mechanical recognition means for repeating numbers, such as 2, 22, 222 and 2222.

The perforation 1114 is intended to promote the proper coaction of the token with the token receiving machine and to prevent its withdrawal after it has once been inserted in that machine, as is fully described and shown in my application Ser. No. 548,250.

The machine described has completed as above, a cycle of operations and is in readiness for a new operation by a proper presentation of a holder 45. It will be understood that successive repeating of the operation by the holder does not necessarily involve a complete withdrawal of the holder from the machine.

As has been stated, the machines or units are mounted so that the mechanism is inaccessible to anyone except authorized persons, such as an auditor or inspector. In Figs. 46 to 52 mechanism and constructions are shown for mounting and operating the machine units in groups. Accordingly, while the preceding description is that of a complete single machine operating alone, it may be desired to assemble a plurality of such machines in a single section with common power, connections and facilities. In the description which follows the machine referred to will be designated as a unit 850.

In the illustrated embodiment, a frame 900 (Figs. 46, 47, 48 and 49), has the ways 901, 901 and 902, 902 fast thereon, and adapted to receive and slidably retain the members 806 and 807 of each of the units 850. Locking pawls 903, 903, rotatably mounted on the studs 904, 904 fast to the frame 900, are suitably positioned relative to the pins 905, 905 fast to the units 850, 850, and are adapted to coact therewith to lock the units in their operative position, when desired.

The ends of the pawls 903, 903, opposite to the latching ends have fixed thereto the studs 906, 906. A connection 907 is operatively placed adjacent to the pawls 903 in each of the columns of units 850 and have the slots 908, 908 suitably placed relatively to the studs 906, 906 and in engagement therewith. The springs 909, 909, under tension, have their opposed ends suitably fastened to the pawls 903, 903 and the frame 900, and are adapted to keep the studs 906, 906 in contact with an edge of the slots 908, 908 and to act to latch the units 850 when desired.

The arms 910, 910 (Fig. 47), fixed to a rock shaft 911 rotatably mounted in the frame 900, are placed adjacent to ends of the connections 907, 907. One end of the arms 910, 910 have fixed thereto the studs 912, 912, which latter are operatively attached to the connections 907, 907. A depending arm 911ª, fixed to the rock shaft 911, has attached thereto one end of a connection 912ª, the other end of which is operatively attached to an arm 913, fixed to a rock shaft 914, rotatively mounted in the brackets 915, 915, fixed to the frame 900. Also attached to the rock shaft 914 is a suitably shaped arm 916, operatively placed relatively to a cam piece 917, attached to a sleeve 918, which is rotatively mounted in a bracket 919, fixed to the frame 900. The sleeve 918 is adapted to receive a key 918ª and to be partially rotated thereby when desired.

Rotation of the sleeve 918 through the connecting mechanism described above will raise the pawls 903, 903 and disengage the latter from the pins 905, thus permitting the units 850, 850 to be withdrawn as desired. A reverse turn of the key will position the pawls 903, 903 to be engaged by the pins 905, 905 when the units 850, 850 are moved backwardly towards their operative positions, it being evident that the pawls will be partially rotated when first engaged by the pins 905, and, under action of the springs 909, 909, will latch the units 850 in the desired position, and prevent withdrawal unless unlatched by the operation of the key, the slots 908, 908 permitting this rocking action of the pawls 903.

Means are provided for driving all the machine units of the group from a common drive or source of power. As embodied, a motor 920 (Figs. 46 and 47), having as a part thereof the chain gear 921, is suitably mounted on the frame 900. Brackets 922, 922 and brackets 923, 923 are opposedly fixed on the frame 900 and carry the rods 924, 924 and 925, 925 the opposed ends of which are suitably fastened in the brackets 922 and 923.

A bracket 926 is fast on the rods 924 and 925 and to which is fixed also a bracket 926ª. A shaft 927 is rotatably mounted in the bracket 926ª and has fixed thereon a worm 928 and a chain gear 929, the latter suitably placed with respect to the chain gear 921 so that an endless chain 930, in driving engagement with the gears 921 and 929, serves to transmit rotation from the motor to the shaft 927.

A shaft 935 is rotatably mounted in bearings 935ª, 935ª of the bracket 926 and carries fixed thereto a worm gear 936, in driving engagement with the worm 928. Also fixed on the shaft 935 are the bevel gears 938, 938.

The shafts 940, 940 are positioned relatively to the units 850, 850 and are rotatably mounted in bearings in the brackets 941, 941ª (embracing and fixed to the rods 924, 924 and 925, 925). Fast on the shafts 940, 940 are bevel gears 942, 942, each in driving engagement with the adjacent bevel gear 938. It will be understood that there is one shaft for each column of units.

Fast to the shafts 940, 940 are the spiral gears 945, 945 and the gears 946, 946 each set of which are suitably positioned with relation to a unit 850. The gears 946, 946 are adapted to be in driving relation with the gears 933, 933 of the units 850 when the latter are latched in the desired position.

The swing frames 947, 947 (also Figs. 48, 50 and 51) rotatably mounted on the studs 948, 948 fast in the brackets 941ª, 941ª carry fixed thereto and as a part thereof the studs 949, 949. The brackets 941ª, 941ª are fast to the brackets 941, 941. Rotatably mounted on the studs 948, 948 are the spiral gears 950, 950, suitably placed so as to be in driving engagement with the gears 945, 945. Fixed to the gears 950, 950 are the gears 951, 951, in driving engagement with the gears 952, 952, rotatably mounted on the studs 949, 949. The gears 952, 952 are adapted to be in driving engagement with the friction gears 176, 176, of the units 850, 850 when the latter are locked in the operating position in the frame 900.

The studs 955, 955, fast in the frames 947, 947, are suitably positioned between the opposed ends of the adjustable stops 956, 956 and 957, 957, mounted in lugs of the brackets 941ª, 941ª which stops 956, 957 are adapted to limit the angular motion of the frames 947, 947. The springs 958, 958, under tension, have their ends fixed to the studs 959, 959, the opposed ends being suitably fastened to the swing frames 947, 947.

The object of this frame device is for the purpose of easily meshing the gears 952, 952 and gears 176, 176 of the units 850, 850, when the units which have been withdrawn and are replaced in operative position, and further to be a means of adjustment in setting the units in the frame 900.

It will be obvious from the foregoing that means are provided for driving each of the shafts 6 and 174 of the units 850 from the motor 920.

A common token chute or discharge means is preferably provided for the tokens ejected or uttered from any one of the machines of a group. As embodied, (Fig. 47), the vertical chutes 1000, 1000 fixed to the frame 900, one to a column of units 850, with the connecting short chutes 1001, 1001 beneath each of the openings 512 in the bases 1 of the units 850, 850, are provided with baffle plates 1002, 1002 and 1005, 1005 fixed thereto, the whole being suitably positioned to provide passage for the pieces 510, 510 when ejected from the units. The chutes 1000, 1000 are arranged to connect at their lower or discharge ends with the chutes 1003, 1003 each of which has connecting pockets 1004, 1004 projecting through the frame front casing, and thus are provided receptacles for finally receiving the tokens or pieces 510, and from which they may be readily collected.

In the embodied form of electrical circuit connections for the respective units of the group, each of the blocks 1010, 1010 (see also Figs. 48, 49 and 52) of insulating material are suitably positioned relatively to adjacent blocks 830 of each of the units 850, and are fixed to the frame 900. Fixed to the block 1010 and electrically insulated from each other and from the frame 900 are the prongs 1011, 1012, 1013, 1014, 1015, 1016 and 1017, having, respectively, the binding posts 1021, 1022, 1023, 1024, 1025, 1026 and 1027, which prongs are adapted to receive and detachably hold in electrical contact the blades 831, 832, 833, 834, 835, 836, and 837, respectively, of each of the units 850, 850, when the latter are locked in the operative position. Each of the binding posts mounted on the blocks 1010, 1010 have lead wires connected to complete the necessary circuits as clearly shown in Fig. 45.

Connection blocks 1030, 1030 of insulating material are fixed to the frame 900 and carry suitable connecting means as terminals for the leads of the units carried therein as a convenience for attaching such wires as it may be desired to carry to or from more or less remote points and for internal wiring.

It may be desirable to cause the motor 920 if initially at rest to furnish power only when each machine is to be operated. In the present embodiment this is effected by means of a hanging platform 1050, projecting from the front outwardly, one end of which is fulcrumed on the floor at 1051, the opposed end having bearing lugs 1052, 1052 fixed thereto (Figs. 46, 47 and 60). A rod 1053 is carried by the frame 900 and has freely mounted thereon the sleeve 1054. Fast to the sleeve 1054 are the arms 1055, 1055, which carry the rod 1056 upon which latter the bearings 1052, 1052 are rotatably mounted. The springs 1057, 1057, under tension, have one end suitably attached to the arms 1055, 1055, the other end being fastened to the frame 900. An arm 1058 is fast on the sleeve 1054 and at its free end adjustably carries the threaded stud 1059. A piece 1060, fixed to the frame 900 and suitably positioned relative to the arm 1058, acts as a stop against the tension of the springs 1057, 1057. A push button switch 1061, having as part thereof the button 1062, operatively positioned relative to the stud 1059, and adapted to be actuated thereby, is fixed to the frame 900. The switch 1061 is so arranged in the circuit connecting the motor 920 with the source of electrical energy that it will stop and start the motor at will. If desired a suitable automatic starting device may be suitably connected in the motor circuit for better controlling the motor speed and action. The circuit as shown in Fig. 45 is open.

The operator by stepping on the platform 1050 will partially rotate the sleeve 1054, thereby rocking the arm 1050, and by depressing the push button of the switch 1061 makes contact and starts operation of the motor 920. Upon his leaving the platform, the springs 1057 will return the arm 1058 to its position against the stop 1060 and permit the switch 1061 to break the motor circuit and bring the motor and the connected driving mechanism to rest.

It will be evident from the foregoing that individual units may be arranged in a definite combination suitably disposed in a single frame with a common source of power and convenient receptacles for receiving the ejected tokens or commodity pieces. Also that each individual unit may be slidably withdrawn for setting the punches, replacing a type body, recharging the piece magazine, or for any other purpose, and may be readily replaced or others substituted, in operative position and locked in such position in an inaccessible condition excepting as to the check holder presentation. A plurality of the frames, complete with units and necessary power and operating facilities, may be employed to meet such conditions of use as may be called for, or may be similarly constructed to meet individual wants.

The various circuits of the units 850, 850 and connections are shown diagrammatically in Fig. 45, including the motor and other circuits for effecting the described operations as well as for other functions hereinafter referred to. It will be understood that of the three units 850, 850$^a$, 850$^b$, shown in Fig. 45, the units 850$^a$ and 850$^b$ are so designated as to represent a like commodity, and the unit 850 an unlike commodity. Also that such relationship may be indefinitely enlarged or extended.

If desired, the commutator 750 of a unit may close a circuit to operate a more or less remote mechanism for the purpose, for instance, of indicating and recording each operation of the machine so connected. An example of this is the operation by a waiter of an order annunciator or other recording mechanism in the kitchen. The circuit controlling mechanism for effecting this has already been described. It may also be desired to operate such a mechanism by each of a plurality of units. The diagram Fig. 45 clearly shows such arrangements. A mechanism which may be so operated is illustrated and described in my application for Letters Patent Serial Number 449,560 filed March 3, 1921. Restoring means for such indicating and recording mechanisms are also diagrammatically shown in Fig. 45 and are referred to hereinafter.

Further it may be desired to prevent the operation of units or a unit from a more or less remote point, as for instance, the serving station and to afterwards restore the operativeness of the units or of a unit when so desired. For example, at the serving station the commodity called for may be nearing exhaustion and the notification of such a condition may be made by preventing the insertion of the check frame 45 in a machine representing such commodity and setting the signal 623 as hereinbefore described. The circuit controlling mechanism for locking one unit from another has already been described and illustrated. The wiring diagram Fig. 45 illustrates the necessary circuits and switches for accomplishing these functions as will be hereinafter described in connection with the mechanisms so controlling, of the units above mentioned.

A source of electrical energy 980, having the lead wires 981 and 982, is shown suitably connected to terminals on the block 1030 from which the necessary circuits are extended to perform any and all desired electrically controlled functions such as to energize the electro-magnets used in the system and to operate the motor 920.

Two machines, 970 and 971 at the supply station have as a part of their mechanisms the dial feeding means operated by the electro-magnets 972 and 973, respectively, which magnets operate the recording and indicating means. The lead wires 974 and 975 are a part of the electro-magnet 972, and the lead wires 976 and 977 are a part of the electro-magnet 973.

Token controlled means for retroactive operation of the recording means of the machines 970 and 971 have as part of their mechanisms the electro-magnets 972$^a$ and 973$^a$, respectively, with the respective lead wires 974$^a$, 975$^a$, and 976$^a$, 977$^a$.

Manually controlled means for retroactive operation of the indicating means of the machine 970 and 971 have as part of their mechanism the electro-magnets 972$^b$ and 973$^b$, respectively, with the respective lead wires 974$^b$, 975$^b$ and 976$^b$, 977$^b$. The wire 981$^a$ serves as the common lead for the electro-magnets 972, 973, 972$^a$, 973$^a$, 972$^b$ and 973$^b$ from the source of energy 980.

Two machines 996 and 997 conveniently located at the supply station preferably (which may be the same or similar to the machines shown and described in my copending application Ser. No. 548,250) have as a part of their mechanisms the token controlled switches 996$^a$ and 997$^a$, respectively, and the respective manually controlled switches 996$^b$ and 997$^b$. The machine 996 is so connected electrically as to cooperate with the machine 971, and the machine 996 similiarly arranged for cooperation with the machine 970.

The contacts 996$^c$, 996$^d$, and 997$^c$, 997$^d$ serve respectively to close suitable circuits for this cooperation when electrically connected, respectively, with switches 996$^a$, 996$^b$ and 997$^a$, 997$^b$. The wire 998 serves as the common lead for the switches 996$^a$, 996$^b$ and 997$^a$, 997$^b$ from the source of energy 980.

As illustrated the closing of the circuit by switch 996$^a$ and its contact 996$^c$ will energize the magnet 973$^a$ of the machine 971 and similiar operation of the switch 996$^b$ with the cooperation of its contact 996$^d$ will energize the magnet 973$^b$.

In this particular application, the token controlled switch 996$^a$ is operated by the inaccessible deposition of a commodity representing token (uttered from the mechanism of the present application, as for example the token shown in Fig. 55) and steps back one unit of the record of commodity transactions previously made in machine 996 by the issuance of the token from the machine of this application, to correspond with the record made by the inaccessible deposition of the token. That is, for each commodity representing token inaccessibly deposited to represent a transaction completed by the delivery of the commodity from the supply station, the previously made record in machine 996 (which record represents a sale or other transaction made at the dispensing station but not yet consummated by delivery of the commodity at the supply station) is set back one unit, thus passing from a record of a partly completed transaction to a record of a completed transaction, that is at the supply station changing a debit to a credit.

The manually controlled switch 996$^b$ is the means by which the attendant at the supply station voluntarily sets back the other and independent record so that he may have an independent record, free from recollection or mental calculation on his part of how far he has prepared or consummated by delivery or otherwise the sales or dispensations made by the sales or other corresponding agent. Similarly the suitable operation of the switch 997$^a$ and the switch 997$^b$ with the cooperation of their respective contacts 997$^c$ and 997$^d$ will energize respectively the magnets 972$^a$ and 972$^b$ of the machine 970. As illustrated the circuits concerned are open.

The same is true of switches 997$^a$ and 997$^b$ for another token receiving machine, which consequently need not be described in detail.

My copending application, Ser. No. 548,250, clearly sets forth the mechanism involved in the performance referred to above, and are electrically controlled by the circuit controlling mechanism herein shown and precedingly described.

A double throw switch 983 has connected thereto the wire 984, in circuit with the source of energy 980 and is adapted to contact with the terminals 985 and 986, to which are connected, respectively, the wires 987 and 988, it being understood that each circuit is separably closed by contact of the switch 983 with the respective terminals. As illustrated both circuits are open.

A terminal 985 is in circuit with the electro-magnets 581, 581 of a plurality of units 850$^a$, 850$^b$, the wires 987 and 582, 583 so connecting the terminal 985 that contact of the switch 983 with the terminal 985 will energize the electro-magnets 581, 581 of the above-mentioned units, and, as hereinbefore described, prevent the travel of the guest check or like frame 45 to the position which causes the operation of the units 850$^a$, 850$^b$.

A terminal 986 is in circuit with the electro-magnet 604, 604 of the units 850$^a$, 850$^b$, the wires 988, 605, 607 so connecting it. Contact of the switch 983 with the terminal 986 will energize the electro-magnets 604, 604 of the units 850$^a$, 850$^b$, and, as hereinbefore described, permit their operation when desired As illustrated the circuits are open.

Similarly a switch 990 is connected to the lead wire 984, and is adapted to contact with the terminal 992 and 993, to which are connected the wires 994 and 995, respectively. Each circuit is separately closed, similarly to the former case, by contact of the switch 990 with each of the terminals 992 and 993. As illustrated the circuit is open.

The terminal 992 is in circuit with the electro-magnet 581 of the unit 850, and the terminal 993 is in circuit with the magnet 604. The operation of the switch 990 performs the same functions in the unit 850 as previously described for the switch 983 relatively to the units 850$^a$ and 850$^b$.

The switch 735 of the unit 850$^a$ is adapted to close its circuit when the frame 45 is used in this unit. As shown in the diagram, this circuit will operate the magnet 661 of the unit 850$^b$, preventing the operation of this latter unit until the withdrawal of the frame 45 from the unit 850$^a$, as previously described.

Likewise the insertion of the frame 45 in the unit 850$^b$ will cause the switch 735 of this unit to operate the magnet 661 of the unit 850$^a$, preventing the operation of this latter unit. The withdrawal of the frame 45 from the unit 850$^b$ will then permit the operation of the unit 850$^a$, as previously described.

It will be obvious that only the unit 850$^a$ will be permitted to operate the indicating device 970 in the former case, and in the latter case only the unit 850$^b$ will so operate. The switch 999 is shown as adapted by contact with terminal 999$^a$ to close circuit for operation of the motor 920.

In Figs. 57 and 58 is shown another embodiment of a mechanism for registering and locking the guest card carrying, or equivalent, frame 45, during the printing and perforating operation of the machine, and also releases to put the machine into operation.

In the place of the arm 139 (Figs. 57 and 58) there is rigidly fastened on the rock shaft 133 an arm 1200, having a face 1201 and a projecting portion 1202 at the opposed end. A pin 1203 is fast in the bracket 134 and carries one end of a spring 1204, under tension, the other end of which is held by a pin 1205 fast in the arm 1200. The pin 1203 is adapted to coact with the face 1201 to properly position both the arms 135 and 1200 against the tension of the spring 1204, when desired.

A screw 1206 is adjustably threaded into the projecting portion 1202 of the arm 1200 and has its head 1207 operatively placed relatively to the arm 685. The projection 690 of the arm 685, as hereinbefore described, is in the path of the frame 45 when the latter, under propulsion, is nearing its position of rest when in contact with the pin 720.

A pin 1220 is fast in the frame 63 and projects therefrom and is slidable in block 60 at 1222, and has its free end partially tapered. Pin 1220 is also adapted to freely enter a hole 1221 in the separated portion 78 of the block 60.

A hole 1223 is suitably positioned in the frame 45 relatively to one edge and to the end 45$^a$, so that when the latter is in contact with the pin 720, the hole 1223 is in register with the pin 1220.

It will be understood that, in addition to the elimination of the arm 139, the following parts are also omitted from the unit 850 when replaced by the above modification, namely, the connection 140 and all its connecting mechanism, the brackets 148 and 161, and all parts carried thereby. Also, the hole 49 in the frame may be disregarded, being replaced by the hole 1223.

Obviously from the foregoing the face 45$^a$ of the frame 45 will, when the latter is suitably propelled, contact with the projection 690 of the arm 685 and the latter will engage the head 1207 of the screw 1206 and thereby partially rotate the shaft 133. The piece 137 will depress the plunger 29 and thus permit the partial rotation of the shaft 6. The movement of the frame 63, as controlled by the shaft 6 and the coacting parts, will give movement to the frame 63 and cause the pin 1220 to engage the hole 1223 and positively locate or register and lock the frame 45 in the desired position until released by the return of the frame 63 to its initial position as hereinbefore set forth. The spring 686 is adapted to partially eject the frame 45 upon the release of the latter.

In both this form and that shown in the preceding figures, the arm 690, which constitutes part of the mechanism for locking this controller from another controller or other cooperating machine, is positioned to prevent the further insertion of the frame 45 and thus prevents its passing inwardly and engaging the mechanism which releases or calls into operation this machine (see Figs. 23, 24, 57 and 58).

Means are preferably provided by the invention for indicating at a distant point, such as the station or office of a supervisor or attendant, the approaching exhaustion of the supply of tokens in any machine. As embodied (Figs. 30 and 45) the block 513 is provided with a pin 1120, preferably covered with insulation, which closes a switch 1121 when the token supply is nearly exhausted. The switch 1121 is normally held in open circuit position by any suitable means such as a spring 1122. Three devices are shown in Fig. 45, corresponding to the three controllers shown in that figure. In circuit with each of the devices just described is a suitable indicating device, located at the distant station, such as an annunciator 1123. Thus the supply of tokens in each machine will automatically indicate the need of replenishment to the attendant at his distant station.

From all the foregoing it will be understood that a machine has been provided realizing the objects and advantages herein set forth, and it will be understood that the invention is not limited to the precise structures shown and described, or the precise applications of the invention mentioned, but that changes may be made therein within the scope of the accompanying claims without departing from the principles of the invention and without sacrificing its chief advantages.

What I claim is:—

1. A commodity sale controlling mechanism including in combination a seller identifying actuator, an automatic controlling mechanism cooperating therewith and operated by the actuator to utter from an inaccessible magazine a commodity demanding token and to inaccessibly record the identity of the seller.

2. A commodity sale controlling mechanism including in combination a seller identifying actuator, an automatic controlling mechanism cooperating therewith and operated by the actuator to utter from an inaccessible magazine a commodity demanding token and to inaccessibly record the identity of the seller and add the transaction in an inaccessible total-showing mechanism.

3. A commodity sale controlling mechanism including in combination a seller identifying actuator, an automatic controlling mechanism cooperating therewith and operated by the actuator to utter from an inaccessible magazine a commodity demanding token and to record the transaction on the actuator.

4. A commodity sale controlling mechanism including in combination a seller identifying actuator, an automatic controlling mechanism cooperating therewith and operated by the actuator to utter from an inaccessible magazine a commodity demanding token and to record the transaction on the actuator and add the transaction in an inaccessible total-showing mechanism.

5. A commodity sale controlling mechanism including in combination a seller identifying actuator, an automatic controlling mechanism cooperating therewith and operated by the actuator to utter from an inaccessible magazine a commodity demanding token and to add the commodity quantity in an inaccessible total-showing mechanism.

6. A commodity sale controlling mechanism including in combination a seller identifying actuator, an automatic controlling mechanism cooperating therewith and operated by the actuator to utter from an inaccessible magazine a commodity demanding token, and to inaccessibly record in the controlling mechanism the identity of the seller and to record the transaction on the actuator.

7. A commodity sale controlling mechanism including in combination a seller identifying actuator, an automatic controlling mechanism cooperating therewith and operated by the actuator to utter from an inaccessible magazine a commodity demanding token and to inaccessibly record in the controlling mechanism the identity of the seller and to record the money value of the token.

8. A commodity sale controlling mechanism including in combination a seller identifying actuator, an automatic controlling mechanism cooperating therewith and operated by the actuator to utter from an inaccessible magazine a commodity demanding token and to inaccessibly record the identity of the seller and record the price of the sold commodity on the actuator.

9. A commodity sale controlling mechanism including in combination a seller identifying actuator, an automatic controlling mechanism cooperating therewith and operated by the actuator to utter from an inaccessible magazine a commodity demanding token and to record the money value of the uttered token on the actuator and record the price of the sold commodity on the actuator.

10. A commodity sale controlling mechanism including in combination a separate actuator in the possession of the seller, an automatic controlling mechanism cooperating therewith and operated by the actuator to utter from an inaccessible magazine a commodity demanding token and to add the transaction in an inaccessible total-showing mechanism.

11. A commodity sale controlling mechanism including in combination a separate actuator in the possession of the seller, an automatic controlling mechanism cooperating therewith and operated by the actuator to utter from an inaccessible magazine a commodity demanding token and to inaccessibly record the identity of the seller.

12. A commodity sale controlling mechanism including in combination a separate actuator in the possession of the seller, an automatic controlling mechanism cooperating therewith and operated by the actuator to utter from an inaccessible magazine a commodity demanding token and to record the transaction on the actuator.

13. A commodity sale controlling mechanism including in combination a separate actuator in the possession of the seller, an automatic controlling mechanism cooperating therewith and operated by the actuator to utter from an inaccessible magazine a commodity demanding token and to add the commodity quantity in an inaccessible total-showing mechanism.

14. A commodity sale controlling mechanism including in combination a separate actuator in the possession of the seller, an automatic controlling mechanism cooperating therewith and operated by the actuator to utter from an inaccessible magazine a commodity demanding token and to add the commodity quantity in an inaccessible total-showing mechanism and to mark the price of the commodity on the actuator.

15. A commodity sale controlling mechanism including in combination a seller identifying actuator, an automatic controlling mechanism cooperating therewith and operated by the actuator to utter from an inaccessible magazine a commodity demanding token and to mark the money value of the commodity on the actuator in a form to correspondingly operate a computing machine.

16. A commodity sale controlling mechanism including in combination a seller identifying actuator, an automatic controlling mechanism cooperating therewith and operated by the actuator to utter from an inaccessible magazine a commodity demanding token and to add the transaction in an inaccessible total-showing mechanism and to mark the money value of the commodity on the actuator in a form to correspondingly operate a computing machine.

17. A commodity sale controlling mechanism including in combination a seller identifying actuator, an automatic controlling mechanism cooperating therewith and operated by the actuator to utter from an inaccessible magazine a commodity demanding token and to inaccessibly record the identity of the seller and to mark the money value of the commodity on the actuator in a form to correspondingly operate a computing machine.

18. A commodity sale controlling mechanism including in combination a seller identifying actuator, an automatic controlling mechanism cooperating therewith and operated by the actuator to utter from an inaccessible magazine a commodity demanding token and to record the transaction on the actuator and to mark the money value of the commodity on the actuator in a form to correspondingly operate a computing machine.

19. A commodity sale controlling mechanism including in combination a seller identifying actuator, an automatic controlling mechanism cooperating therewith and operated by the actuator to utter from an inaccessible magazine a commodity demanding token and to record the price of the sold commodity on the actuator and to mark the money value of the commodity on the actuator in a form to correspondingly operate a computing machine.

20. A commodity sale controlling mechanism including in combination a seller identifying actuator, an automatic controlling mechanism cooperating therewith and operated by the actuator to utter from an inaccessible magazine a commodity demanding token and to add the commodity quantity in an inaccessible total-showing mechanism and to mark the money value of the commodity on the actuator in a form to correspondingly operate a computing machine.

21. A commodity sale controlling mechanism including in combination a seller identifying actuator, an automatic controlling mechanism cooperating therewith and operated by the actuator to record on the actuator the price of the commodity sold.

22. A commodity sale controlling mechanism including in combination a seller identifying actuator, an automatic controlling mechanism cooperating therewith and operated by the actuator to record on the actuator the price of the commodity sold and to record inaccessibly in the controlling mechanism the quantity of commodity sold.

23. A commodity sale controlling mechanism including in combination a seller identifying actuator, an automatic controlling mechanism cooperating therewith and operated by the actuator to record the transaction on the actuator and also inaccessibly within the controlling mechanism.

24. A commodity sale controlling mechanism including in combination a seller identifying actuator, an automatic controlling mechanism cooperating therewith and operated by the actuator to record inaccessibly in the controlling mechanism the identity of the seller and to record the transaction on the actuator.

25. A commodity sale controlling mechanism including in combination a seller identifying actuator, an automatic controlling mechanism cooperating therewith and operated by the actuator to record inaccessibly in the controlling mechanism the identity of the seller and to record the money value of the transaction on the actuator.

26. A commodity sale controlling mechanism including in combination a seller identifying actuator, an automatic controlling mechanism cooperating therewith and operated by the actuator to mark the money value of the commodity on the actuator in a form to correspondingly operate a computing machine.

27. A commodity sale controlling mechanism including in combination a seller identifying actuator, an automatic controlling mechanism cooperating therewith and operated by the actuator to mark the money value of the commodity on the actuator in a form to correspondingly operate a computing machine and to record inaccessibly in the controlling mechanism the quantity of the commodity.

28. A commodity sale controlling mechanism including in combination a separate actuator in the possession of the seller, an automatic controlling mechanism cooperating therewith and operated by the actuator to record on the actuator the price of the commodity sold.

29. A commodity sale controlling mechanism including in combination a separate actuator in the possession of the seller, an automatic controlling mechanism cooperating therewith and operated by the actuator to record on the actuator the price of the commodity sold and to record inaccessibly in the controlling mechanism the quantity of commodity sold.

30. A commodity sale controlling mechanism including in combination a separate actuator in the possession of the seller, an automatic controlling mechanism cooperating therewith and operated by the actuator to record the transaction on the actuator.

31. A commodity sale controlling mechanism including in combination a separate actuator in the possession of the seller, an automatic controlling mechanism cooperating therewith and operated by the actuator to record the transaction on the actuator, and also inaccessibly within the controlling mechanism.

32. A commodity sale controlling mechanism including in combination a separate actuator in the possession of the seller, an automatic controlling mechanism cooperating therewith and operated by the actuator to record inaccessibly in the controlling mechanism the identity of the seller and to record the transaction on the actuator.

33. A commodity sale controlling mechanism including in combination a separate actuator in the possession of the seller, an automatic controlling mechanism cooperating therewith and operated by the actuator to record inaccessibly in the controlling mechanism the identity of the seller and to record the money value of the transaction on the actuator.

34. A commodity sale controlling mechanism including in combination a separate actuator in the possession of the seller, an automatic controlling mechanism cooperating therewith and operated by the actuator to mark the money value of the commodity on the actuator in a form to correspondingly operate a computing machine.

35. A commodity sale controlling mechanism including in combination a separate actuator in the possession of the seller, an automatic controlling mechanism cooperating therewith and operated by the actuator to mark the money value of the commodity on the actuator in a form to correspondingly operate a computing machine and to record inaccessibly in the controlling mechanism the quantity of the commodity.

36. A commodity sale controlling mechanism including in combination a seller identifying actuator adapted to automatically operate a controlling mechanism, an automatic controlling mechanism cooperating therewith and operated automatically by the actuator to utter from an inaccessible magazine a commodity demanding token and to inaccessibly record the identity of the seller.

37. A commodity sale controlling mechanism including in combination a seller identifying actuator adapted to automatically operate a controlling mechanism, an automatic controlling mechanism cooperating therewith and operated automatically by the actuator to utter from an inaccessible magazine a commodity demanding token and to record the transaction on the actuator.

38. A commodity sale controlling mechanism including in combination a seller identifying actuator adapted to automatically operate a controlling mechanism, an automatic controlling mechanism cooperating therewith and operated automatically by the actuator to utter from an inaccessible magazine a commodity demanding token and to record the price of the sold commodity on the actuator.

39. A commodity sale controlling mechanism including in combination a seller identifying actuator adapted to automatically operate a controlling mechanism, an automatic controlling mechanism cooperating therewith and operated automatically by the actuator to utter from an inaccessible magazine a commodity demanding token and to record the money value of the uttered token on the actuator.

40. A commodity sale controlling mechanism including in combination a seller identifying actuator adapted to automatically operate a controlling mechanism, an automatic controlling mechanism cooperating therewith and operated automatically by the actuator to utter from an inaccessible magazine a commodity demanding token and to add the commodity quantity in an inaccessible total-showing mechanism.

41. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to add the transaction in an inaccessible total-showing mechanism.

42. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to inaccessibly record the identity of the seller.

43. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to record the transaction on the actuator.

44. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to record the price of the sold commodity on the actuator.

45. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to record the money value of the uttered token on the actuator.

46. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to add the commodity quantity in an inaccessible total-showing mechanism.

47. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to add the commodity quantity in an inaccessible total-showing mechanism and to mark the price of the commodity on the actuator.

48. A commodity sale controlling mechanism including in combination a separate actuator in the possession of the seller, an automatic controlling mechanism cooperating therewith and operated by the actuator to utter from an inaccessible magazine a commodity demanding token and to mark the money value of the commodity on the actuator in a form to correspondingly operate a computing machine.

49. A commodity sale controlling mechanism including in combination a separate actuator in the possession of the seller, an automatic controlling mechanism cooperating therewith and operated by the actuator to utter from an inaccessible magazine a commodity demanding token and to add the transaction in an inaccessible total-showing mechanism and to mark the money value of the commodity on the actuator in a form to correspondingly operate a computing machine.

50. A commodity sale controlling mechanism including in combination a separate actuator in the possession of the seller, an automatic controlling mechanism cooperating therewith and operated by the actuator to utter from an inaccessible magazine a commodity demanding token and to inaccessibly record the identity of the seller and to mark the money value of the commodity on the actuator in a form to correspondingly operate a computing machine.

51. A commodity sale controlling mechanism including in combination a separate actuator in the possession of the seller, an automatic controlling mechanism cooperating therewith and operated by the actuator to utter from an inaccessible magazine a commodity demanding token and to record the transaction on the actuator and to mark the money value of the commodity on the actuator in a form to correspondingly operate a computing machine.

52. A commodity sale controlling mechanism including in combination a separate actuator in the possession of the seller, an automatic controlling mechanism cooperating therewith and operated by the actuator to utter from an inaccessible magazine a commodity demanding token and to record the price of the sold commodity on the actuator and to mark the money value of the commodity on the actuator in a form to correspondingly operate a computing machine.

53. A commodity sale controlling mechanism including in combination a separate actuator in the possession of the seller, an automatic controlling mechanism cooperating therewith and operated by the actuator to utter from an inaccessible magazine a commodity demanding token and to record the money value of the uttered token on the actuator and to mark the money value of the commodity on the actuator in a form to correspondingly operate a computing machine.

54. A commodity sale controlling mechanism including in combination a separate actuator in the possession of the seller, an automatic controlling mechanism cooperating therewith and operated by the actuator to utter from an inaccessible magazine a commodity demanding token and to add the commodity quantity in an inaccessible total-showing mechanism and to mark the money value of the commodity on the actuator in a form to correspondingly operate a computing machine.

55. A commodity sale controlling mechanism including in combination a seller identifying actuator, an automatic controlling mechanism cooperating therewith and operated by the actuator to utter from an inaccessible magazine a commodity demanding token and to record the transaction on the actuator and means for causing successive transactions to be recorded in desired alinement on the actuator.

56. A commodity sale controlling mechanism including in combination a seller identifying actuator, an automatic controlling mechanism cooperating therewith and operated by the actuator to utter from an inaccessible magazine a commodity demanding token and to record the transaction on the actuator and means operating upon the actuator to cause successive transactions to be recorded in desired alinement on the actuator.

57. A commodity sale controlling mechanism including in combination a separate actuator in the possession of the seller, an automatic controlling mechanism cooperating therewith and operated by the actuator to utter from an inaccessible magazine a commodity demanding token and to record the transaction on the actuator and means for causing successive transactions to be recorded in desired alinement on the actuator.

58. A commodity sale controlling mechanism including in combination a separate actuator in the possession of the seller, an automatic controlling mechanism cooperating therewith and operated by the actuator to utter from an inaccessible magazine a commodity demanding token and to record the transaction on the actuator and means operating upon the actuator to cause successive transactions to be recorded in desired alinement on the actuator.

59. A commodity sale controlling mechanism including in combination a seller identifying actuator, an automatic controlling mechanism cooperating therewith and operated by the actuator to utter from an inaccessible magazine a commodity demanding token and to record the transaction on the actuator and to mark the money value of the commodity on the actuator in a form to correspondingly operate a computing machine and means for causing successive transactions to be recorded in desired alinement on the actuator.

60. A commodity sale controlling mechanism including in combination a seller identifying actuator, an automatic controlling mechanism cooperating therewith and operated by the actuator to utter from an inaccessible magazine a commodity demanding token and to record the transaction on the actuator and to mark the money value of the commodity on the actuator in a form to correspondingly operate a computing machine and means operating upon the actuator to cause successive transactions to be recorded in desired alinement on the actuator.

61. A commodity sale controlling mechanism including in combination a seller identifying actuator adapted to automatically operate a controlling mechanism, an automatic controlling mechanism cooperating therewith and operated automatically by the actuator to utter from an inaccessible magazine a commodity demanding token and to record the transaction on the actuator and means for causing successive transactions to be recorded in desired alinement on the actuator.

62. A commodity sale controlling mechanism including in combination a seller identifying actuator adapted to automatically operate a controlling mechanism, an automatic controlling mechanism cooperating therewith and operated automatically by the actuator to utter from an inaccessible magazine a commodity demanding token and to record the transaction on the actuator and means operating upon the actuator to cause successive transactions to be recorded in desired alinement on the actuator.

63. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to record the transaction on the actuator and means for causing successive transactions to be recorded in desired alinement on the actuator.

64. A commodity sale controlling mechanism including in combination a separate actuator in the possession of the seller adapted to automatically operate a controlling mechanism, an automatic controlling mechanism cooperating therewith and operated automatically by the actuator to utter from an inaccessible magazine a commodity demanding token and to record the transaction on the actuator and means operating upon the actuator to cause successive transactions to be recorded in desired alinement on the actuator.

65. A commodity sale controlling mechanism including in combination a separate actuator in the possession of the seller, an automatic controlling mechanism cooperating therewith and operated by the actuator to utter from an inaccessible magazine a commodity demanding token and to record the transaction on the actuator, and to mark the money value of the commodity on the actuator in a form to correspondingly operate a computing machine and means for causing successive transactions to be recorded in desired alinement on the actuator.

66. A commodity sale controlling mechanism including in combination a separate actuator in the possession of the seller, an automatic controlling mechanism cooperating therewith and operated by the actuator to utter from an inaccessible magazine a commodity demanding token and to record the transaction on the actuator and to mark the money value of the commodity on the actuator in a form to correspondingly operate a computing machine and means operating upon the actuator to cause successive transactions to be recorded in desired alinement on the actuator.

67. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom when the purchaser's check is brought into cooperative relation by said means, and means operated thereby for recording the transaction on the purchaser's check.

68. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom when the purchaser's check is brought into cooperative relation by said means, means operated thereby for recording the transaction on the purchaser's check, and means operated thereby for recording the transaction inaccessibly within the controlling mechanism.

69. A commodity sale controlling mechanism including in combination an automatic controlling mechanism, means for bringing a purchaser's check into cooperative relation therewith, and means operated thereby for recording the transaction on the purchaser's check.

70. A commodity sale controlling mechanism including in combination an automatic controlling mechanism, means for bringing a purchaser's check into cooperative relation therewith, means operated thereby for recording the transaction on the purchaser's check, and means operated thereby for recording the transaction inaccessibly within the controlling mechanism.

71. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom operating automatically when the purchaser's check is brought into cooperative relation by said means, and means operated thereby for recording the transaction on the purchaser's check.

72. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom operating automatically when the purchaser's check is brought into cooperative relation by said means, means operated thereby for recording the transaction on the purchaser's check, and means operated thereby for recording the transaction inaccessibly within the controlling mechanism.

73. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom operating automatically when the purchaser's check is brought into cooperative relation by said means, and means operated thereby for recording the transaction on the purchaser's check.

74. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom when the purchaser's check is brought into cooperative relation by said means, and means for marking the money value of the token on the purchaser's check in a form to correspondingly operate a computing machine.

75. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom when the purchaser's check is brought into cooperative relation by said means, means operated thereby for recording the transaction on the purchaser's check, and means for marking the money value of the token on the purchaser's check in a form to correspondingly operate a computing machine.

76. A commodity sale controlling mechanism including in combination an automatic controlling mechanism, means for bringing a purchaser's check into cooperative relation therewith, means operated thereby for recording the transaction on the purchaser's check, and means for marking the money value of the token on the purchaser's check in a form to correspondingly operate a computing machine.

77. A commodity sale controlling mechanism including in combination an automatic controlling mechanism, means for bringing a purchaser's check into cooperative relation therewith, means operated thereby for recording the transaction on the purchaser's check, means operated thereby for recording the transaction inaccessibly within the controlling mechanism, and means for marking the money value of the token on the purchaser's check in a form to correspondingly operate a computing machine.

78. A commodity sale controlling mechanism including in combination an automatic controlling mechanism means for bringing a purchaser's check into cooperative relation therewith, and means for marking the money value of the token on the purchaser's check in a form to correspondingly operate a computing machine.

79. A commodity sale controlling mechanism including in combination an automatic controlling mechanism, means for bringing the purchaser's check into cooperative relation therewith, a magazine for commodity-demanding tokens located inaccessibly within the controlling mechanism, means for uttering a token therefrom when the purchaser's check is brought into cooperative relation by said means, means operated thereby for recording the transaction on the purchaser's check, and means for causing the recording of successive transactions to be made automatically in a desired alinement upon the purchaser's check.

80. A commodity sale controlling mechanism including in combination an automatic controlling mechanism, means for bringing a purchaser's check into cooperative relation therewith, means operated thereby for recording the transaction on the purchaser's check, and means for causing the recording of successive transactions to be made automatically in a desired alinement upon the purchaser's check.

81. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom operating automatically when the purchaser's check is brought into cooperating relation by said means, means operated thereby for recording the transaction on the purchaser's check, and means for causing the recording of successive transactions to be made automatically in a desired alinement upon the purchaser's check.

82. A commodity sale controlling mechanism including in combination a seller identifying actuator, an automatic controlling mechanism cooperating therewith and operated by the actuator to utter from an inaccessible magazine a commodity demanding token and to mark the money value of the commodity on the actuator in a form to correspondingly operate a computing machine, and means for automatically causing successive money value markings to be made in a desired alinement upon the purchaser's check.

83. A commodity sale controlling mechanism including in combination a seller identifying actuator, an automatic controlling mechanism cooperating therewith and operated by the actuator to mark the money value of the commodity on the actuator in a form to correspondingly operate a computing machine, and means for automatically causing successive money value markings to be made in a desired alinement upon the purchaser's check.

84. A commodity sale controlling mechanism including in combination a separate actuator in the possession of the seller, an automatic controlling mechanism cooperating therewith and operated by the actuator to mark the money value of the commodity on the actuator in a form to correspondingly operate a computing machine, and means for automatically causing successive money value markings to be made in a desired alinement upon the purchaser's check.

85. A commodity sale controlling mechanism including in combination a separate actuator in the possession of the seller, an automatic controlling mechanism cooperating therewith and operated by the actuator to utter from an inaccessible magazine a commodity demanding token and to mark the money value of the commodity on the actuator in a form to correspondingly operate a computing machine, and means for automatically causing successive money value markings to be made in a desired alinement upon the purchaser's check.

86. A commodity sale controlling mechanism including in combination price indicating means inaccessible to the user of the mechanism and including devices settable to indicate a desired price, and means operated by the insertion of a record-receiving check for recording each sale.

87. A commodity sale controlling mechanism including in combination price indicating means inaccessible to the user of the mechanism and including devices settable to indicate a desired price, and means operated by the insertion of a record-receiving check for recording each sale both within the machine and upon said check.

88. A commodity sale controlling mechanism including in combination price indicating means inaccessible to the user of the mechanism and including devices settable to indicate a desired price, and means operable by the insertion into the mechanism of a record-receiving member for recording each transaction and its price.

89. A commodity sale controlling mechanism including in combination price indicating means inaccessible to the user of the mechanism and including devices settable to indicate a desired price, and means operable by the insertion into the mechanism of a record-receiving member for recording the transaction upon the record-receiving member and also inaccessibly within the machine.

90. A commodity sale controlling mechanism including in combination price indicating means inaccessible to the user of the mechanism and including devices settable to indicate a desired price, and means operable by the insertion into the mechanism of a device carrying a purchaser's check for recording each transaction and its price.

91. A commodity sale controlling mechanism including in combination price indicating means inaccessible to the user of the mechanism and including devices settable to indicate a desired price, and means operable by the insertion into the mechanism of a device carrying a purchaser's check for recording the transaction upon the purchaser's check and also inaccessible within the mechanism.

92. A commodity sale controlling mechanism including in combination price indicating means inaccessible to the user of the mechanism and including price indicating perforating mechanism and means for causing said mechanism to perforate an inserted check with the price indication.

93. A commodity sale controlling mechanism including in combination price indicating means in accessible to the user of the mechanism and including price indicating perforating mechanism and means for causing said mechanism to perforate an inserted check with a price indication recognizable by a computing machine.

94. A commodity sale controlling mechanism including in combination price indicating means inaccessible to the user of the mechanism and including price indicating perforating mechanism and means for causing said mechanism to perforate an inserted check with the price indication and means for locating the price-perforations for successive transactions in a desired alinement.

95. A commodity sale controlling mechanism including in combination price indicating means inaccessible to the user of the mechanism and including price-indicating perforating mechanism, means for receiving a record-receiving check and means called into action thereby for perforating in the check the price indication.

96. A commodity sale controlling mechanism including in combination price indicating means inaccessible to the user of the mechanism and including price-indicating perforating mechanism, settable to indicate a desired price, and means for causing said mechanism to perforate an inserted check with the price indication.

97. A commodity sale controlling mechanism including in combination price indicating means inaccessible to the user of the mechanism and including price-indicating perforating mechanism settable to indicate a desired price, and means for causing said mechanism to perforate an inserted check with a price indication recognizable by a computing machine.

98. A commodity sale controlling mechanism including in combination price indicating means inaccessible to the user of the mechanism and including printing devices and devices for making price indications recognizable by a computing machine.

99. A commodity sale controlling mechanism including in combination price indicating means inaccessible to the user of the mechanism and including printing devices and devices for making price indications recognizable by a computing machine and means for printing and also for making the price-indicating marks on a purchaser's check.

100. A commodity sale controlling mechanism including in combination price indicating means inaccessible to the user of the mechanism and including printing devices and devices for making price indications recognizable by a computing machine and means operable by the insertion of a purchaser's check for printing and also for making the price-indicating marks on the purchaser's check.

101. A commodity sale controlling mechanism including in combination price indicating means inaccessible to the user of the mechanism and including price-indicating perforating mechanism and means operated by the insertion of a purchaser's check for causing said mechanism to perforate an inserted check with the price indication.

102. A commodity sale controlling mechanism including in combination price indicating means inaccessible to the user of the mechanism and including devices settable to indicate a desired price, means for inaccessibly recording each transaction and its price, and means operating with said recording means to discharge a corresponding mechanically recognizable commodity-demanding token.

103. A commodity sale controlling mechanism including in combination price indicating means inaccessible to the user of the mechanism and including devices settable to indicate a desired price, means for recording each transaction and its price upon an insertible and withdrawable record-receiving member, and means operating with said recording means to discharge a corresponding mechanically recognizable commodity-demanding token.

104. A commodity sale controlling mechanism including in combination price indicating means inaccessible to the user of the mechanism and including devices settable to indicate a desired price, and means for recording each sale, and means operating with said recording means to discharge a corresponding previously inserted commodity-demanding token.

105. A commodity sale controlling mechanism including in combination price indicating means inaccessible to the user of the mechanism and including devices inaccessibly settable to indicate a desired price, means for recording each sale upon an insertible and withdrawable record-receiving member, and means operating with said recording means to discharge a corresponding previously inserted commodity-demanding token.

106. A commodity sale controlling mechanism including in combination price indicating means inaccessible to the user of the mechanism and including devices settable to indicate a desired price, means operated by the insertion of a record-receiving check for recording each sale upon an insertible and withdrawable record-receiving member, and means operating with said recording means to discharge a corresponding commodity-demanding token.

107. A commodity sale controlling mechanism including in combination price indicating means inaccessible to the user of the mechanism and including price-indicating perforating mechanism and means for causing said mechanism to perforate an inserted check with a price indication recognizable by a computing machine, and means operating with said recording means to discharge a corresponding commodity-demanding token.

108. A commodity sale controlling mechanism including in combination price indicating inaccessible to the user of the mechanism and including printing devices and devices for making price indications recognizable by a computing machine, and means operating with said recording means to discharge a corresponding commodity-demanding token.

109. A commodity sale controlling mechanism including in combination a carrier having transaction recording means, and means operated by the insertion of a record-receiving member for relatively positioning the carrier and member and for recording the transaction on said member.

110. A commodity sale controlling mechanism including in combination a carrier having transaction recording means, and means including mechanism for traveling said carrier operated by the insertion of a record-receiving member for relatively positioning the carrier and member and for recording the transaction on said member.

111. A commodity sale controlling mechanism including in combination a carrier having transaction recording means, and means operated by the insertion of a record-receiving member for relatively positioning the carrier and member and for recording the transaction in alined position with the record of other transactions on said member.

112. A commodity sale controlling mechanism including in combination a carrier having transaction recording means, and means including mechanism for traveling said carrier operated by the insertion of a record-receiving member for relatively positioning the carrier and member and for recording the transaction in alined position with the record of other transactions on said member.

113. A commodity sale controlling mechanism including in combination a carrier having a variable path of travel and transaction recording means, and means operated by the insertion of a record-receiving member for relatively positioning the carrier and member and for recording the transaction on said member.

114. A commodity sale controlling mechanism including in combination a carrier having a variable path of travel and transaction recording means, and means operated by the insertion of a record-receiving member for relatively positioning the carrier and member and for recording the transaction in alined position with the record of other transactions on said member.

115. A commodity sale controlling mechanism including in combination a carrier having transaction recording means, means for traveling the carrier, means for receiving a record-receiving member into the mechanism, means for stopping the carrier in position to record upon said member, and means for causing the transaction recording means to record the transaction upon said member.

116. A commodity sale controlling mechanism including in combination a carrier having transaction recording means, means for traveling the carrier, means for receiving a record-receiving member into the mechanism, means controlled by said record-receiving member for stopping the carrier in position to record upon said member, and means for causing the transaction recording means to record the transaction upon said member.

117. A commodity sale controlling mechanism including in combination a plurality of transaction recording units and means for preventing the operation of one unit when another unit is being operated.

118. A commodity sale controlling mechanism including in combination a plurality of units for uttering commodity-demanding tokens and means for preventing the operation of one unit when another unit is being operated.

119. A commodity sale controlling mechanism including in combination a seller identifying actuator, an automatic controlling mechanism cooperating therewith and operated by the actuator to utter from an inaccessible magazine a commodity-demanding token and means for preventing operation of the mechanism when the supply of tokens is exhausted.

120. A commodity sale controlling mechanism including in combination a seller identifying actuator adapted to automatically operate a controlling mechanism, an automatic controlling mechanism cooperating therewith and operated by the actuator to utter from an inaccessible magazine a commodity-demanding token and means for preventing operation of the mechanism when the supply of tokens is exhausted.

121. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom when the purchaser's check is brought into cooperative relation by said means, and means for preventing operation of the mechanism when the supply of tokens is exhausted.

122. A commodity sale controlling mechanism including in combination an automatic controlling mechanism, means for bringing a purchaser's check into cooperative relation therewith, a magazine for commodity-demanding tokens located inaccessibly within the controlling mechanism, means for uttering a token therefrom operating automatically when the purchaser's check is brought into cooperative relation by said means, and means for preventing operation of the mechanism when the supply of tokens is exhausted.

123. A commodity sale controlling mechanism including in combination price indicating means inaccessible to the user of the mechanism and including devices settable to indicate a desired price, means for recording each transaction and its price, means operating with said recording means to discharge a corresponding commodity-demanding token, and means for preventing operation of the mechanism when the supply of tokens is exhausted.

124. A commodity sale controlling mechanism including in combination means for making accessible a previously inserted commodity demanding token from an inaccessible source and cooperating means for involuntarily inaccessibly recording the transaction including the quantity of the commodity.

125. A commodity sale controlling mechanism including in combination means for making accessible a commodity demanding token from an inaccessible source and cooperating means for involuntarily recording the transaction, including the identity of the seller.

126. In a machine for use in dispensing commodities an inaccessible source of supply for commodity demanding tokens and means for indicating at a distant station the approaching exhaustion of the supply of tokens.

127. A commodity sale controlling mechanism including in combination price indicating means inaccessible to the user of the mechanism and including inaccessible to the user of the mechanism and including inaccessible devices settable to indicate a desired price, means for recording each transaction and its price, an inaccessible magazine containing mechanically recognizable tokens, and means for ejecting a token when the transaction is recorded.

128. A commodity sale controlling mechanism including in combination price indicating means inaccessible to the user of the mechanism and including inaccessible devices settable to indicate a desired price, means for receiving an order representing sheet, means operable by the user from the exterior for recording each transaction on the sheet and within the mechanism.

129. A commodity sale controlling mechanism including in combination price indicating means inaccessible to the user of the mechanism and including devices settable to indicate a desired price, and means for recording each transaction and its price upon a record-receiving member insertable into the machine for the purpose of receiving said record, and it then withdrawable therefrom, and means for receiving said record receiving member into the machine.

130. A commodity sale controlling mechanism including in combination price indicating means inaccessible to the user of the mechanism and including devices settable to indicate a desired price, and means for recording each transaction and its price upon a purchaser's check insertable and withdrawable for the purpose of receiving said record, means for carrying the purchaser's check into the mechanism, and for thereby calling the mechanism into action.

131. A commodity sale controlling mechanism including in combination price indicating means inaccessible to the user of the mechanism and including inaccessible devices settable to indicate a desired price, and means for recording each sale, and means for uttering from within the mechanism a mechanically recognizable commodity demanding token.

132. A commodity sale controlling mechanism including in combination price indicating means inaccessible to the user of the mechanism and including inaccessible devices settable to indicate a desired price, and means for recording each sale upon an insertible and withdrawable record-receiving member, said mechanism being called into action by the insertion of said record receiving member.

In testimony whereof, I have signed my name to this specification.

HARRY RUSSELL BRAND.